`US005372005A`

United States Patent [19]
Lawler

[11] Patent Number: 5,372,005
[45] Date of Patent: Dec. 13, 1994

[54] METHOD AND APPARATUS FOR POWER GENERATION

[76] Inventor: Shawn P. Lawler, 7113 139th Place N.E., Redmond, Wash. 98052

[21] Appl. No.: 945,228

[22] Filed: Sep. 14, 1992

[51] Int. Cl.$^5$ ............................................... F02C 3/14
[52] U.S. Cl. ................................... 60/39.02; 60/39.35; 416/22
[58] Field of Search ................ 60/39.02, 39.34, 39.35; 416/20 R, 21, 22

[56] References Cited

U.S. PATENT DOCUMENTS

| | | | |
|---|---|---|---|
| 2,895,259 | 7/1959 | Becket | 60/39.35 |
| 3,200,588 | 8/1965 | Math | 60/39.35 |
| 3,371,718 | 3/1968 | Bacon | 60/39.35 |
| 3,543,520 | 12/1970 | Kelley et al. | 60/39.35 |
| 4,208,590 | 6/1980 | Blomquist et al. | 60/39.35 |
| 4,577,460 | 3/1986 | Wirsching | 60/39.35 |

Primary Examiner—Richard A. Bertsch
Assistant Examiner—Michael I. Kocharov
Attorney, Agent, or Firm—R. Reams Goodloe, Jr.

[57] ABSTRACT

Thrust modules are provided at the distal ends of a low aerodynamic drag rotor. The rotor is affixed at a central hub to a shaft, and rotates about an axis defined by the shaft. In the preferred embodiment the thrust modules are ramjet engines, and the ramjet inlet captures and compresses an impinging inlet air stream. The compressed air stream thus provides oxygen for mixing with a fuel which is supplied to the ramjet thrust modules from a convenient fuel source such as natural gas. The fuel is oxidized in the thrust modules to produce combustion gases. The gases expand, and the exhaust flow creates thrust which is substantially tangential to the circumference defined by the distal end of the rotor. The gases expand to motivate the ramjet engine to rotate about the shaft at supersonic thrust module velocities, producing shaft energy.

29 Claims, 29 Drawing Sheets

FIG. 3 GENERATOR WITH HEAT RECOVERY

BI-PLANE ROTOR DETAILS

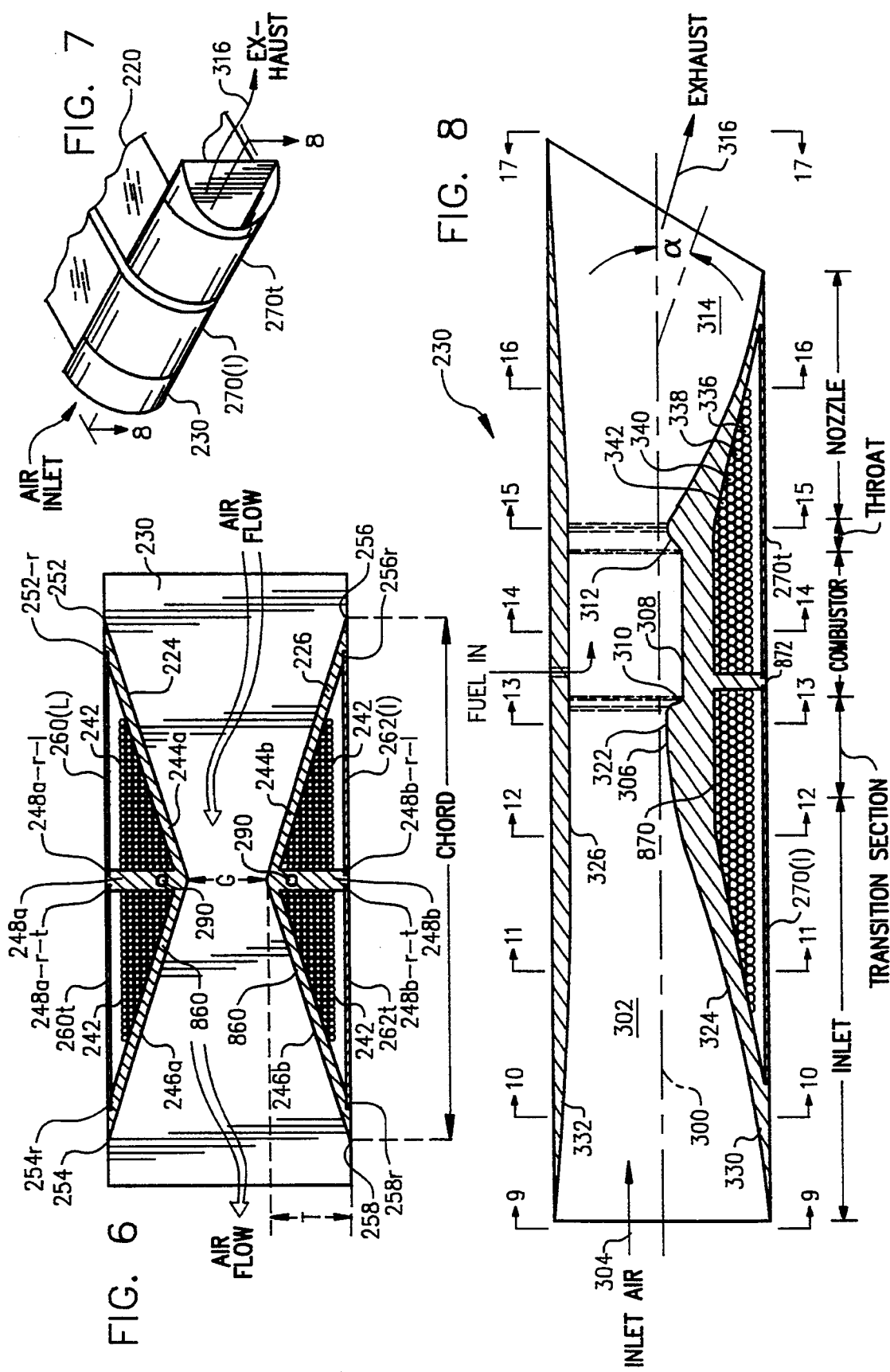

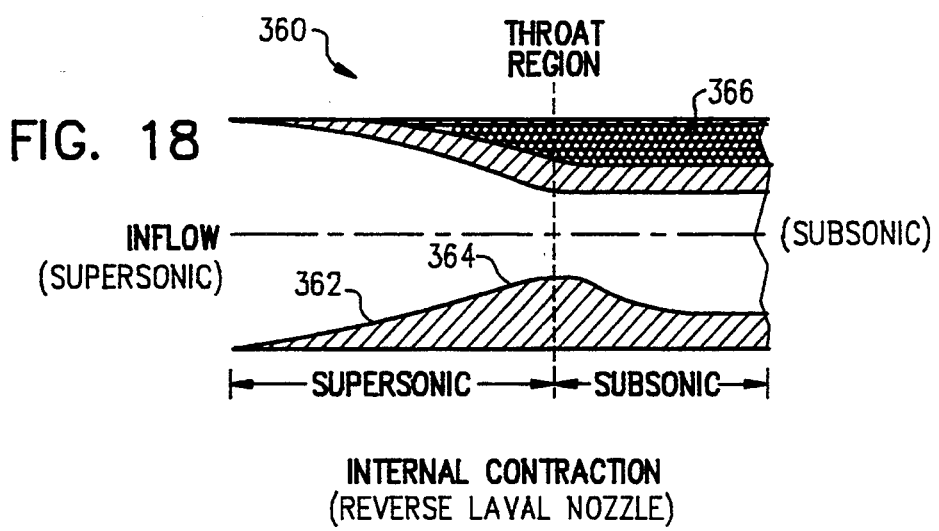
FIG. 18 INTERNAL CONTRACTION (REVERSE LAVAL NOZZLE)
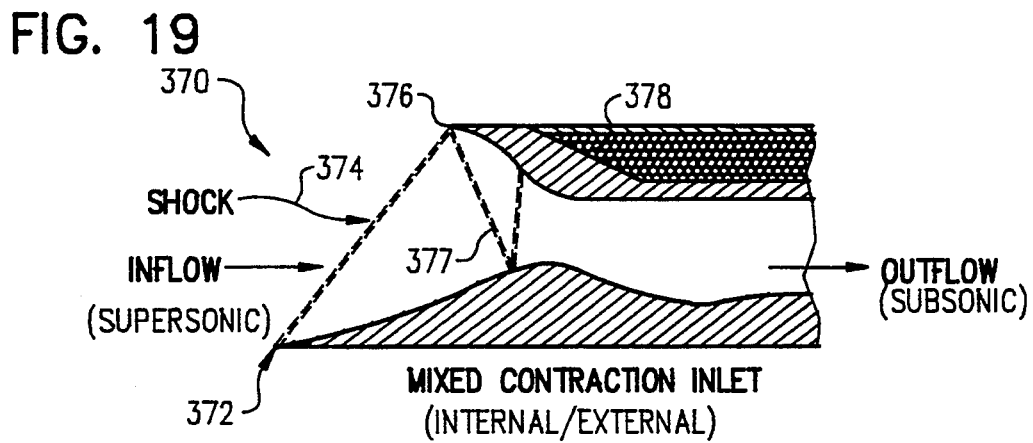
FIG. 19 MIXED CONTRACTION INLET (INTERNAL/EXTERNAL)
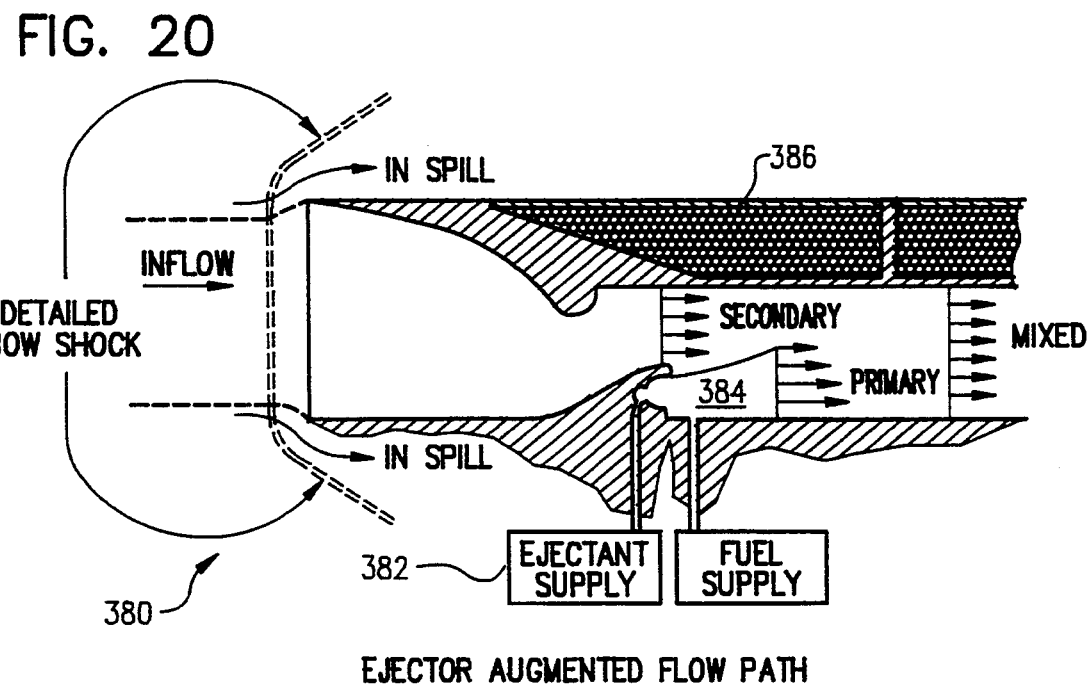
FIG. 20 EJECTOR AUGMENTED FLOW PATH

MIXED CONTRACTION INLET STARTING

FAR BELOW DESIGN MACH NUMBER
(High Spillage)

BELOW DESIGN MACH NUMBER
(Decreased Spillage)

DESIGN MACH NUMBER
(Shock on Inlet Lip)

INTERNAL CONTRACTION INLET

SELF-STARTING MIXED COMPRESSION INLET

1. INLET
2. TRANSITION SECTION
3. COMBUSTOR
4. THROAT
5. NOZZLE

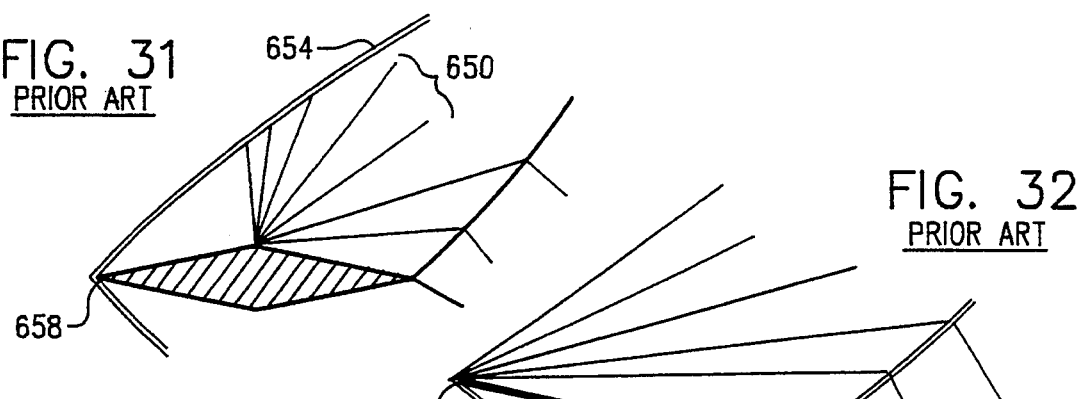
FIG. 31 PRIOR ART
FIG. 32 PRIOR ART
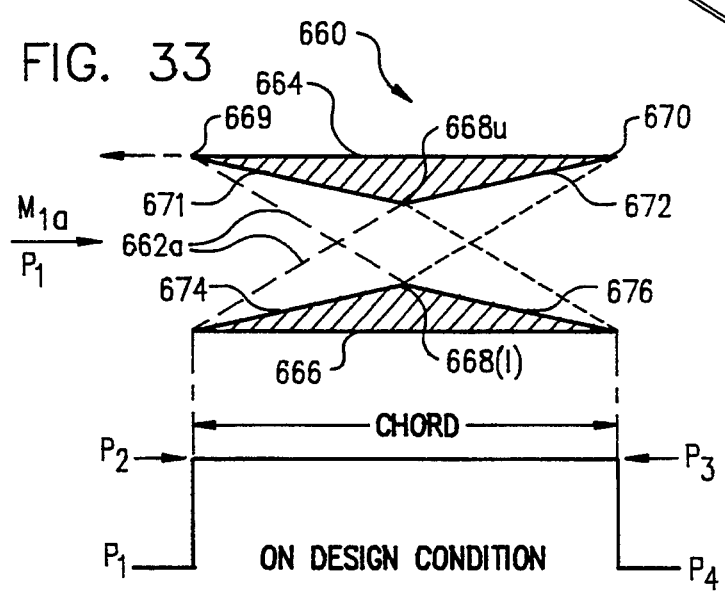
FIG. 33
ON DESIGN CONDITION
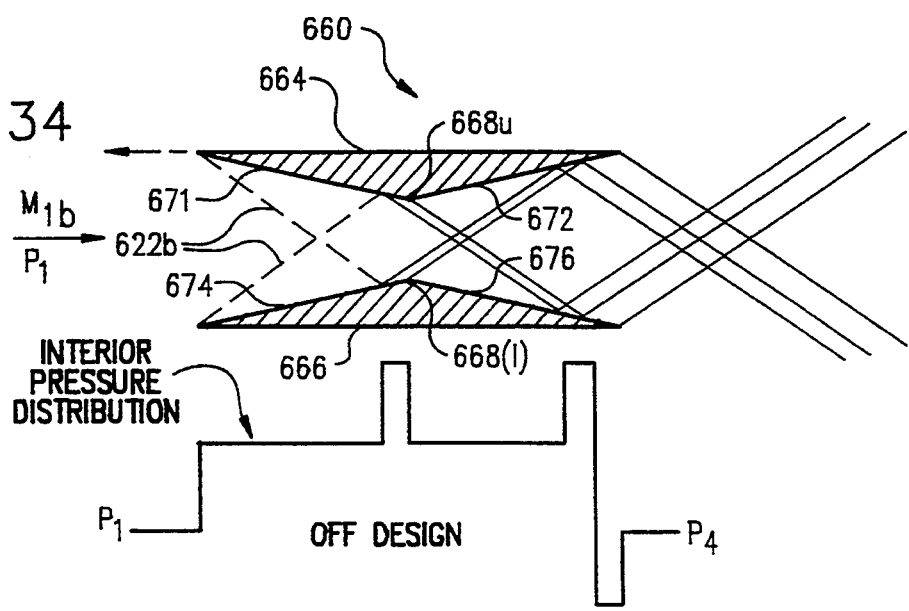
FIG. 34
INTERIOR PRESSURE DISTRIBUTION
OFF DESIGN

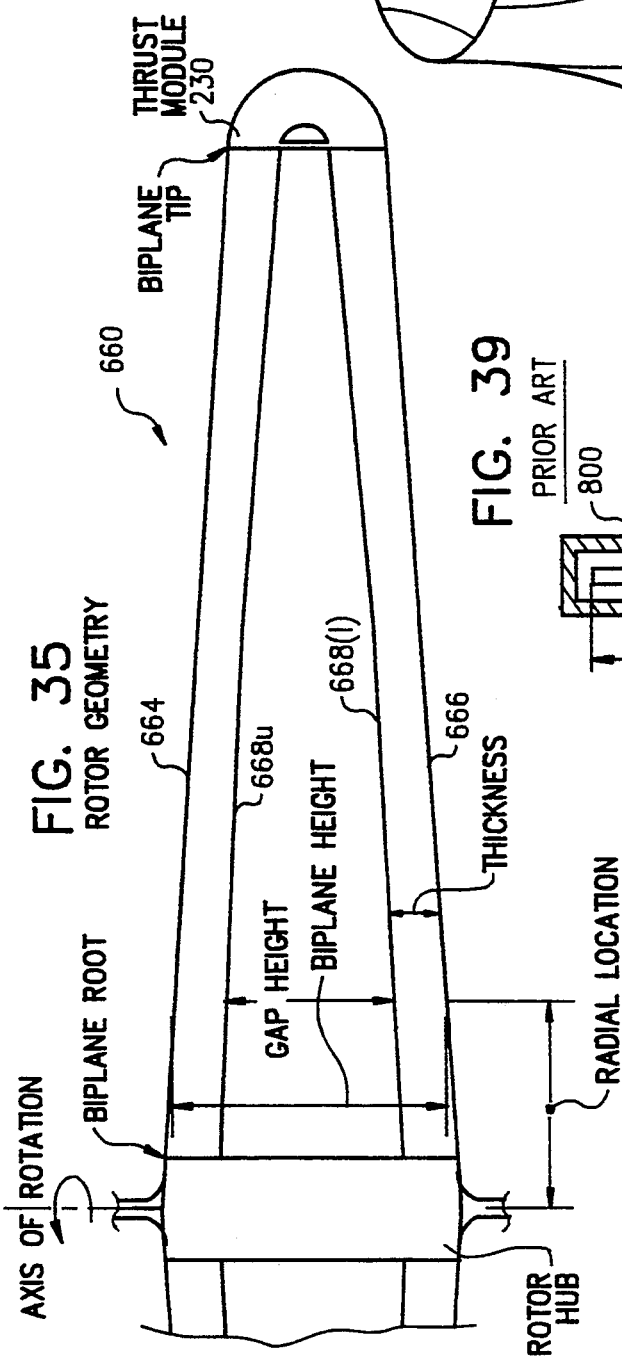
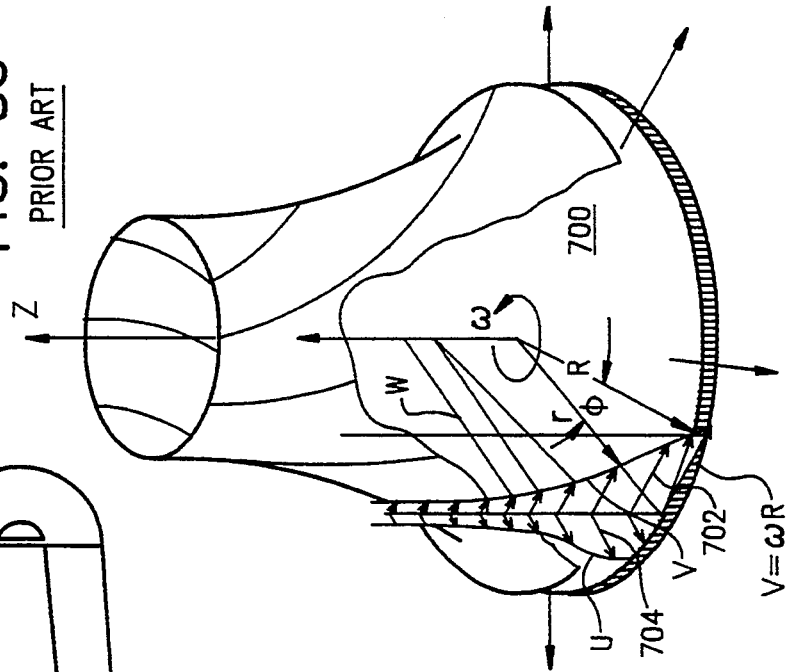
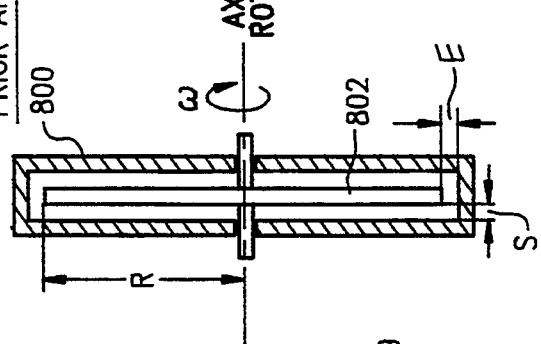
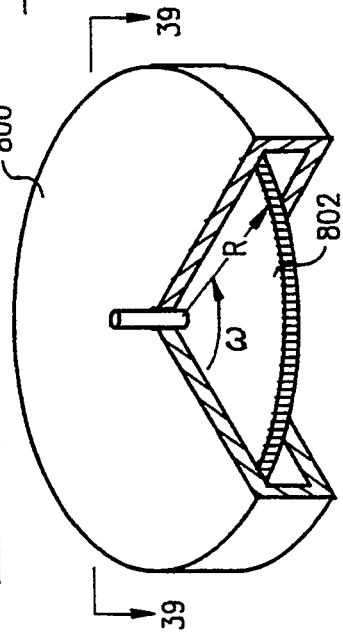
FIG. 35 ROTOR GEOMETRY
FIG. 36 PRIOR ART
FIG. 38 PRIOR ART
FIG. 39 PRIOR ART

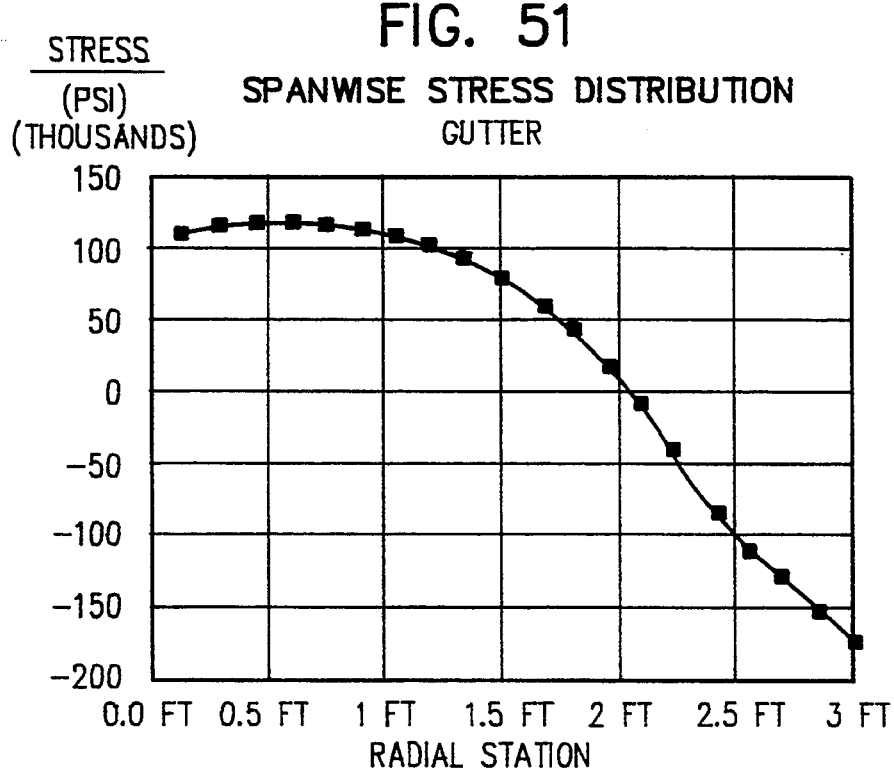
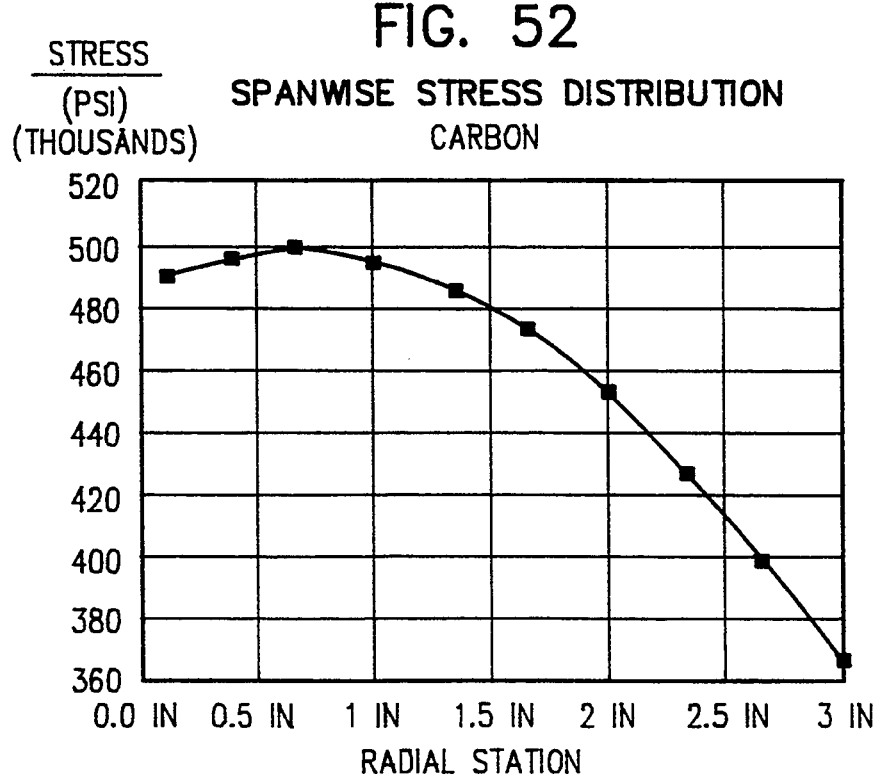

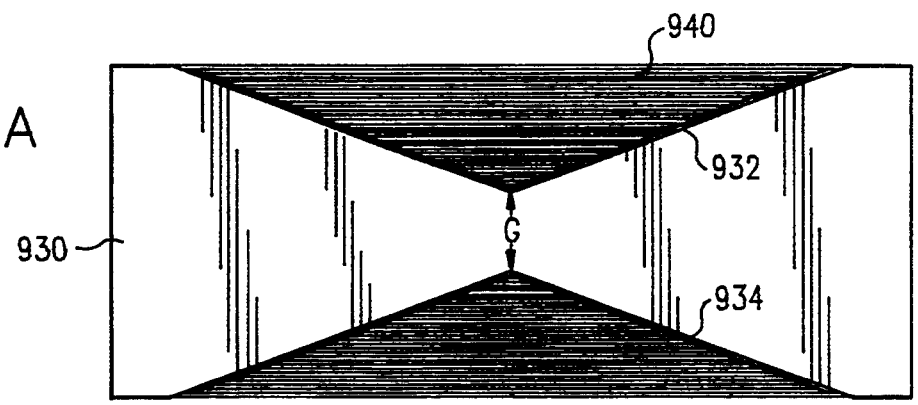
FIG. A
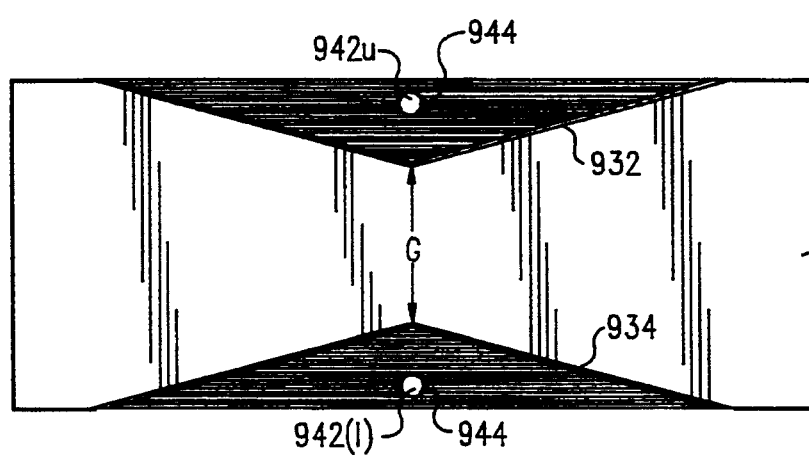
FIG. B
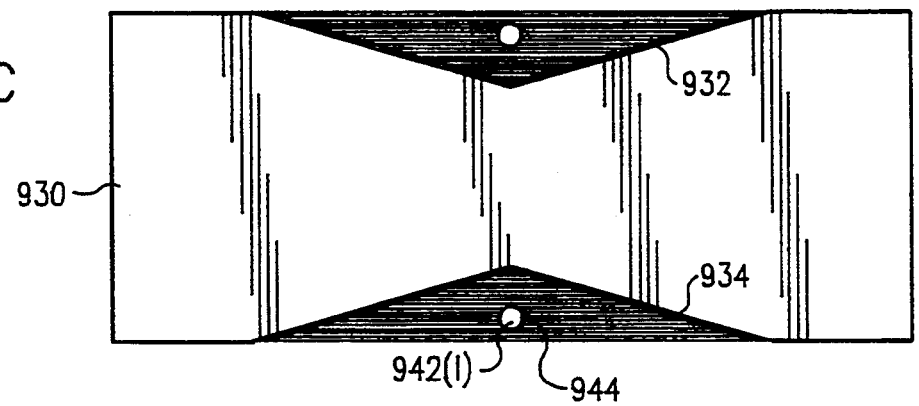
FIG. C
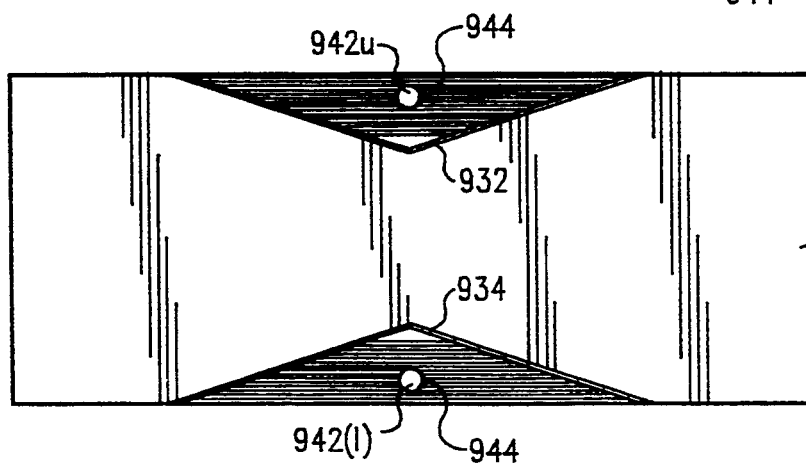
FIG. D

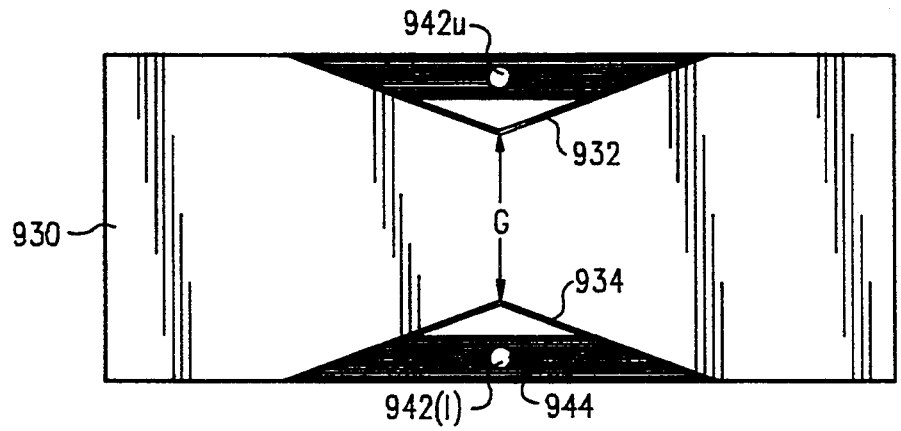
FIG. E
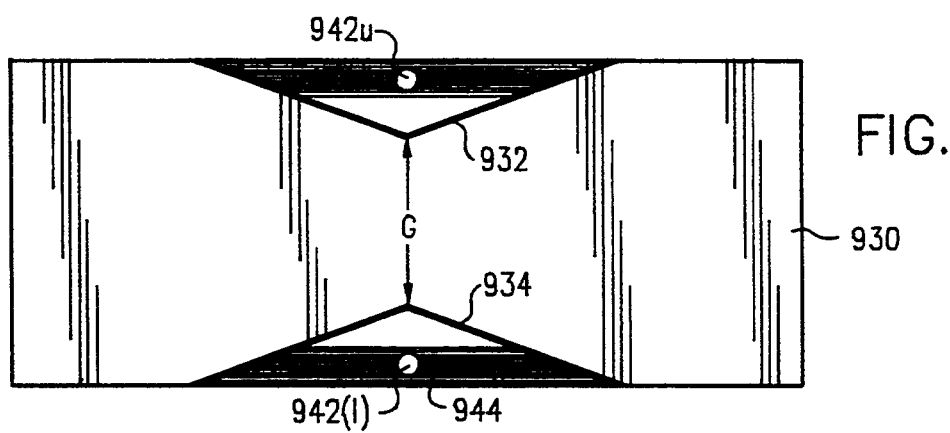
FIG. F
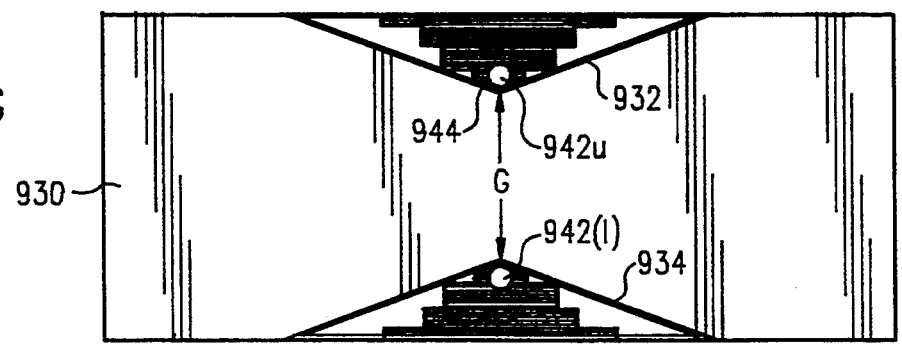
FIG. G

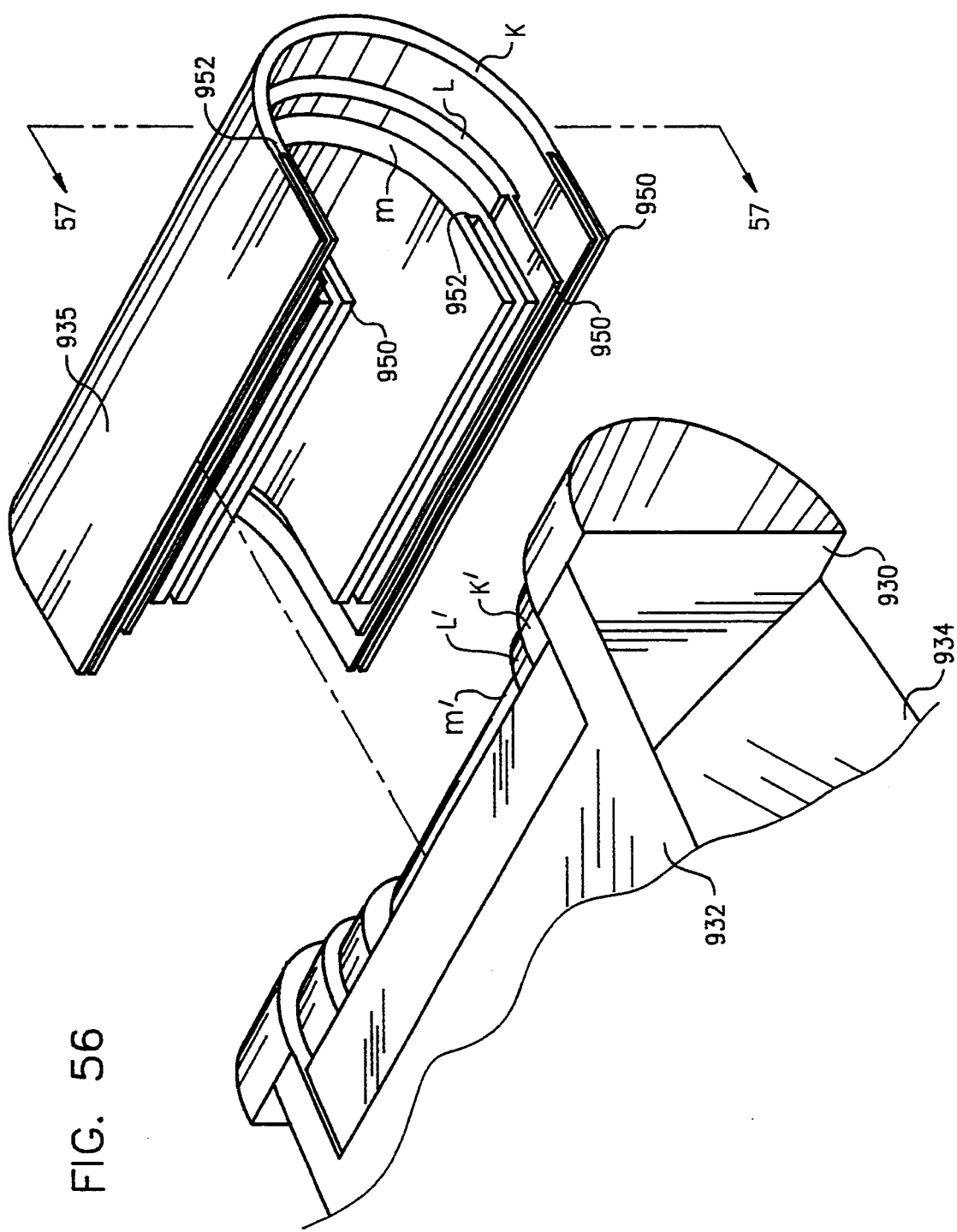

COGENERATION OPTIONS

ACRE vs GAS TURBINES
BASELINE SYSTEM (NO COGEN, NO TURBO)

ACRE PERFORMANCE INCREASES
IMPACT OF COGEN & TURBO

CYCLE EFFICIENCIES

METHOD AND APPARATUS FOR POWER GENERATION

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

My invention relates to a novel, revolutionary apparatus and method for the generation of electrical and mechanical power. More particularly, my invention relates to a power plant driven by thrust modules, which are preferably ramjet engines, and to novel rotors designed to withstand the extremely high tensile stress encountered while rotatably securing such thrust modules. The rotors are designed for operation at supersonic tip speeds while maintaining low aerodynamic drag, and are constructed of composite carbon fiber and/or metal matrix composites. Power plants of that character are particularly useful for generation of electrical and mechanical power at substantially improved efficiency rates when compared to various conventional power plant types.

BACKGROUND OF THE INVENTION

A continuing demand exists for a simple, high efficiency, inexpensive power plant which can reliably provide electrical and mechanical power. A variety of medium size electrical or mechanical power plants could substantially benefit from a prime mover which provides a marked improvement in overall efficiency. Such medium size mechanical or electrical power plants—in the 10 to 100 megawatt range—are required in a wide range of industrial applications, including rail locomotives, marine power systems, aircraft engines, and stationary electric power generating units. Power plants in this general size range are also well suited to use in industrial cogeneration facilities. Such facilities are increasingly employed to service industrial thermal power needs while simultaneously generating electrical power.

Power plant designs which are now commonly found in co-generation applications include (a) gas turbines, driven by the combustion of natural gas, fuel oil, or other fuels, and capturing the thermal and kinetic energy from the combustion gases, (b) steam turbines, driven by the steam which is generated in boilers from the combustion of coal, fuel oil, natural gas, solid waste, or other fuels, and (c) large scale reciprocating engines, usually diesel cycle and typically fired with fuel oils.

Each of the aforementioned types of power plants are complex integrated systems. Such plants often include many subsystems and a large number of individual parts. The parts often must be manufactured to exacting dimensional and mechanical specifications. As a result, such power plants are relatively expensive to manufacture, to install, and to operate. Also, in the event of failure of a part or subsystem, the required repairs are often quite expensive. Frequently, repairs may require substantial disassembly of subsystems to gain access to individual parts, in order to repair or replace the faulty components and return the plant to an operational condition.

Of the currently available power plant technologies, diesel fueled reciprocating and advanced turbine engines have the highest efficiency levels. Base efficiencies are often in the range of 25% to 40%, based on net work produced when compared to the energy value of the fuel source. Unfortunately, at power output levels greater than approximately 1 megawatt, the size of the pistons and other engine components required by reciprocating engine systems become almost unmanageably large, and as a result, widespread commercial use of larger sized reciprocating engine systems has not been accomplished.

Gas turbines perform more reliably than reciprocating engines, and are therefore frequently employed in plants which have higher power output levels. However, because gas turbines are only moderately efficient in converting fuel to electrical energy, gas turbine powered plants are most effectively employed in co-generation systems where, as mentioned above, both electrical and thermal energy can be utilized. In that way, the moderate efficiency of a gas turbine can in part be counterbalanced by increasing the overall cycle efficiency.

Fossil fueled steam turbine electrical power generation systems are also of fairly low efficiency, often in the range of 30% to 40%. Such systems are commonly employed in both utility and industrial applications for base load electrical power generation. This is primarily due to the high reliability of such systems. However, like gas turbine equipment, steam turbine equipment is most advantageously employed in situations where both mechanical and thermal energy may be utilized, thus increasing overall cycle efficiency.

Because of their moderate efficiency in conversion of fuel input to electrical output, the most widely used types of power plants, namely gas turbines and combustion powered steam turbine systems, depend upon co-generation in industrial settings to achieve advantageous commercial electricity cost levels. Thus, it can be appreciated that it would be desirable to be able to generate electrical power at higher overall efficiency rates than is commonly achieved today, especially when compared to the currently utilized gas and steam turbine based power plants.

THE PRIOR ART

Ramjets are widely know and have been utilized, primarily in aerospace applications, since the 1940s. Basically, a ramjet is a fixed geometry combustion chamber which is propelled through an airstream by the thrust reaction of the chamber against escaping combustion gases which have been generated by oxidizing an injected fuel with the incoming air supply. The configuration of ramjet engine inlets, fuel injection requirements, combustion chamber configurations, and ignition requirements have been the subject of much study and technical development over many years.

Early ramjets were described, for example, in German Patent No. 554, 906, issued Nov. 2, 1932 to Ing. Albert Fono. Ramjets have also been experimentally employed to assist in the rotation of helicopter blades about a central shaft. For example, see the National Advisory Committee for Aeronautics (NACA) research memorandum (NACA RM L53DOZ) for a ramjet powered helicopter rotor. However, insofar as I am aware, ramjets have not been employed in commercial power plants for production of electricity.

SUMMARY OF THE INVENTION

I have now invented, and disclose herein, a novel, revolutionary power generation plant design. My power plant design is based on the use of a ramjet engine as the prime mover, and has greatly increased efficiencies when compared to those heretofore used power plants of which I am aware. Unlike most power plants commonly in use today, my power plant design is simple, compact, relatively inexpensive, easy to install and to service, and otherwise superior to currently operating plants of which I am aware.

My novel power plants have a unique low aerodynamic drag rotor portion. The rotor is constructed of metal matrix composites and/or high strength carbon fiber, and can be operated at rotating speeds well above those which would induce tensile and compressive strains that would cause conventional materials such as steel or titanium to fail.

Thus, the rotor design used in my power plant overcomes two important and serious problems: First, at the supersonic tip speeds at which my device operates, the rotor design minimizes aerodynamic drag, thus it minimizes parasitic losses to the power plant due to the drag resulting from the movement of the rotor in an airstream. Second, the composite design provides the necessary tensile and compressive strength, where needed in the rotor, to prevent internal separation of the rotor by virtue of the centrifugal and centripetal forces acting on the rotor materials.

Solving the two aforementioned problems are critical elements of my invention. Operation of a rotary ramjet driven rotating power generation apparatus at the supersonic tip speeds considered desirable for efficient operation would be impossible with conventional construction materials such as high strength steel. Also, it is important that a power plant avoid large parasitic losses that undesirably consume fuel and reduce overall efficiency.

I have now developed novel rotor designs for use in combination with a ramjet driven power generation system, so as to enable high speed, aerodynamically efficient rotor operation. In one embodiment, a biplane rotor includes an upper triangularly shaped portion and an opposing lower triangularly shaped portion; the upper and lower portions both are secured to and extend from opposing sides of a central hub portion. The central hub portion is rotatably secured in an operating position along an axis formed by upper and lower shaft portions. The upper and lower rotor portions are situated so that air may pass above the upper portion and below the lower portion. More importantly, air may pass through a gap between the upper and lower portions with minimal aerodynamic drag.

Attached to the distal end of each pair of rotors are ramjet engine thrust modules. The inward edge portion of the ramjet engine attaches to the outer edge portions of the opposing upper and lower edge portions, thus affixing the ramjet engine to the rotor. In various embodiments, the ramjet may be further secured to the rotor by either an external endcap or by externally wound composite fiber bundles.

The ramjet engines are situated so as to engage and to compress that portion of the airstream which is impinged by the ramjet upon its rotation about the aforementioned shaft. I have also provided in my design a feature to insure that a relatively clean airstream (free of the rotor's own wake turbulence) will be encountered by the rotating rotor and ramjet. This is accomplished by circulating, generally along the aforementioned axis of rotation, an airstream which can both replace the gases scooped up by the ramjet compression as well as sweep away the wake from the just turned rotor.

Fuel is added to the air which has been compressed in the ramjet inlet. The fuel may be conveniently provided to the ramjet engine combustion chamber through use of fuel supply passageways communicating between the ramjet and a fuel source. Fuel passageways may allow fuel flow upwardly from the bottom shaft portion and downwardly from the top shaft portion, then such passageways are turned outwardly through the hub portion and thence radially outwardly through either or both of the rotor portions, then on through the outer edge portions, and thence through fuel injection ports to the ramjet engine combustion chambers. The combustion gases formed by oxidation of the fuel escape rearwardly from the ramjet, thrusting the ramjet tangentially about the axis formed by the shaft portions, thus turning the rotor and the shaft portions. The power so generated by the turning shaft may be used directly in mechanical form, or may be used to power an electrical generator and thus generate electricity.

In one embodiment, the outlet portions of the ramjet are positioned so that the combustion gases may impinge on a set of heat transfer elements, so as to cool the combustion gases by way of heating up a heat transfer fluid such as water which is circulated within the heat transfer elements. Ultimately, the cooled combustion gases may be exhausted to the ambient air.

In another important embodiment, an annular reaction turbine is additionally provided surrounding the exit to the exhaust gas heat exchanger. This annular reaction turbine captures the substantial kinetic energy remaining in the exhaust gas flow, so as to improve overall cycle efficiency.

In yet other embodiments, the rotor may be provided in the shape of a disk, discus, or similar shape.

In yet another embodiment, a small central disk rotor with outwardly extending upper and lower biplane rotor portions are provided.

Other embodiments provide further variations in the air flow configuration and in provision of the fuel supply means.

In addition to the foregoing, my novel devices are simple, durable, and relatively inexpensive to manufacture.

OBJECTS, ADVANTAGES, AND FEATURES OF THE INVENTION

From the foregoing, it will be apparent to the reader that one important and primary object of the present invention resides in the provision of novel, improved mechanical devices to generate mechanical and electrical power.

More specifically, an important object of my invention is to provide a ramjet driven power generation plant which is capable of withstanding the stress and strain of high speed rotation, so as to reliably provide a method of power generation at a very high efficiency rate.

Other important but more specific objects of the invention reside in the provision of power generation plants as described in the preceding paragraph which:

allow the generation of power to be done in a simple, direct manner;

have a minimum of mechanical parts;

avoid complex subsystems;
require less physical space than existing technology power plants;
are easy to construct, to start, and to service;
have high efficiency rates; that is, to provide high heat and high work outputs based on heating value of fuel input to the power plant;
in conjunction with the preceding object, provide lower power costs to the power plant operator and thus to the power purchaser than is presently the case;
cleanly burns fossil fuels;
in conjunction with the just mentioned object, results in fewer negative environmental impacts than most power generation facilities currently in use;
have a fuel supply design which efficiently supplies a ramjet;
have a rotating element with a structure able to withstand the stresses and strains of rotating at very high tip speeds; and which
have a rotating element design which provides operation with minimal aerodynamic drag.

A feature of one embodiment of the present invention is the use of a novel biplane rotor which provides minimal aerodynamic drag at the high rotational design speeds, thereby enabling the power plant to minimize parasitic losses, with the resulting advantage of high overall cycle efficiencies.

Another feature of the present invention is the use of a monofilament carbon fiber winding as an integral part of the structure of the rotor, which provides the advantage of high strength, thus enabling operation at rotational speeds above stress failure limits of conventional materials such as steel and titanium.

Other important objects, features, and additional advantages of my invention will become apparent to those skilled in the art from the foregoing and from the detailed description which follows and the appended claims, in conjunction with the accompanying drawing.

BRIEF DESCRIPTION OF THE DRAWING

In the drawing, identical structures shown in the several figures will be referred to by identical reference numerals without further mention. Also, closely related structures in the several figures may be given the same number but different alphabetic suffixes.

FIG. 6 is a vertical cross-sectional view taken through line 6—6 of FIG. 5, showing the cross-sectional structure of the biplane rotor, as well as the location of the ramjet thrust module at the distal end of the rotor.

FIG. 7 is a perspective view of the distal end of a biplane rotor, showing a ramjet thrust module attached thereto.

FIG. 8 is a horizontal cross section, taken through line 8—8 of the ramjet thrust module of FIG. 7, looking downward at the construction of the thrust module.

FIGS. 12 through 15 show the varying thickness of the reinforcing carbon fiber windings, as well as the shape of the interior of the thrust module air flow path.

FIG. 18 is a horizontal cross-sectional view, similar to the view first set forth in FIG. 8 above, showing a first alternate configuration for the interior of a ramjet thrust module, utilizing a reverse Laval internal contraction nozzle. The figure also shows areas requiring carbon fiber reinforcement for operation in the present invention.

FIG. 19 is a horizontal cross-sectional view, similar to the view first set forth in FIG. 8 above, showing a second alternate configuration for the interior of a ramjet thrust module, utilizing a mixed contraction inlet nozzle. The figure also shows areas requiring carbon fiber reinforcement for operation in the present invention.

FIG. 20 is a horizontal cross-sectional view, similar to the view first set forth in FIG. 8 above, showing a third alternate configuration for the interior of a ramjet thrust module, utilizing an ejector augmented flow path. The figure also shows areas requiring carbon fiber reinforcement for operation in the present invention.

FIG. 21A shows shock wave location and spillage for operation of a ramjet thrust module well below design mach number. The figure also shows areas requiring carbon fiber reinforcement for operation in the present invention.

FIG. 21B shows shock wave location and spillage for operation of a mixed contraction inlet slightly below design mach number. The figure also shows areas requiring carbon fiber reinforcement for operation in the present invention.

FIG. 21C shows the shock wave location and the captured airstream tube as would be present in the operation of a mixed contraction ramjet engine at design mach number. The figure also shows areas requiring carbon fiber reinforcement for operation in the present invention.

FIG. 31 is an illustration of the attenuation of shock waves from a diamond shaped cross section, through interaction with expansion waves.

FIG. 32 is an illustration of the attenuation of shock waves from a flat plant shaped cross section, through interaction with expansion waves.

FIG. 33 illustrates pressure drag reduction due to shock cancellation within a biplane rotor.

FIG. 34 illustrates shock cancellation within a biplane type rotor when the biplane is not operating at the design mach number.

FIG. 35 illustrates a desirable rotor geometry, and shows variance of biplane height and internal gap height in the biplane rotors to achieve low aerodynamic drag.

FIG. 36 shows the flowfield near a flat disc rotating in a quiescent fluid.

FIG. 38 is a schematic representation of a disc rotating in a housing.

FIG. 39 is a schematic representation of a disc rotating in a housing, taken along line 39—39 of FIG. 38.

FIG. 51 shows the spanwise variation in radial stress in the biplane gutters.

FIG. 52 shows the spanwise variation in radial stress in carbon filament windings used in one embodiment of the invention.

Figure 55:
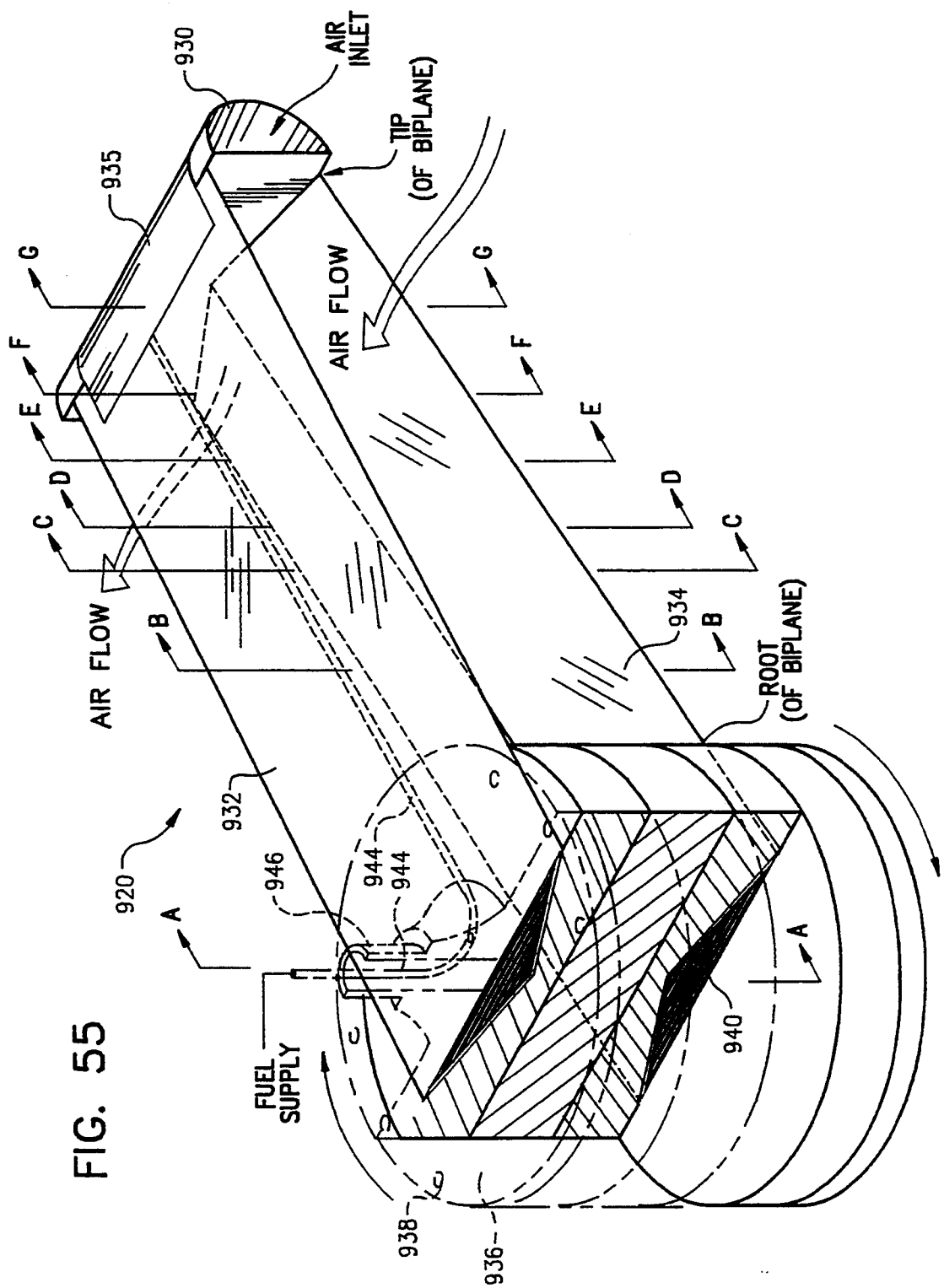
FIG. 55 is a partial isometric view of a second embodiment of the biplane rotor of the present invention, similar to the view first set forth above in FIG. 5, here showing a solid metal matrix composite type construction configuration.

FIG. A is a vertical cross-sectional view taken through line A—A of FIG. 55, showing the construction of the solid type rotor.

FIG. B is a vertical cross-sectional view taken through line B—B of FIG. 55, showing the construction of the solid type rotor, and also showing the changing features of gap and fuel conduit diameter.

FIG. C is a vertical cross-sectional view taken through line C—C of FIG. 55, similar to the view set forth in FIGS. A & B above, showing further variations in rotor dimensions with change in radial position.

FIG. D is a vertical cross-sectional view taken through line D—D of FIG. 55, similar to the views in FIGS. A through C above, showing further variations in rotor dimensions with change in radial position.

FIG. E is a vertical cross-sectional view taken through line E—E of FIG. 55, similar to the view set forth in FIGS. A through D above, showing further variations in rotor dimensions with change in radial position.

FIG. F is a vertical cross-sectional view taken through line F—F of FIG. 55, similar to the views in FIGS. A through E above, showing further variations in rotor dimensions with change in radial position.

FIG. G is a vertical cross-sectional view taken through line G—G of FIG. 55, similar to the views in FIGS. A through F above, showing further variations in rotor dimensions with change in radial position.

FIG. 56 provides an isometric view of an end cap for use with the solid type rotor first illustrated in FIG. 55 above.

Figure 57:
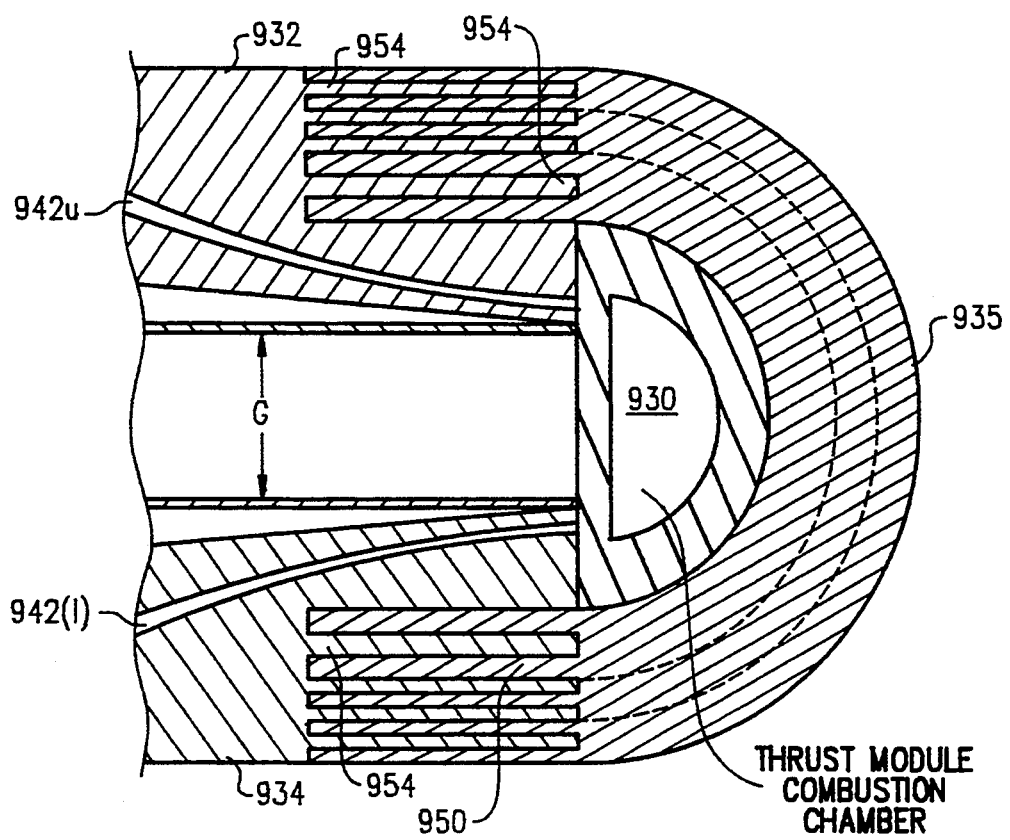

FIG. 57 illustrates a vertical cross-sectional view of the finished, operating position of the end cap just illustrated in FIG. 56, when the cap is affixed to the rotor.

Figure 58:
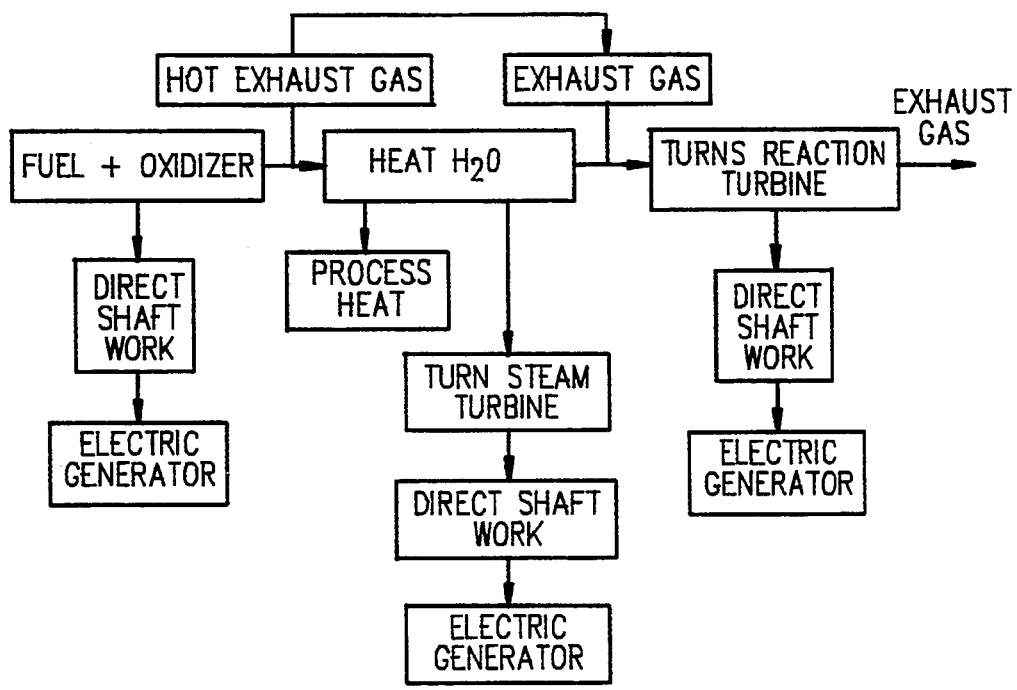

FIG. 58 shows schematically the use of the power and heat generated in the thrust module of the power plant for a variety of heat recovery, shaft work, or electrical co-generation activities.

Figure 59:
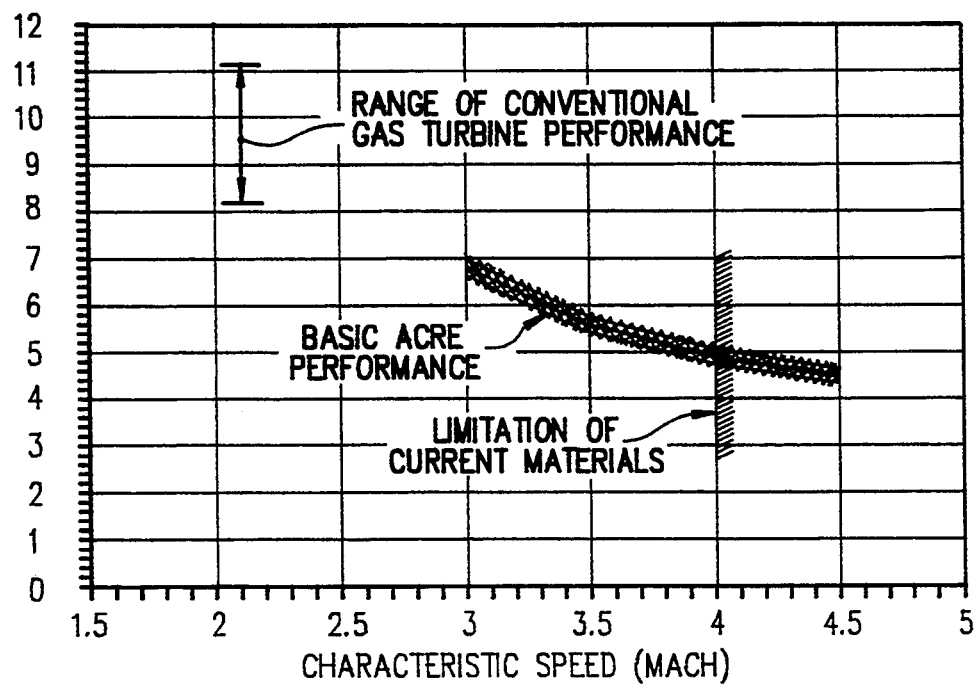

FIG. 59 graphically shows a comparison of the general performance characteristics of the basic ramjet driven power generation plant, when compared to gas turbines. Engine performance is shown in terms of heat rate.

Figure 60:
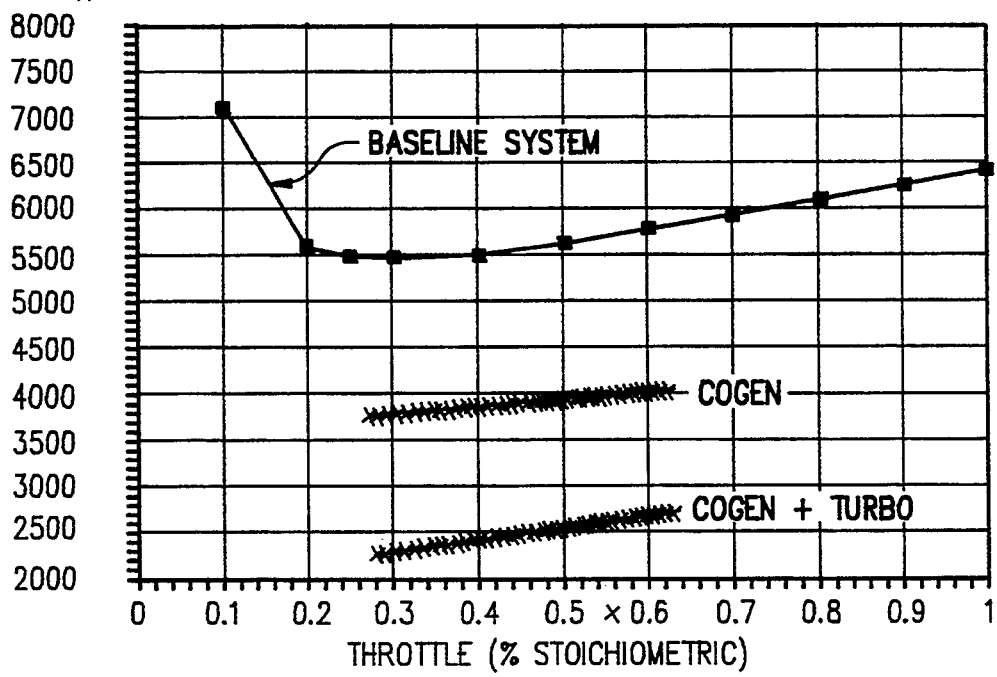

FIG. 60 graphically shows the performance improvements available to the basic ramjet driven power generation plant through (a) the addition of heat recovery, and (b) by use of both heat recovery and a reaction turbine.

Figure 61:
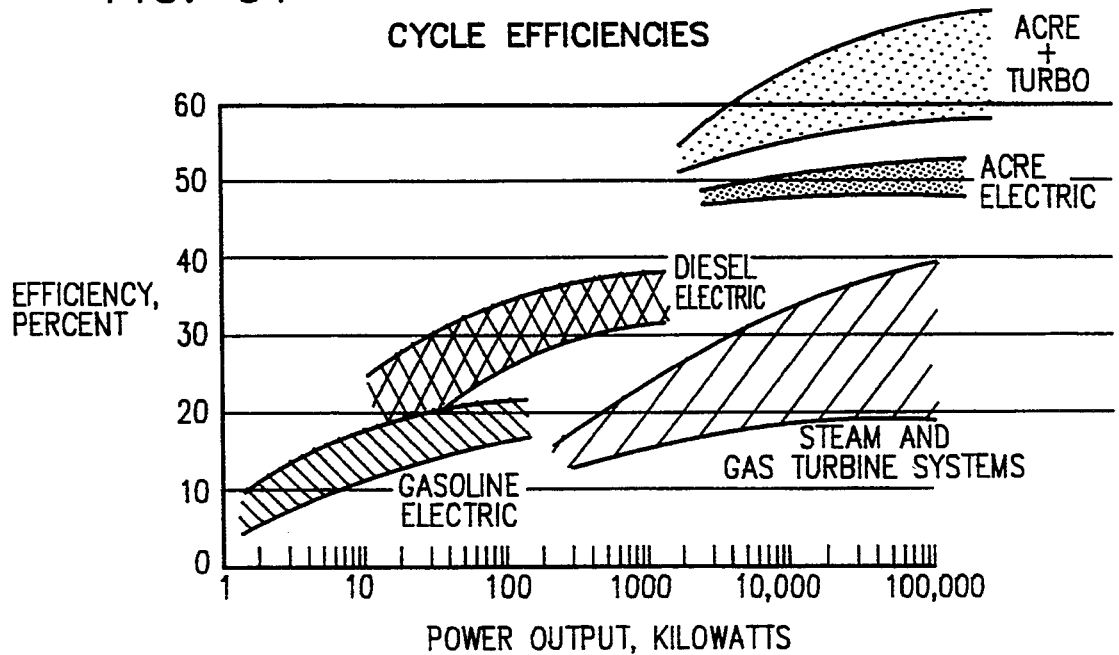

FIG. 61 graphically shows the cycle efficiencies, in terms of cycle efficiency, for various types of power plants, including the power plant of the instant invention.

Figure 62:
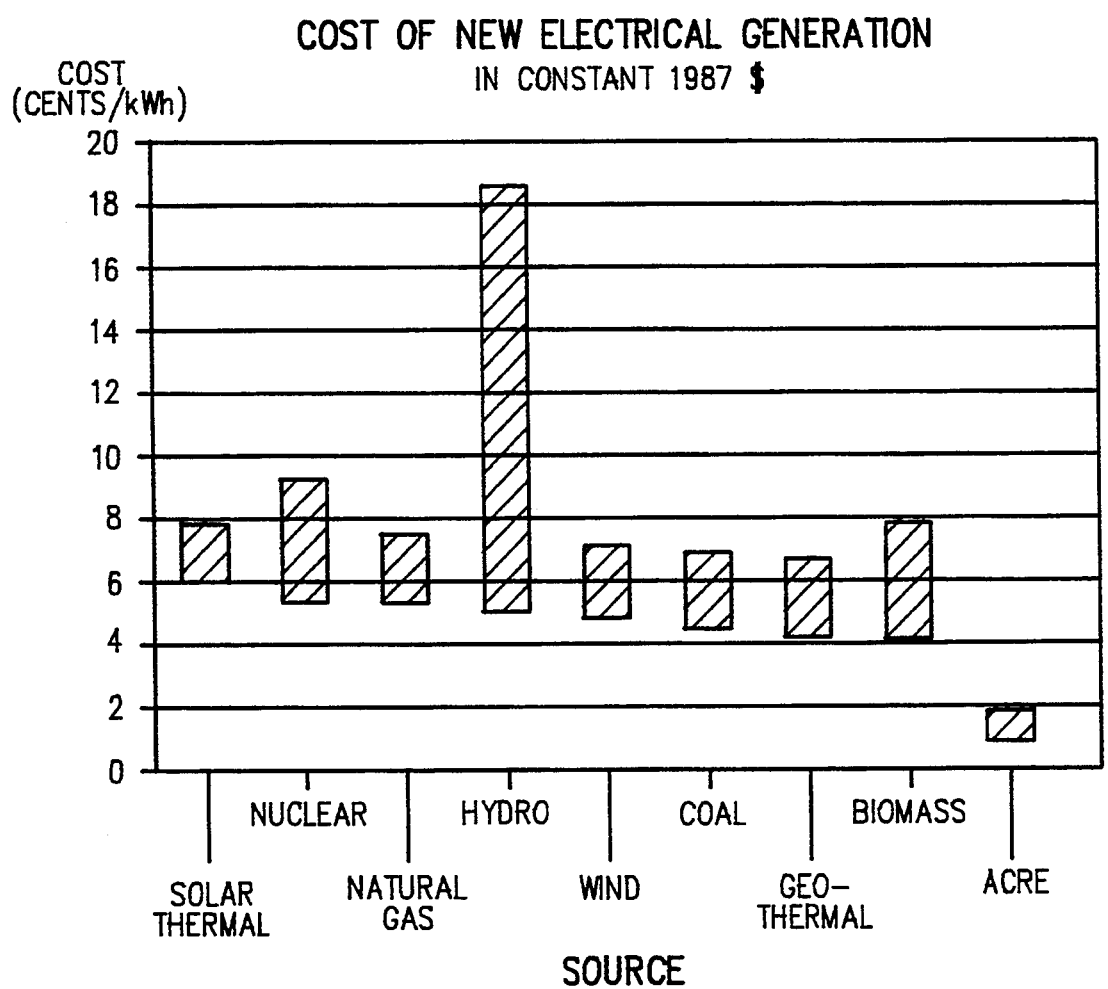

FIG. 62 graphically shows the project cost of energy (cents per kilowatt hour) for the basic ramjet driven power generation plant, when compared to other types of power generation plants commonly in use today.

DETAILED DESCRIPTION OF INVENTION

The invention will be better understood and appreciated from consideration of a preferred embodiment thereof which, for purposes of descriptive clarity, includes simply a power plant with heat recovery type exhaust gas cooling. It is of course appreciated that additional features and combinations with other power generation apparatus may be desirable in particular circumstances. However, the power plant system to be initially described below will be a basic building block in most instances of a power plant design due to the desirability of capturing thermal energy from combustion gases.

My power plant is based on high speed, supersonic propulsion phenomenon which allows the elimination of most moving parts which are common in other types of combustion power plants currently available. Simplification of the power generation apparatus allows initial capital costs to be minimized, and the superb system performance allows operating costs to be minimized.

Basic Power Plant

Figure 1:
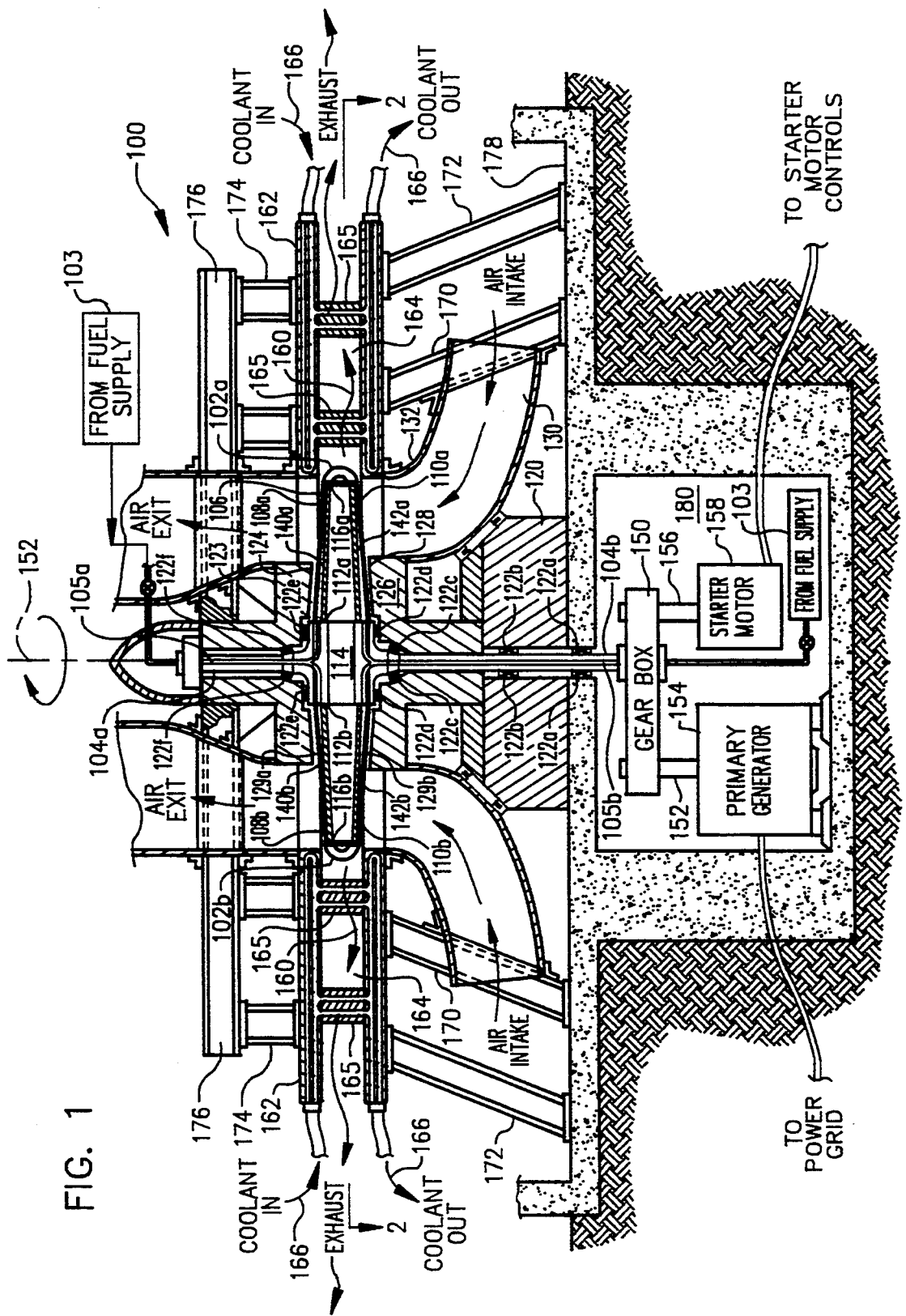
FIG. 1 shows a cross section of the power plant apparatus, including the ramjet thrust module, a biplane rotor, a central hub, a rotating shaft, and air flow ducts. Additionally, fuel supply lines, exhaust heat recovery equipment, a primary generator, the starter motor and a gearbox are illustrated.

Referring now to the drawing, FIG. 1 depicts, in its operative power generation configuration a vertical cross-sectional view of a power plant 100 constructed in accord with, and embodying, the principles of the present invention.

Key components of the power plant 100 include the following:
 one or more thrust modules 102a and or 102b suitable for oxidizing a fuel supplied thereto from a fuel supply 103 and thus creating a propulsive thrust from the exhaust gases created;
 a power output means such as a central rotating shaft portions 104a and 104b;
 a rotor 106 having one or more portions 106a and/or 106b (ideally, one rotor portion per thrust module) for rotatably connecting the thrust module(s) 102a and 102b with the output shaft portions 104a and 104b.

Ideally, the thrust modules 102a and 102b are ramjet engines which utilize oxygen from available airflow as an oxidant source.

In this embodiment, the shaft has an upper portion 104a and a lower portion 104b for rotatably supporting rotor 106 and the appended thrust modules 102a and 102b. The shaft portions 104a and 104b are hollow thus providing the necessary conduits 105a and 105b for flow of fuel to the thrust modules 102a and 102b from fuel supply 103.

Rotor 106 provides the means to rotatably connect and secure the shaft portions 104a and 104b to ramjet thrust modules 102a and 102b. The rotor 106 may include opposing upper biplane portions 108a and 108b, and opposing lower biplane portions 110a and 110b, as shown here, or may be of an alternate configuration as further described hereinbelow. Opposing biplane rotor pairs 108a and 110a, and 108b and 110b, are secured near their axial ends 112a and 112b to shaft portions 104a and 104b by hub means 114. The thrust modules 102a and 102b are secured to the distal end 116a of biplane rotors 108a and 110a, and to the distal end 116b of rotor portions 108b and 110b.

Biplane rotor portions 108a and 110a, and 108b and 110b are shown as laterally opposing portions (a "two spoke" configuration). However, other embodiments, such as a tri-rotor or quad-rotor (three or four "spokes," respectively extending from a central hub) are also feasible by use of the principles disclosed herein.

The basic rotating assembly, comprising the thrust modules 102a and 102b, the upper rotor portions 108a and 108b, the lower rotor portions 110a and 110b, hub means 114, and shaft portions 104a and 104b, are rotatably secured in an operating position by a support structure or housing 120. Bearings 122a, 122b, 122c, 122d, 122e, and 122f, or suitable variations thereof, provide adequate bearing support for rotation with minimum friction. The accompanying lubrication systems may be provided by any convenient means by those knowledgeable in high speed rotating machinery, and need not be further discussed herein.

Support structure 120 includes several important features which are provided to reduce aerodynamic drag on the rotors 108a and 108b, and 110a and 110b. First, an upper housing portion 123 is provided with a lower surface 124, and a lower housing portion 126 is provided with an upper surface 128. Surfaces 124 and 128, respectively, are located with minimal clearance between lower surface 124 and the upper biplane portions 108a and 108b, and between the upper surface 128 and lower biplane rotor portions 110a and 110b, respectively. Thus, rotor portions 108a, 108b, 110a, and 110b may be rotated relative to the support portion 120, yet be securely held in a close fitting relationship with the support portion 120 with minimum surface to surface clearance in gap 129a and 129b.

A sweep air chamber 130 defined by wall 132 is provided as a conduit for air to flow past the rotor portions 108a, 108b, 110a, and 110b, so that, for example, the rotor 108b is not significantly affected by the aerodynamic wake of the just passed rotor 108a. The air flow velocity necessary to accomplish the desired objective will vary according to the rotational speed of the rotor 106, and the radial length thereof, but may be derived by the builder once other variables are identified. Adequate velocity of the air flowing through chamber 130 may be assured by an induction fan (not shown) on the exit air stream, or other suitable means.

As mentioned above, the upper high speed shaft 104a and the lower high speed shaft 104b are hollow, thus including conduits 105a and 105b, respectively, to provide fuel from supply 103 to thrust modules 102a and 102b. From conduits 105a and 105b, fuel is routed through upper fuel passageways 140a and 140b and lower fuel passageways 142a and 142b in rotor 106. The cross-sectional area of passageways 140a, 140b, 140c, and 140d may be varied to accommodate the compression of fuel due to centrifugal effects.

The lower shaft portion 104b also acts in conventional fashion to transmit mechanical power to the gear-box 150. The gear-box 150 reduces the output shaft 104b speed to a sufficiently low level to accommodate the capabilities of the desired application. In FIG. 1, gear-box 150 is connected by shaft 152 to primary electrical generator 154, suited to generate electrical power for transmission to a power grid or other electrical load. However, shaft 152 could be applied directly to do desired mechanical work.

Gear-box 150 is also shown connected by shaft 156 to starter motor 158. Starter motor 158 is supplied electrical power and control power from a motor control center. The starter motor 158 is configured to turn, through gear-box 150, the shaft 104b so as to rotate thrust modules 102a and 102b to a convenient tangential velocity so as to enable the start of the ramjet engines. Once the ramjet engines of thrust modules 102a and 102b are running, a properly designed starter motor 158 could then be shut down, and used in reverse as a generator of electrical power.

Where appropriate hereinbelow, like numerals will be utilized to identify like structures throughout the various figures, without further comment thereon.

Cogeneration

Exhaust 160 gases from thrust modules 102a and 102b may be conveniently cooled by an enthalpy extraction system 162 which surrounds and laterally encloses rotor 106. This system 162 includes a duct 164 having therein hollow vanes 165, through which a secondary working fluid or coolant 166 is circulated. In the usual design, the working fluid 166 will be water. The hot exhaust gases 160 from the thrust modules 102a and 102b flow through duct 164, impinging hollow vanes 165 and thus heating the fluid 166 therein. It may be convenient to design the system 162 as a boiler so that the fluid 166 changes state, i.e., water becomes steam, as it is heated, and in such cases the stream indicated as coolant out will be steam, suitable for use in heating, or in mechanical applications such as steam turbines.

An external support structure including legs 170 and 172 provide the necessary structural support to enthalpy extraction system 162. Additionally, support structures 174 and 176 provide structural support for upper support structure 123 and interrelated components which house the upper shaft portion 104a.

For convenience, it may be desirable to locate legs 170 at grade 178 level, and provide a utility vault 180 for containment of gear-box 150 as well as generator 154 and starter 158.

Figure 2:
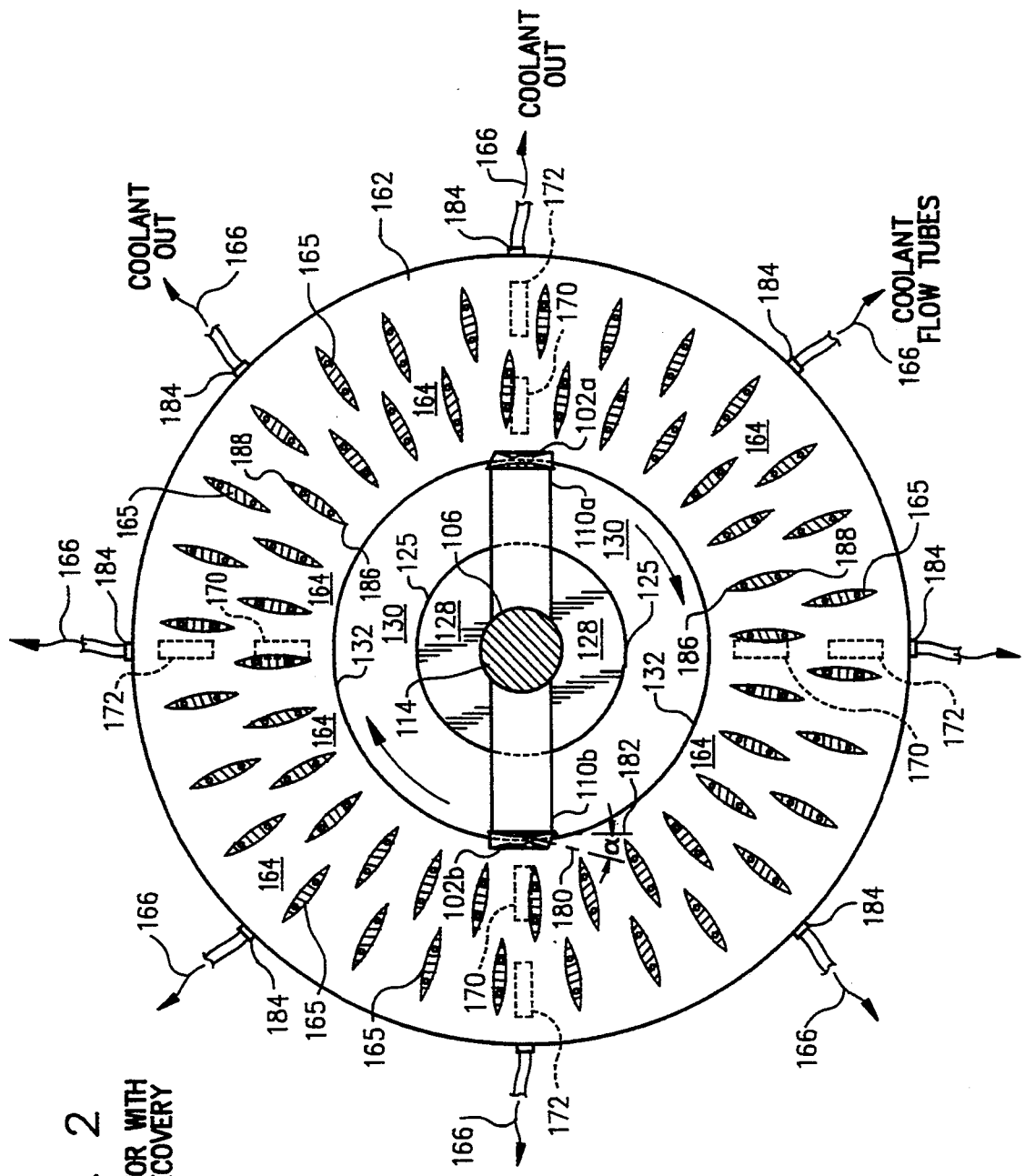
FIG. 2 is a horizontal cross section of the power plant apparatus, taken through line 2—2 of FIG. 1, more clearly showing the location of the ramjet thrust modules, a two-armed biplane rotor, the central hub and shaft, air flow ducts, and the heat transfer elements used for cooling exhaust gases.

Certain important features of the enthalpy extraction system 162 are more clearly seen in FIG. 2, which is a horizontal cross section of the power plant apparatus, taken through line 2—2 of FIG. 1. The lower rotor portions 110a and 110b of biplane rotor 106 are shown, joined by hub 114. Upper surface 128 of lower housing support 125 can be seen below rotor portions 110a and 110b. The location and configuration of the ramjet thrust modules 102a and 102b can be clearly seen. Air flow duct 130 provides upflow air supply.

The exhaust thrust vector 180 of the exhaust 160 from thrust module 102a, relative to the tangential direction 182 to the circumference of rotation of rotor 106, may be outward by any predetermined angle alpha ($\alpha$) which is convenient in the overall operational efficiency of the plant. The actual angle alpha ($\alpha$) utilized is determined by the selected location of the various heat transfer conduits, and by the use of a reaction turbine (if any) as described herein below. The angle alpha ($\alpha$) chosen is important since it helps to direct exhaust gases 160 more toward the exhaust duct 164.

As illustrated, the coolant outlet conduits 184 are spaced radially outward from a central axis 152 and are located at the periphery of the heat exchange section of duct 164; however, it will be appreciated that the coolant inlet and outlets may be varied as convenient for a given installation and still accomplish desired heat exchange between a secondary fluid and the escaping exhaust gases. At the extremely high thrust velocities which will be encountered, an aerodynamically appropriate heat exchanger shape such as convex fins 165, having a leading edge 186 and a trailing edge 188 in the direction of exhaust gas 160 flow, will help reduce backpressure on the heat exchange system 162.

Figure 3:
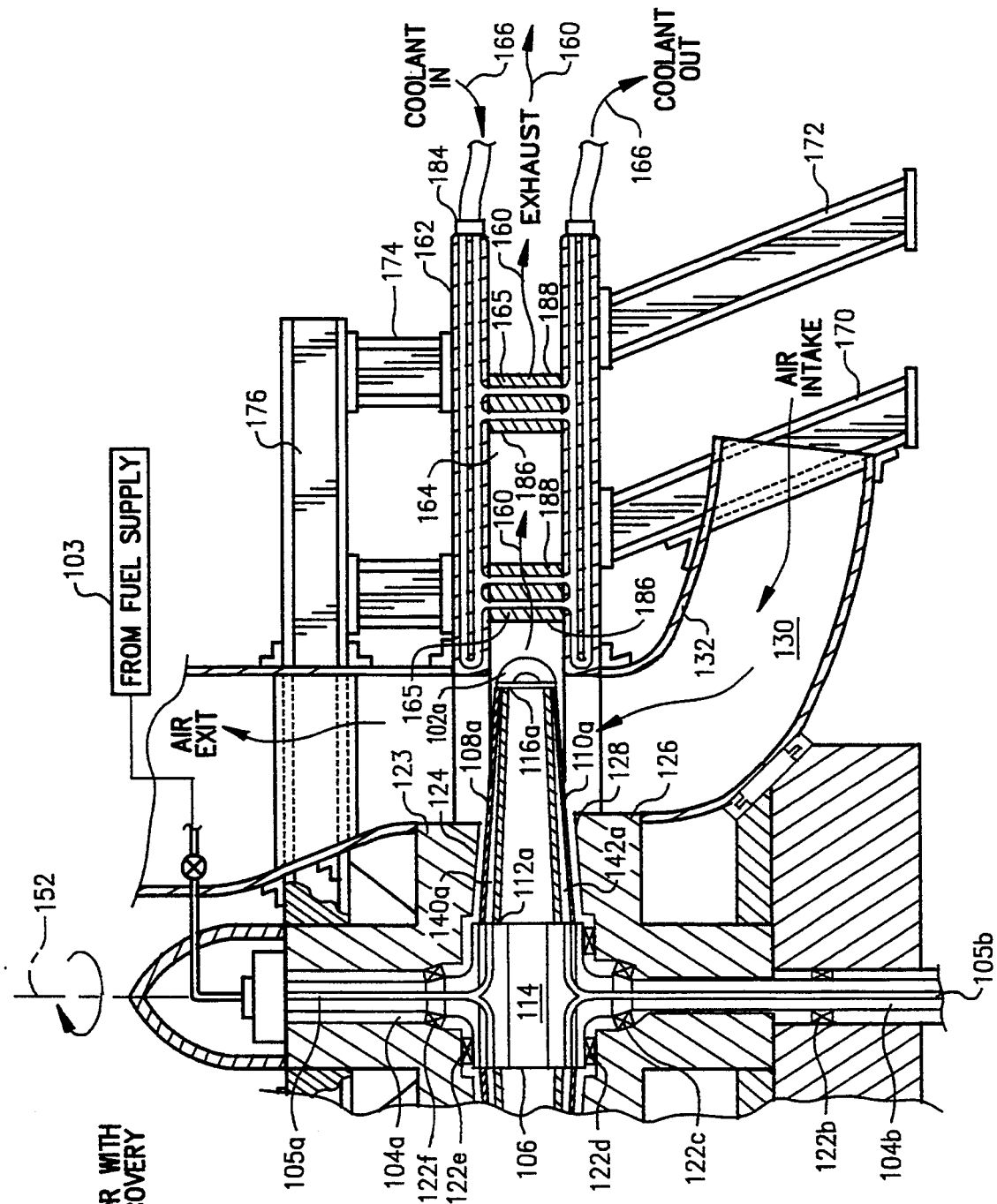
FIG. 3 is an enlarged detail of the power plant apparatus similar to that first shown in FIG. 1, showing in enlarged detail the ramjet thrust module, a biplane rotor, a central hub, a rotating shaft, air flow duct system, and the heat transfer elements for cooling exhaust gases.

Turning now to FIG. 3, an enlarged detail, similar to the view first set forth in FIG. 1, is provided. This enlarged drawing provides further detail of the ramjet thrust module 102a, the biplane rotor portions 108a and 110a, central hub 114, rotating shaft portions 104a and 104b, and the heat transfer device 162 used for cooling exhaust gases 160.

No Heat Recovery Configuration

Figure 4:
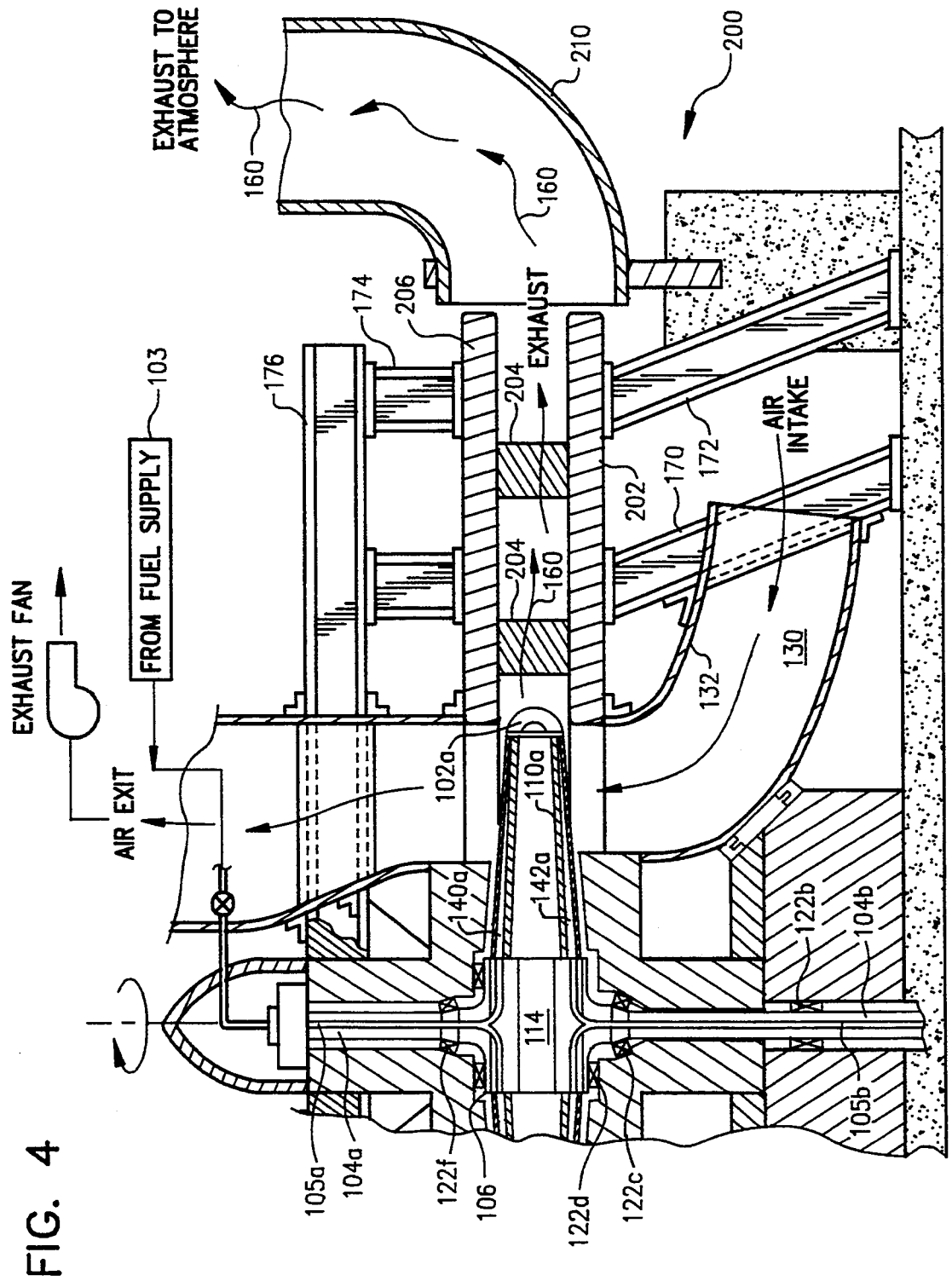
FIG. 4 is an enlarged detail of a power plant similar to the one illustrated in FIG. 3; however, in FIG. 4, the plant does not include a heat transfer section for cooling exhaust gases.

FIG. 4 is an enlarged detail of a power plant 200 similar to the one first illustrated in FIG. 3; however, in FIG. 4, the plant 200 does not include a heat transfer section for cooling exhaust gases. Support structures 170 and 172 provide support to exhaust duct forming members 202, which in turn supports finned elements 204 and upper duct forming member 206. The upper duct forming member 206 provides support to an upper support structure 174 and 176, just as in the earlier illustrated embodiments. One important feature first illustrated in this embodiment is the use of an exhaust duct 210 for containing therein the exhaust gases 160 for transport to an atmospheric release or further treatment point.

Biplane Rotor Construction

Figure 5:
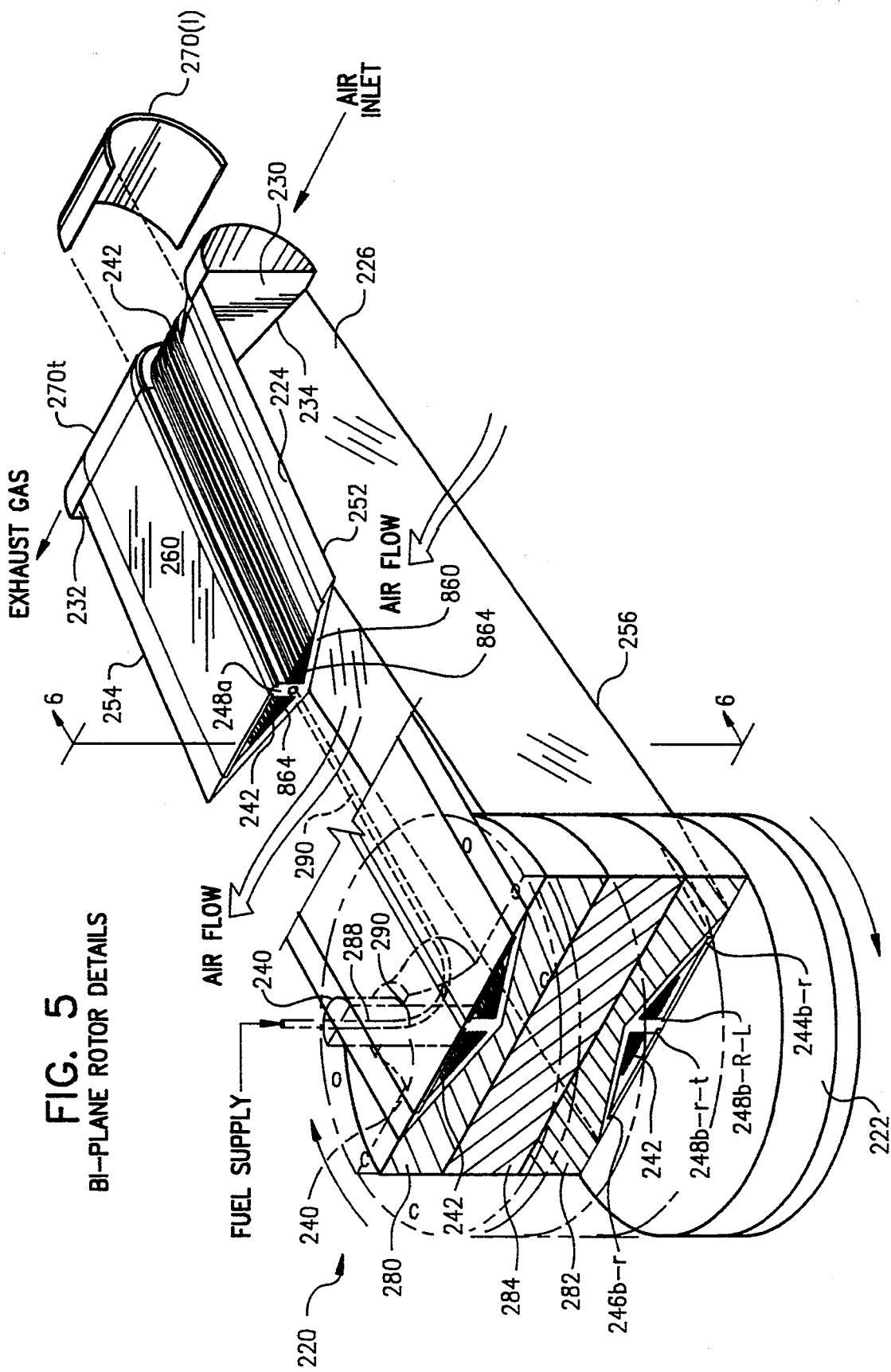
FIG. 5 is a partial isometric view of a biplane rotor of the type provided in the power plant apparatus of FIG. 1 above. This figure shows the central hub structure, the upper and lower biplanes, the carbon fiber windings located inside the biplanes, and the ramjet thrust module mounted at the distal end of the biplanes.

The construction of one embodiment of the biplane rotor of the present invention is shown in FIG. 5 and FIG. 6.

FIG. 5 is a partial isometric view of a biplane rotor 220 of the type provided in the power plant apparatus 100 and 200 of FIGS. 1 through 4, respectively, above. In FIG. 5, a central hub structure 222 is shown having connected thereto upper 224 and lower 226 biplane portions. This design utilizes a biplane configuration which is carefully shaped to minimize aerodynamic drag of rotor 220; the design will be further discussed herein below. Each of the biplane portions 224 and 226 are generally triangular in chordwise cross-sectional shape. It can also be seen in FIGS. 5 and 6 that the upper 224 and lower 226 portions of the biplane rotor 220 are separated by an air gap "G" which accommodates air flow therethrough. A ramjet type thrust module 230 is affixed to the distal ends 232 and 234 of upper 224 and lower 226 biplane portions, respectively. Thus, it can be seen that the rotor 220 is a carefully designed low drag structural member which constrains the thrust modules 230 to rotate with, and about the axis provided by, the high speed shaft portion 240.

The high tip speeds at which a rotor 220 must run in my power plant design in order to realize its superior performance levels necessarily induces very high stress levels in the rotor 220 and in the thrust module 230. As a result, rotor 220 stress levels represent a critical design and operational problem. The thrust modules 230 and rotor 220 are based on unique structural concepts and must be carefully designed to ensure achievable and safe material stress margins.

In the embodiment illustrated in FIGS. 5 and 6, carbon fiber windings 242 are located within the upper 224 and lower 226 biplane portions. Ideally, these carbon fiber windings 242 run continuously from tip to tip (i.e., from the outer side of one thrust module to the outer side of the opposite thrust module) of the rotor portions 224 and 226, so as to form a high strength member to restrain the thrust modules 230, as well as to reduce stress in other rotor materials to survivable levels. To provide sufficient rigidity to rotor portions 224 and 226, a metal matrix composite material such as silicon carbide reinforced titanium may be utilized to form the inlet 244a and 244b and outlet 246a and 246b walls of the rotor, as well as centrally located vertical structural members 248a and 248b. As shown, the upper leading edge portion 252, upper trailing edge portion 254, and lower leading edge portion 256 and lower trailing edge portion 258 each have a recessed portion denoted with suffix "r". Likewise, the centrally located vertical members 248a and 248b have leading and trailing (noted here and otherwise where appropriate with suffix "l" for leading or "t" for trailing edge portions, respectively) portions with recesses therein (noted in the figures with the suffix "r" for recessed). The various recessed portions are configured to receive therein in a flush fitting fashion the respective upper protective covers 260t and 260(l) and lower protective covers 262t and 262(l). The protective covers 260t, 260(l), 262(t), and 262(l) are designed to provide an aerodynamically smooth upper 266 and lower 268 surface, while protecting the carbon filaments 242 from oxidation. Protective end caps 270(l) and 270t on thrust module 230 perform a similar function, and likewise fit the aforementioned recesses to the extent applicable. Each of protective covers 260t, 260(l), 262t, and 262(l) as well as protective caps 270(l) and 270t are securely affixed to the respective metal matrix composite portions, preferably by brazing or welding thereto so as to seal any seams between the various covers and the substrate rotor portion.

Hub portion 222 may be constructed of opposing sandwich portions 280 and 282 (which are configured to accept therein the upper rotor 224 and lower rotor 226) and a central solid portion 284. Each of the aforementioned sections of the hub portion 222 may be constructed of materials suitable for the anticipated structural loading at the design centrifugal loadings. For the hub itself, conventional materials such as high strength steel may be sufficient in most applications.

Upper shaft portion 240 has therein an interior wall 288 which defines a conduit 290. The conduit 290 is used as a passageway for fuel to flow to the thrust module 230. As the upper shaft portion 240 transitions to sandwich portion 280, conduit 290 turns from vertical to radial, and is positioned near the center of central metal matrix composite strengthening portions or "gutters" 248a and 248b. The cross-sectional area of conduits 290 may be varied as necessary to accommodate the compressibility of the fuel being transported, so as to assure that fuel reaches thrust modules 230 at an adequate pressure.

Thrust Module Construction

The thrust modules 102a, 102b, and 230 shown above, and similar versions shown hereinafter, are critical components of my power plant design. Referring now to FIG. 7, a perspective view of the distal end of a biplane rotor 220 is shown with a ramjet thrust module 230 attached thereto.

FIG. 8 is a horizontal cross section, taken through line 8—8 of the ramjet thrust module 230 of FIG. 7, looking downward at the construction of the thrust module 230.

The thrust module(s) 230 is(are) the prime mover(s) of the instant power plant invention. For a variety of reasons, it is convenient to construct the thrust modules 230 as fixed geometry ramjets. The ramjet propulsion cycle and high rotor 220 tip speeds provide the thermodynamic basis for the superior efficiency and performance of my power plant over prior art gas turbines, steam turbines and piston engines.

The ramjet 230 has five basic operational regions from front to rear along the air/combustion gas flow path centerline 30, as follows:

1) the inlet 302, through which air is admitted to the thrust module 230 and in which the velocity of the incoming air stream 304 is reduced as ram air pressure is developed;
2) the transition section 306, where the air flow slows and reaches mach 1.0 (M=1);
3) the combustor 308, which includes a flame holder 310 (fuel is introduced into the combustion zone and hot combustion gases are released from the combustion zone);
4) the throat 312, where the exit exhaust gas flow is choked; and
5) the nozzle 314, through which combustion gases 316 are ejected rearward at high velocity.

Construction of the thrust module 230 may be better understood by reviewing a series of cross-sectional views taken along the length of the module 230.

Figure 9:
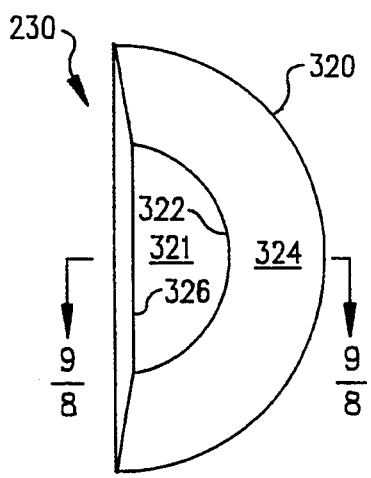
FIG. 9 is a vertical view, looking rearward in the direction of the exhaust in the thrust module of FIG. 7, taken at the station indicated by line 9—9 in FIG. 8. This view shows the interior air flow path of the thrust module.

FIG. 9 is a vertical cross-sectional view, looking rearward in the direction of the exhaust 316 in the thrust module 230 of FIG. 7, taken at the station indicated by line 9—9 in FIG. 8. This view shows the leading edge 320 of thrust module 230, and the minimum cross-sectional area of the interior air flow passageway 321, defined by an innermost interior surface 322 of sloping transition section 306 wall 324, and by the outermost surface 326 of the inlet ramp of thrust module 230.

Figure 10:
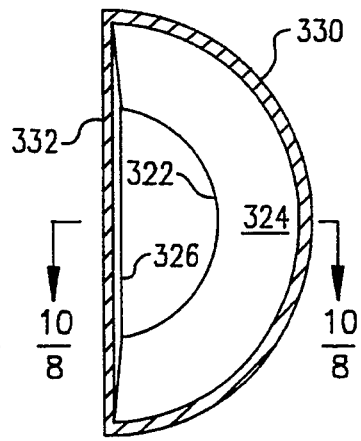
FIG. 10 is a vertical cross-sectional view, looking rearward in the direction of the exhaust, cut through the thrust module of FIG. 7, taken at the station indicated by line 10—10 of FIG. 8. This view shows the thickening wall portions of the thrust module at this station, as well as the air flow path already seen in FIG. 9 above.

FIG. 10 is a vertical cross-sectional view, looking rearward in the direction of the exhaust 316, cut through the thrust module 230 of FIG. 7, taken at the station indicated by line 10—10 of FIG. 8. This view shows the thickening inlet wall portions 330 and 332 of the thrust module 230, as well as the air flow passageway 321 already seen in FIG. 9 above.

Figure 11:
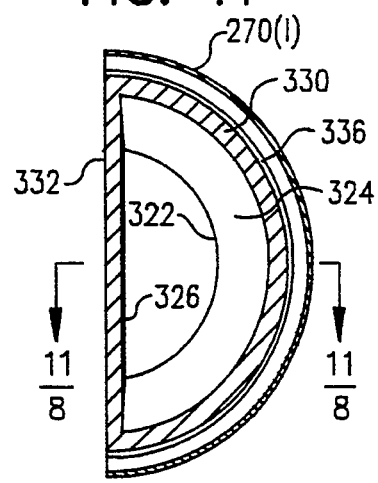
FIG. 11 is a vertical cross-sectional view, looking rearward in the direction of the exhaust, cut through the thrust module of FIG. 7, taken at the station indicated by line 11—11 of FIG. 8. This view shows the outer cap of the thrust module, as well as the first layer of the reinforcing carbon fiber windings which wrap around the end of the thrust module.
Figure 12:
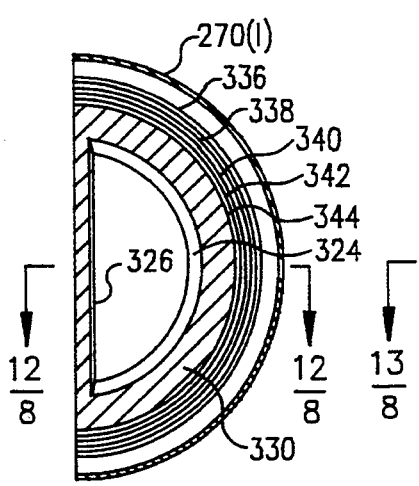
FIGS. 12 through 15 are vertical cross-sectional views, looking rearward in the direction of the exhaust, cut through the thrust module of FIG. 7, taken at the stations indicated by reference of FIG. 8, similar to FIGS. 9 through 11 above.
Figure 13:
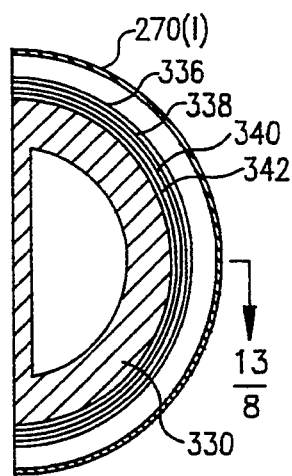
Figure 14:
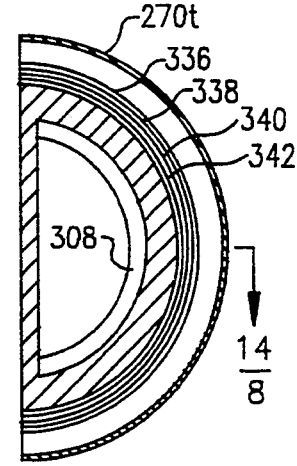
Figure 15:
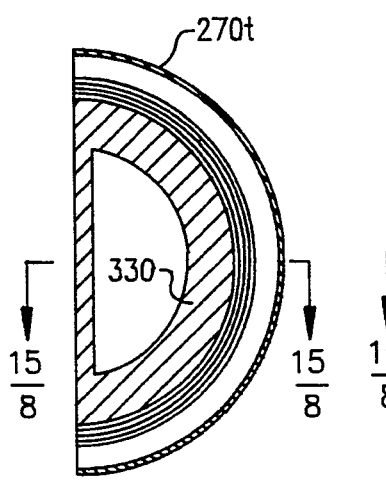

FIG. 11 is a vertical cross-sectional view, looking rearward in the direction of the exhaust 316, cut through the thrust module 230 of FIG. 7, taken at the station indicated by line 11—11 of FIG. 8. This view shows the outer cap 270($l$) of the thrust module 230, as well as the first layer 336 of the reinforcing carbon fiber windings 242 which wrap around the end of the thrust module 230.

FIGS. 12 through 15 are vertical cross-sectional views, looking rearward in the direction of the exhaust, cut through the thrust module 230 of FIG. 7, taken at the stations indicated by reference of FIG. 8, similar to FIGS. 9 through 11 above. FIGS. 12 through 15 show the varying thickness of the reinforcing carbon fiber windings 242 (carbon fiber layers 336, 338, 340, 342, and 344) as well as the shape of the interior of the thrust module air flow path 321.

Figure 16:
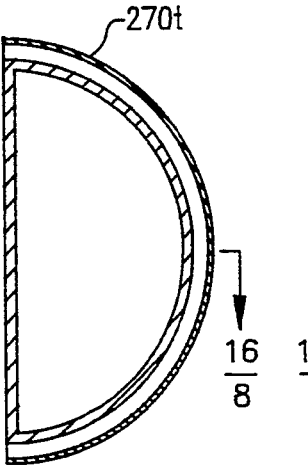
FIG. 16 is a vertical cross-sectional view, looking rearward in the direction of the exhaust, cut through the thrust module of FIG. 7, taken at the station indicated by line 16—16 of FIG. 8. This view shows the outer cap of the thrust module, as well as the shape of the interior of the thrust module air flow path, at this point in the exhaust section.

FIG. 16 is a vertical cross-sectional view, looking rearward in the direction of the exhaust, cut through the thrust module 230 of FIG. 7, taken at the station indicated by line 16—16 of FIG. 8. This view shows the outer cap 270$t$ of the thrust module 230, as well as the shape of the interior of the thrust module 230 air flow path 321 at this point in the exhaust section.

Figure 17:
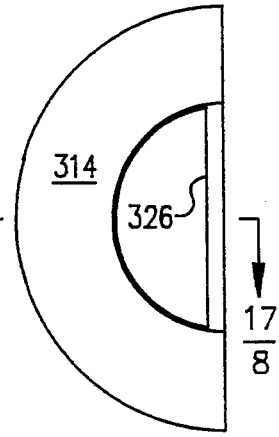
FIG. 17 is a vertical view, looking forward in the direction of the air inlet from the rear of the thrust module of FIG. 7, taken at the station indicated by line 17—17 of FIG. 8.

FIG. 17 is a vertical view, looking forward toward air inlet 304 from the rear of the thrust module 230 of FIG. 7, taken at the station indicated by line 17—17 of FIG. 8.

Startup of Ramjet

For startup, an auxiliary power system is used to accelerate the rotor 220 and thrust module 230 to a sufficiently high rotating speed so that the ramjet operation of thrust module 230 can be initiated. Attention is again referred back to FIG. 1, where it can be appreciated that the rotating components are designed with sufficient strength to allow the starter motor 158 to accelerate the rotor 106 and thrust modules 102$a$ and 102$b$ up to a sufficient speed so as to support ramjet operation. The required airspeed of thrust modules to begin ramjet operation will vary widely depending upon a specific design, however airspeeds in the more narrowly defined range of mach 1.5 to 2.0 might be expected to provide adequate starting behavior for the ramjet configurations described herein.

After the thrust module(s) 102$a$ and 102$b$ begin to generate sufficient thrust, the starter motor 158 can be switched to a power generating mode of operation, and generate power along with the primary generator.

The power plant system requires a fuel control valve 350 to adjust the fuel to air mixture, as this ratio varies with both the thrust module 102$a$ and/or 102$b$ tip speed and with desired system output power levels. In my power plant design, the entering fuel is compressed by centrifugal forces as it flows through passages 140$a$, 140$b$, 142$a$, and 142$b$ in rotor 106 outward toward the thrust modules 230. This is particularly important where a gaseous fuel such as methane is utilized.

As a result of the compression of fuel, and due to the compression of incoming air, the startup of the thrust modules 102$a$ and 102$b$ must be carefully attended to by the designer. Several options for accomplishing this task are addressed in FIGS. 18 through 24.

FIG. 18 is a horizontal cross-sectional view, similar to the view first set forth in FIG. 8 above, showing a first alternate configuration for the interior of a ramjet thrust module 360, utilizing a reverse Laval internal contraction type inlet. Note in particular the shape of the inlet 362 and transition 364 surfaces FIG. 18 also shows the outermost areas requiring carbon fiber 366 or similar reinforcement for safe operation at normally encountered centrifugal loads.

FIG. 19 is a horizontal cross-sectional view, similar to the view first set forth in FIG. 8 above, showing a second alternate configuration for a ramjet thrust module 370, utilizing a mixed contraction type inlet, wherein the interior leading edge 372 creates a shock wave 374 which exactly impinges upon the exterior leading edge 376 so as to contain the reflected shock 377 within the inlet area. FIG. 19 also shows areas requiring carbon fiber 378 reinforcement for operation in the present invention.

In FIG. 20 a detailed horizontal cross-sectional view, similar to the view first set forth in FIG. 8 above, shows a third alternate configuration for the interior of a ramjet thrust module 380, utilizing an ejector augmented flow path. Here, an ejectant 382 may be supplied to augment the fluid flow through the combustor section 384 of the ramjet 380. In some cases, the ejectant 382 may be necessary to induce airflow to start through the ramjet 380. The FIG. 20 also shows areas requiring carbon fiber 386 reinforcement for operation in the present invention.

Figure 21A:
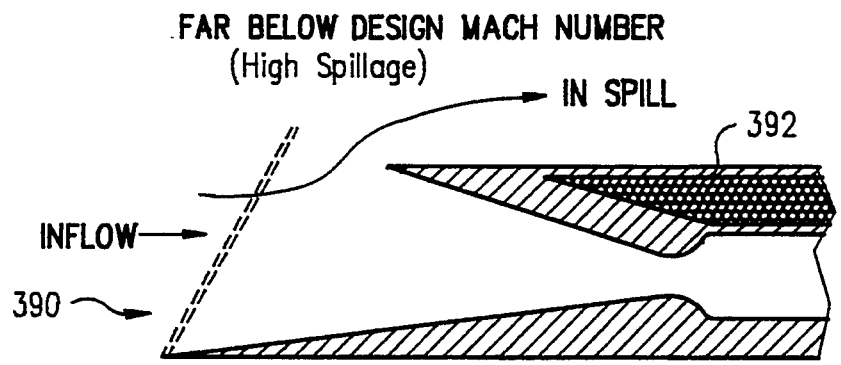
FIGS. 21A, 21B, and 21C illustrate air flow spillage and shock wave location for the startup of a mixed contraction inlet ramjet thrust module. The mixed contraction inlet is similar to the second alternate thrust module configuration first illustrated in FIG. 19 above. The figure also shows areas requiring carbon fiber reinforcement for operation in the present invention.
Figure 21B:
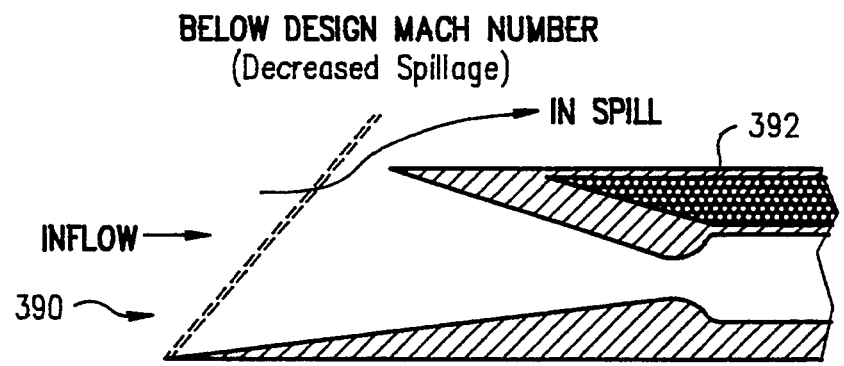
Figure 21C:
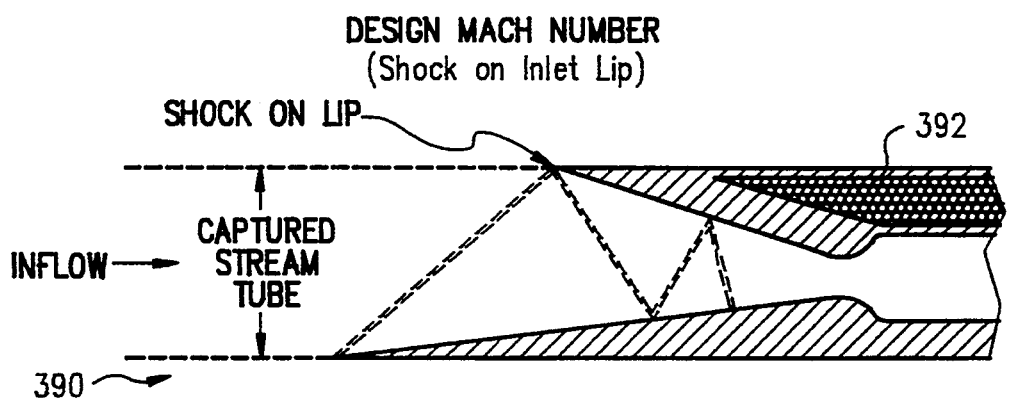

FIGS. 21A, 21B, and 21C illustrate air flow spillage and shock wave location for the startup of a mixed contraction inlet ramjet thrust module 390. The mixed contraction inlet ramjet 390 is similar to the second alternate thrust module 370 configuration first illustrated in FIG. 19 above. These FIGS. 21A, 21B, and 21C also show areas requiring carbon fiber 392 reinforcement for operation in the present invention.

FIG. 21A shows shock wave location and spillage for operation of a ramjet thrust module 390 at an airspeed well below design math number. The FIG. 21A also shows areas requiring carbon fiber 392 reinforcement for operation of the present invention.

FIG. 21B shows shock wave location and spillage for operation of a mixed contraction inlet ramjet 390 slightly below design mach number. The figure also shows areas requiring carbon fiber 292 reinforcement for operation in the present invention.

FIG. 21C shows the shock wave location and the captured airstream tube as would be present in the operation at design mach number of a ramjet engine 300 having a mixed contraction inlet.

Figure 22:
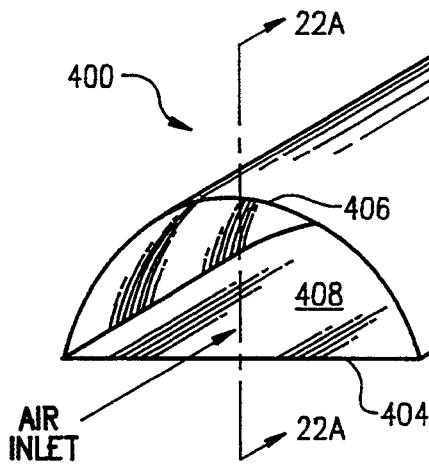
FIG. 22 illustrates the airflow configuration for an internal contraction inlet ramjet. The figure also shows areas requiring carbon fiber reinforcement for operation in the present invention.
Figure 22A:
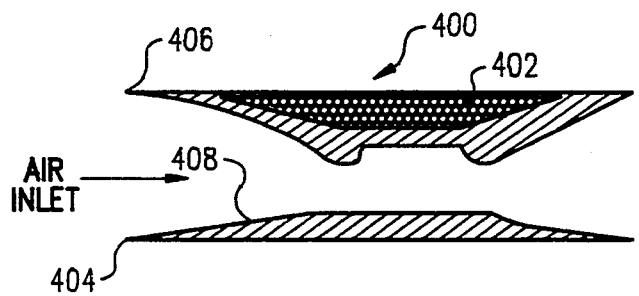
FIG. 22A illustrates a generalized cross section configuration of an internal contraction type ramjet thrust module, similar to that first illustrated in FIG. 8 above. The figure also shows areas requiring carbon fiber reinforcement for operation in the present invention.

FIG. 22 illustrates the airflow configuration for an internal contraction inlet ramjet 400. FIG. 22A illustrates a generalized cross section configuration of an internal contraction type ramjet thrust module 400, taken across section 22A—22A of FIG. 22; it is similar to that first illustrated in FIG. 8 above. FIG. 22A also shows areas requiring carbon fiber 402 or other appropriate reinforcement for operation in the present invention. Note that an imaginary line drawn between the leading edges of interior 404 and exterior 406 wall inlets form a plane perpendicular to the free stream airflow. The inflow air stream is compressed up an inlet ramp 408, and as will be seen in FIGS. 33 and 34 below, inlet shocks are captured well inside the ramjet 400.

Figure 23:
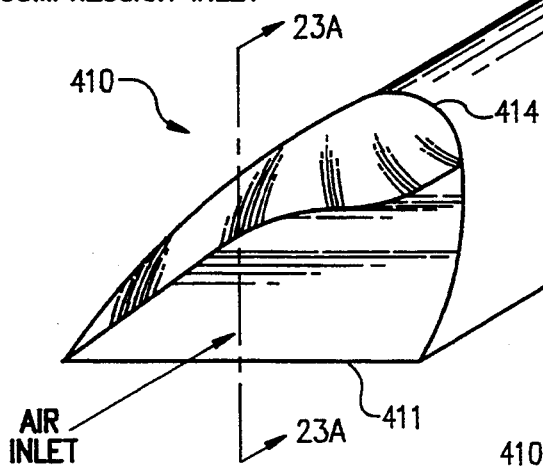
FIG. 23 illustrates the airflow configuration for a self-starting, mixed compression inlet ramjet thrust module.
Figure 23A:
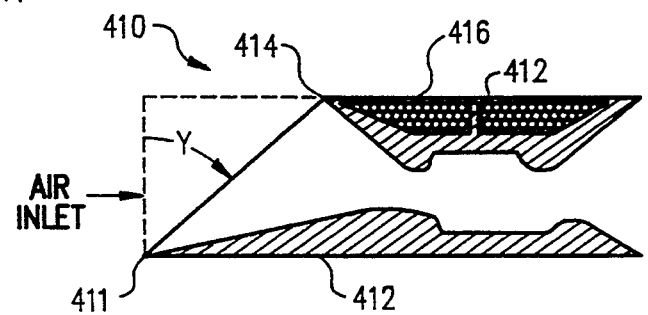
FIG. 23A illustrates a generalized cross section configuration of a mixed compression type ramjet thrust module, similar to that first illustrated in FIG. 8 above.

FIG. 23 illustrates the airflow configuration for a self-starting, mixed compression, inlet ramjet thrust module 410. FIG. 23A illustrates a generalized cross section configuration of a mixed compression type ramjet thrust module 410, taken across section 23A—23A of FIG. 23. This is an alternate configuration to the type of ramjet design first illustrated in FIG. 8 above. As before, use of carbon fiber windings 412 or other high strength techniques are required to provide adequate structural strength to withstand the forces encountered at high rotational speeds. In the mixed compression inlet ramjet 410, a rake angle Y is provided so that the lip 411 of the interior inlet wall 412 and the exterior inlet wall 414 are offset by the angle Y so that the shock caused by the inlet wall 412 is captured by lip 414 of the exterior wall 416 when the ramjet 410 is operating at the design Mach number.

Figure 24:
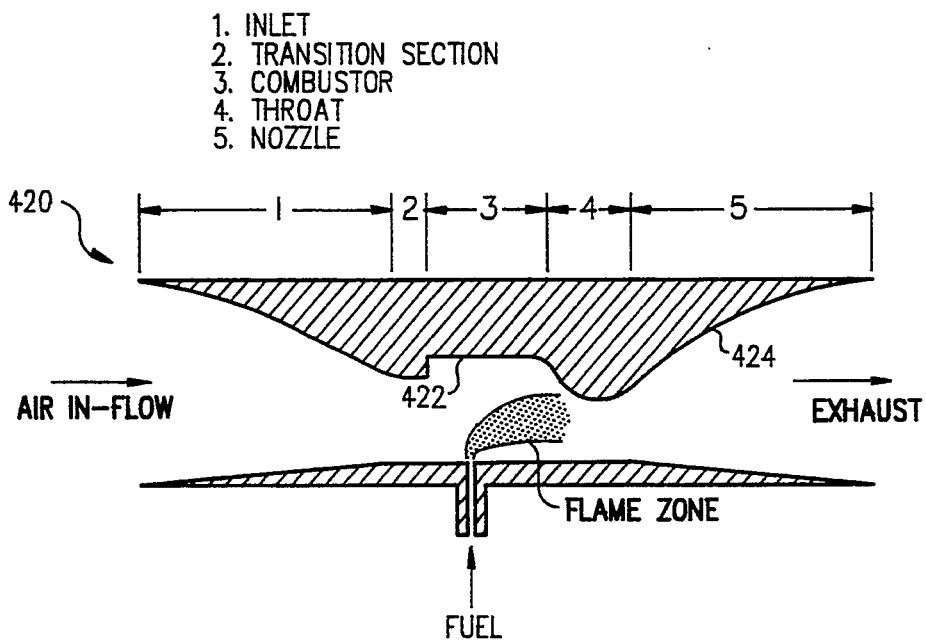
FIG. 24 shows a generalized cross section configuration of an internal compression type ramjet thrust module, similar to that first illustrated in FIG. 8 above, now showing the combustor location in the thrust module, as well as describing other regions of the nozzle.

FIG. 24 shows a generalized cross section configuration of an internal compression type ramjet thrust module 420, similar to that first illustrated in FIG. 8 above, now showing the combustor 422 location in the thrust module, as well as describing several key regions including nozzle 424. For reasons set forth below, this type of configuration of thrust module has certain advantanges for operation of the present invention.

To summarize the discussion of FIGS. 18 through 24, two basic classes of inlets have been introduced: (a) internal compression inlets, and (b) mixed compression inlets. It is well established that, in general, optimal internal contraction inlets will not start at their design Mach number. In order to establish the desired internal shock structure, the inflow must either be accelerated to a Mach number greater than the design Mach number and then reduced after starting to the design Mach number, or the throat area must be temporarily increased to "swallow" the shock structure and thus induce startup. Depending upon the contraction ratio and Mach number, it may be impossible to increase the inflow Mach number to a sufficiently high level so as to start the inlet.

Also, due to the centrifugal loads associated with full speed operation, although it might be possible with some difficulty, it is undesirable to provide a variable geometry mechanism to provide the increased area necessary for startup, as such a mechanism would add additional weight and use up valuable space. In the absence of a workable variable geometry mechanism and without the ability to sufficiently overspeed the inlet so as to start it, ejector augmention would be required to "start" an internal contraction inlet.

Alternatively, a mixed compression inlet could be designed which would "self start." The mixed compression type inlet, as shown in FIGS. 21A, 21B, 21C, 23, and 23A, does not require overspeed or a variable geometry throat to start. It can be designed so that the shock structure progressively reaches its desired position as indicated in FIGS. 21A, 212B, and 21C and is fully started when the inlet reaches its design mach number.

Due to the absence of strong shocks in properly designed internal compression inlets, internal compression inlets are generally more efficient than mixed compression inlets. However, the difficulty associated with starting the internal contraction inlet makes the "self-starting" mixed compression inlet a highly desirable alternate embodiment.

Theoretical Basis of Ramjet Design

With the foregoing general description of the apparatus and method of operation of several embodiments of a power plant system serving to set forth the basic elements of the present invention, before other embodiments and variations are described, it will be useful to consider to an appreciable extent the theoretical analysis of the instant system. Accordingly, the following analysis is offered by way of explanation and is not intended to expressly or impliedly limit the scope of the invention.

There are several fundamental factors which are important to the over-all thrust module design and operation. Such factors include: (a) mach number, (b) power output variability, (c) fuel type, and (d) maximum allowable combustion temperatures.

In the design of the thrust module, the Mach mumber must be selected, and the design must then include sufficient structural and material selection and tolerances to allow for acceleration to and operation at the desired operational velocity. The Mach number is commonly determined by the following equation:

$$M = v/\alpha \tag{1}$$

The required variations in thrust module output, and the resultant plant system power output, must be understood and accommodated.

The fuel type to be used must be determined, and the fuel feed system must accommodate the fuel type selected. Additional factors to be considered in fuel system design are compressibility, temperature, corrosion or erosion tendencies, and similar fluid flow phenomenon of a specific fuel type.

The fuel type selection will also in large part determine the combustion temperatures, and thus dictate the required materials or influence structural requirements to accommodate the anticipated exhaust gas temperatures.

As noted above, in its simplest form, the thrust module is a fixed geometry ramjet. The operation of such a ramjet engine 500 is depicted schematically in FIG. 25. In order to easily understand the ramjet 500 operation, it is convenient to assume that the ramjet 500 is stationary and that an airstream 502 flows toward the ramjet at velocity $v_0$. Then, consider that the approaching stream of air is of sufficiently large cross section so that the pressure is atmospheric along the boundaries of the control volume. (See FIG. 25.)

The air flow around the outside of the thrust module 500 suffers momentum losses due to skin friction, so that the mean velocity $v_7$ of the external air (not in exhaust gas stream) at station 6 is less than $v_0$. This momentum loss constitutes the viscous drag on the exterior of the thrust module. Such viscous loss cannot be avoided without the use of complicated boundary layer bleed orifices on the external surface of the module. However, since such bleed orifices are presently complex and expensive, in view of the fact that such viscous losses are reasonably low, it is unnecessary to include a boundary layer control system to accomplish acceptable baseline power plant operational efficiencies.

Potential pressure drag, due to a change in a cross-sectional area or a change in a local pressure field, is of greater concern. At the operational speeds of the present power plant, the effect of such an area or pressure variation is aerodynamic drag. Pressure drag can easily exceed the above discussed viscous drag by several orders of magnitude. Thus, avoidance of pressure drag is quite important. Therefore, my thrust module 500 has been developed to minimize pressure drag by constructing the thrust module 500 of a constant external cross-sectional shape (i.e., the shape and size is repeated when sequentially examined in cross section perpendicular to the axis of flow (spanwise) from a forward cross section to a rearward cross section). This construction technique is apparent by examination of the cross sections shown in FIGS. 8 through 17 above.

The ramjet inlet section captures and compresses an impinging inlet air stream. The compressed air stream thus provides the oxidant for mixing with a fuel which is supplied to the ramjet thrust modules 500 in the form of a convenient fuel source such as natural gas (consisting of essentially methane). The fuel is oxidized in the thrust module(s) to produce combustion gases. The gases expand, and the exhaust gas flow escapes at high velocity $v_5$ to create thrust. This exhaust gas flow velocity changes to $v_6$ when pressure equilibrium with the atmosphere is established.

Figure 25:
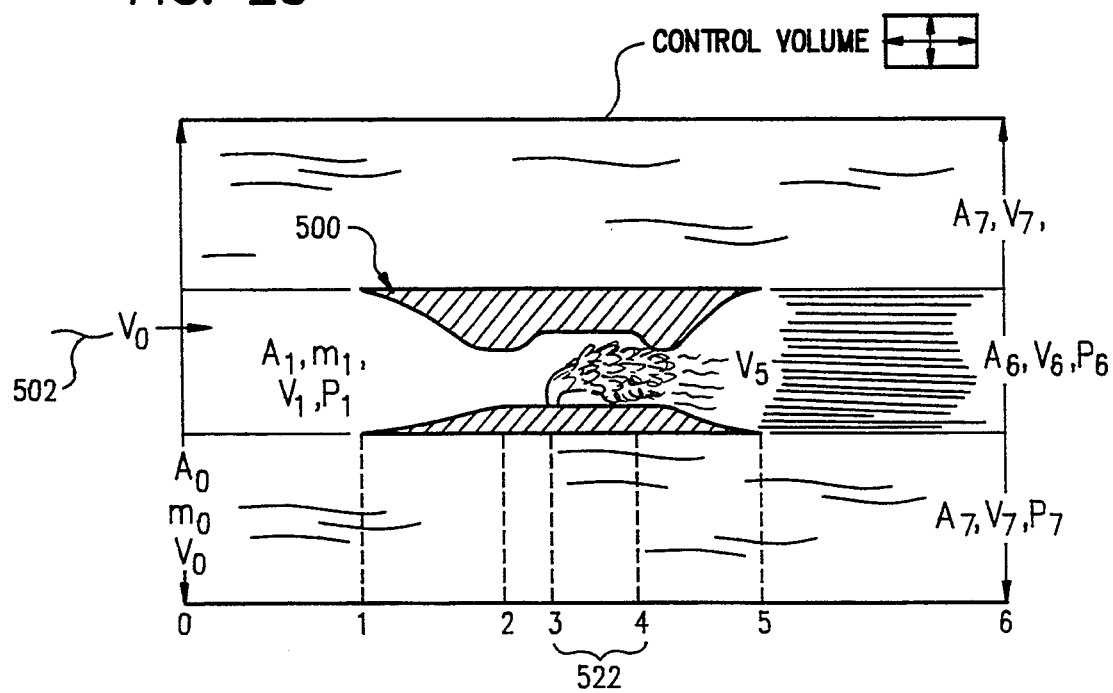
FIG. 25 shows a generalized cross section configuration of an internal compression type ramjet thrust module, similar to that first illustrated in FIG. 24 above, further describing the various regions of the thrust module.

From FIG. 25 it is apparent that the thrust of the engine is equal to the difference between the momenta of the gases passing through reference stations 6 and 0. Thus $$F=(\dot{m}_0-\dot{m}_1)v_7+(\dot{m}_1+\dot{m}_f)v_6-\dot{m}_0 v_0 \quad (2)$$

or $$F=\dot{m}_1(v_6-v_0)+\dot{m}_f v_6-(\dot{m}_0-\dot{m}_1)(v_0-v_7) \quad (3)$$

The last term in equation (3) represents the momentum loss due to external drag as discussed above. This term can become prohibitively large if due care is not exercised in configuring the thrust module portion of the system.

In the ideal case, the inlet and exhaust are expanded so that the pressures are ambient; then $$A_0=A_1 \quad (4)$$

and $$A_5=A_6 \quad (5)$$

Therefore, the net thrust of the thrust module is $$F=\dot{m}_1(v_6-v_0)+\dot{m}_f v_6 \quad (6)$$

However, as a practical matter, equations (4) and (5) do not always hold, and it is found that the equation for thrust should include a term involving the difference in pressure between the inlet and exit. In such cases, $$F=\dot{m}_1(v_6-v_1)+\dot{m}_f v_6+(p_6 A_6-p_1 A_1) \quad (7)$$

However, the current embodiment of the thrust module can be adequately developed on the basis that equations (4) and (5) both apply. The similarity of equation (7) to the expression for rocket thrust will be apparent to those skilled in the art of high speed and space propulsion systems. While such a rocket type thrust module will achieve many of the objectives of the present invention, and my power plant concept is directly applicable thereto, due to the need in a rocket to make provisions for external supply of oxidant, as well as increased drag experienced in such a design, the currently preferred embodiment is considered to be a ramjet thrust module 500.

Ramjet thrust calculations are considerably more complicated than are the calculations for rockets. This is because in ramjets, the exhaust geometry and gas velocity depend upon the interaction and balance between the pressure developed in the ramjet inlet and the pressure developed in the ramjet combustor.

In a ramjet, the stream thrust T at a particular cross section in the ramjet flow path is defined by the equation.

$$T=pA+\dot{m}v=pA(1+\gamma M^2) \quad (8)$$

The stream thrust T is a particularly useful quantity in ramjet calculations because the difference in stream thrust between two stations is equal to the thrust exerted in an axial direction on the duct walls between the inflow and outflow planes. The stream thrust T may also be expressed as a function of mass flow, stagnation temperature and Mach number. Thus $$T=\dot{m}\left(\sqrt{\frac{2(\gamma+1)}{\gamma}R_g T_t}\right)\phi(M) \quad (9)$$

where $$\phi(M)=\frac{1+\gamma M^2}{\sqrt{2(\gamma+1)M^2\left(1+\frac{(\gamma-1)}{2}M^2\right)}} \quad (10)$$

The Mach number goes to unity (M=1) at the transition section (station 2) and at the throat (station 4) of the nozzle.

Another method for determining stream thrust is to begin by defining a fuel specific impulse, $S_f$, and an air specific impulse, $S_a$, by the relations $$\dot{w}_f S_f = \dot{w}_a S_a = \dot{m} \sqrt{\frac{2(\gamma + 1)}{\gamma} R_g T_t} \quad (11)$$

With the quantities defined above and the equation of state, determination of stream thrust is possible. Thereafter, ramjet design calculations are straightforward but involve successive approximations. A procedure is summarized below to illustrate the method.

Using the engine configuration shown in FIG. 8 and assuming the design condition of an oblique shock system between stations 1 and 2, we may design an engine as set forth below.

With sonic conditions existing at the throat to the exit nozzle, it is most convenient to express the internal losses in terms of total pressure ratios, so that $$p_{t5} = p_{t0} \times \frac{p_{t1}}{p_{t0}} \times \frac{p_{t2}}{p_{t1}} \times \frac{p_{t4}}{p_{t2}} \times \frac{p_{t5}}{p_{t4}} \quad (12)$$

The free stream stagnation pressure ($p_{t0}$) is determined by the thrust module speed. The total pressure at the inlet inflow plane ($p_{t1}$) is generally equivalent to the free stream stagnant pressure ($p_{t0}$).

The inlet efficiency is the ratio of the total pressure at the outflow plane of the inlet ($p_{t2}$) divided by the total pressure at the inflow plane of the inlet ($p_{t1}$). The ratio of the total pressure at the throat of the nozzle ($p_{t4}$) to the total pressure at the outflow plane of the inlet ($p_{t2}$) defines the efficiency of the flow field between the inlet and the nozzle, and includes losses across the combustor 522 due to fuel injection, drag and heat addition. Those knowledgeable in the art may also estimate the efficiency from past experience with other systems. The total pressure ratio across the exit nozzle is the total pressure at the outflow plane of the nozzle ($p_{t5}$) divided by the total pressure at the inflow plane of the nozzle ($p_{t4}$).

In order to determine the net thrust of the thrust module, the difference between the stream thrust at stations 1 and 5 must be determined. Assuming that the nozzle exit is sized to provide an expansion to ambient pressure (i.e. $p_5 = p_0$), the exit Mach number at station 5 ($M_5$) may be determined from the ratio of static pressure at station 5 to total pressure at station 5 ($p_5/p_{t5}$). The exit stream thrust may then be expressed as:

$$T_5 = p_0 A_5 (1 + \gamma_5 M_5^2) \quad (13)$$

The exit stream thrust (thrust at station 5) may also be expressed:

$$T_5 = \dot{w}_a S_a \phi(M_5) \quad (14)$$

The air specific impulse ($S_a$) is a function of the inlet total temperature, the fuel, the fuel-to-air ratio, and the combustion efficiency. The inlet stream thrust may be expressed as:

$$T_1 = p_0 A_1 (1 + \gamma_0 M_0^2) \quad (15)$$

Defining the mass flow at the inlet, $$f(M_0) = \frac{\dot{w}_a \sqrt{T_{t0}}}{p_0 A_1} \quad (16)$$

More usefully, the inlet stream thrust may also be expressed as:

$$T_1 = \frac{\dot{w}_a \sqrt{T_{t0}}}{f(M_0)} (1 + \gamma_0 M_0^2) \quad (17)$$

Therefore, the net propulsive thrust of the ramjet is the difference between the stream thrust at stations 1 and 5, such that:

$$T_5 - T_1 = \dot{w}_a S_a \phi(M_5) - \frac{\dot{w}_a \sqrt{T_{t0}}}{f(M_0)} (1 + \gamma_0 M_0^2) \quad (18)$$

The net thrust is thus expressed in terms of the air flow captured by the inlet. The required inlet and exit areas may be determined from relations (13) and (15).

The combustion chamber cross-sectional area $A_2$ and the combustion chamber cross-sectional area $A_4$ is determined by the allowable pressure losses across the combustor. Because these pressure losses are excessive at high Mach numbers, the cross-sectional areas $A_2$ and $A_4$ must be selected to maintain low velocities, thus resulting in low pressure losses. Consequently, the most desirable values for $M_2$ (Mach number at station 2) may be selected from approximately 0.15 to 0.50; however, it may be possible to operate outside this range, normally with somewhat reduced efficiency.

Figure 26:
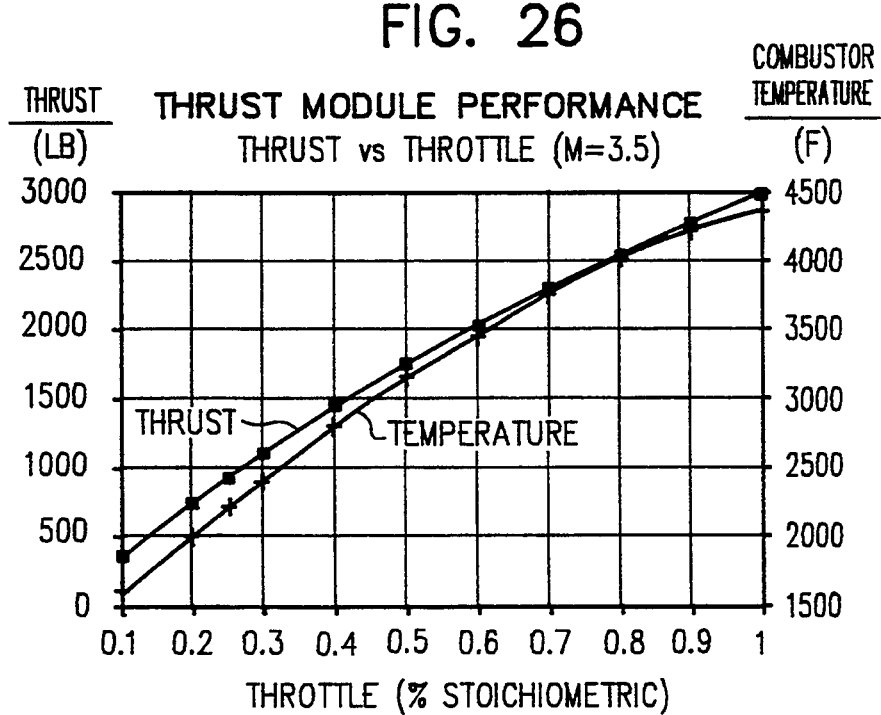
FIG. 26 shows in graphical form the variation in thrust output from the thrust module at various throttle settings, for a design Mach number of 3.5.
Figure 27:
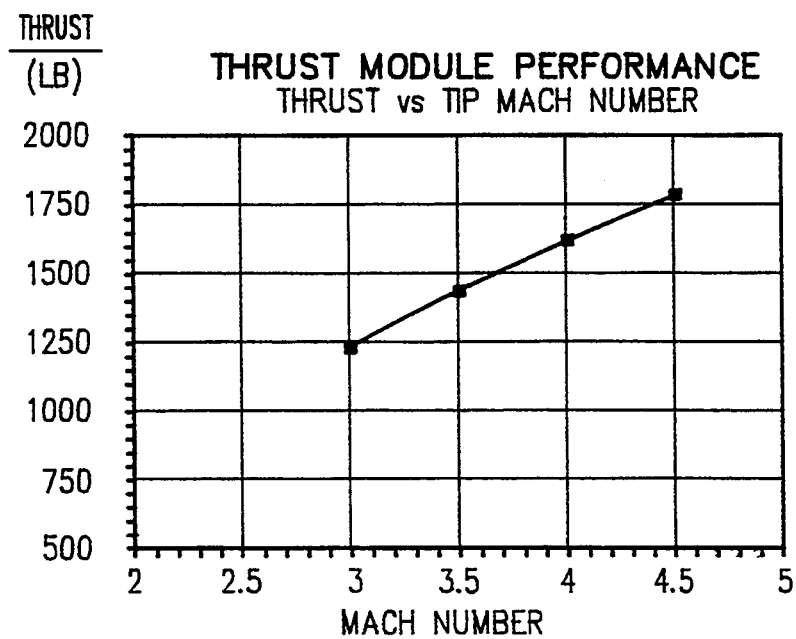
FIG. 27 shows in graphical form the variation in thrust module thrust at various Mach numbers.

FIG. 26 shows, in graphical form, the variation in thrust output from the thrust module at various throttle settings, for a design Mach number of 3.5. FIG. 27 shows in graphical form the variation in thrust module thrust at various Mach numbers. FIGS. 26 and 27 are based on a set of specific assumptions regarding thrust module size, free stream conditions, and fuel source. In both cases, a thrust module as indicated in FIG. 8 with an inlet cross-sectional area of 0.087 ft² is assumed. At the inflow Mach number indicated in FIG. 26, this results in a mass flow of air into the inlet of approximately 25.3 pounds mass per second. Results are shown for combustion of natural gas. In the case of FIG. 27, the mass inflow varies with inflow Mach number. In both cases a free stream temperature of 549° R and a pressure of 2116 pounds per square foot is assumed. Component performance levels consistent with well established test data are assumed for the inlet, transition section, combustor, and nozzle.

Because the thrust module thrust determines the overall power plant output, the thrust from the module is an important figure of merit for the thrust module and overall plant output levels. The thrust module thrust levels and the overall plant output levels increase in direct proportion with the mass captured and processed by the thrust module. Thus, doubling the inlet area and mass capture results in doubling the thrust generated by the thrust module, and thus results in doubling the power output of the system.

Thrust Module Performance

Using the basic performance equations set forth above, a thrust module design has been developed which yields excellent performance characteristics. The geometry of the flowpath, including its shape and area variations, is the basis for the performance characteristics of the system.

For structural reasons the basic flowpath of the thrust module is at all stations semi-circular. This basic configuration is represented in FIGS. 9 through 17. The radially innermost surface is planar. The radially outermost surface is semi-circular in radial cross section with a circumferential area variation of the character indicated in FIG. 8.

Based on a given inlet contraction ratio, combustor shape and expansion ratio, the basic thrust module performance variation with tip Mach number is shown on FIG. 27. It is important to remember that FIG. 27 does not represent the overall engine performance. As already discussed, the thrust produced by the thrust module drives the rotor which in turn drives the shaft which is used to produce useable mechanical work. Integrated power plant performance will be discussed below.

FIG. 26 shows the variation in the thrust module output over a range of throttle settings. FIG. 26 also shows the variation in combustor temperature with varying throttle settings. The combustor temperature is a critical factor. Combustor temperature must be balanced with inflow rate and thrust module materials so as to maintain structural integrity in the combustor walls.

The thrust module is made of a material with desireable high temperature capability covered with an oxidation/wear protection coating. Candidate materials include hot isostatic pressed alumina, silicon nitride, zirconia, beryllia, and silicon carbide.

Rotor Aerodynamic Design

As already discussed, a key feature of the instant power plant is the rotor (e.g., rotor 220 above) which attaches the thrust module to the high speed shaft. This rotor is rigidly attached to and rotates with the thrust module. Two design parameters of the rotor are extremely important. First, the rotor must be constructed of materials which enable it to survive the extremely high centrifugal loads encountered while the thrust module is rotating at a tip speed in the Mach 3.5 range, i.e., the rotor must be capable of withstanding extremely high tensile stress. Second, at such speeds, minimizing the rotor's overall aerodynamic drag is critical.

Since the rotor moves with the thrust module, the speed with which it moves through the air varies along its length, proportional to the operational radius of any position along its length. Basically, the local tangential velocity at any radius outward along the rotor will vary from zero at the axis of rotation to Mach 3.5 or more at the tip. Thus, the air flow over the rotor varies from subsonic through transonic and up into supersonic speeds.

The aerodynamic drag experienced by structures of various shapes moving at supersonic speeds in the Mach 3 to 4 range can become extreme. Since overall power plant efficiency decreases with increasing rotor drag losses, it is self evident that the rotor drag losses must be limited to a small fraction of the thrust generated by the thrust modules. Obviously, if the parasitic system power losses due to rotor drag become appreciable, the efficiency of the instant power plant would drop dramatically, potentially to levels below that of conventional generation systems.

Several different rotor configurations have been considered to provide the required strength at minimal aerodynamic drag. In one embodiment, as illustrated in FIG. 5 above, the rotor 220 includes a pair of generally triangular shaped arms (224 and 226) extending from the rotor hub outward to the thrust module 230. In another embodiment, as will be set forth hereinbelow, the rotor is provided as a continuous disc, with the thrust modules mounted at the rim of the disc. In yet another embodiment, also set forth hereinbelow, these two concepts are combined, with a pair of arms extending outward from a central disk at two or more balanced locations, with thrust modules located at the distal end of each pair of arms. The flow fields around these various embodiments are fundamentally different. Therefore, the theoretical analysis of each will be discussed separately below.

The drag of a rotor having a discrete pair of arms or blades can be accurately calculated by analyzing the airflow over the various rotor cross-sectional shapes. Due to structural and aerodynamic considerations, it is preferable that the cross section of the rotor vary along its span. The overall drag on the rotor can be determined by adding up the drag contributions from the various cross sections which exist over the span of the rotor. One specific embodiment of this concept is illustrated in Table I and will be discussed further in conjunction with FIG. 35 below.

In view of the importance of rotor drag reduction, it will be useful to briefly consider the theoretical basis for analysis of supersonic flow, before other embodiments and variations are described. In order to allow the reader to better appreciate the importance of the shape of the recommended rotor designs, several aerodynamically acceptable shapes and several alternative but aerodynamically unacceptable shapes (which might be structurally useful) for rotors will be explored. In supersonic flow, pressure or wave drag exists even in an idealized, non-viscous fluid. This supersonic drag is fundamentally different from the friction drag and the separation drag that are associated with the boundary layers in a viscous fluid. The latter are easily calculated by those trained in the art and are in any event of considerably lesser importance than the supersonic pressure drag at the desired rotor velocities of interest for efficient operation of my power plant. Accordingly, the following analysis is offered by way of explanation and is not intended to expressly or impliedly limit the scope of the invention.

Figure 28:
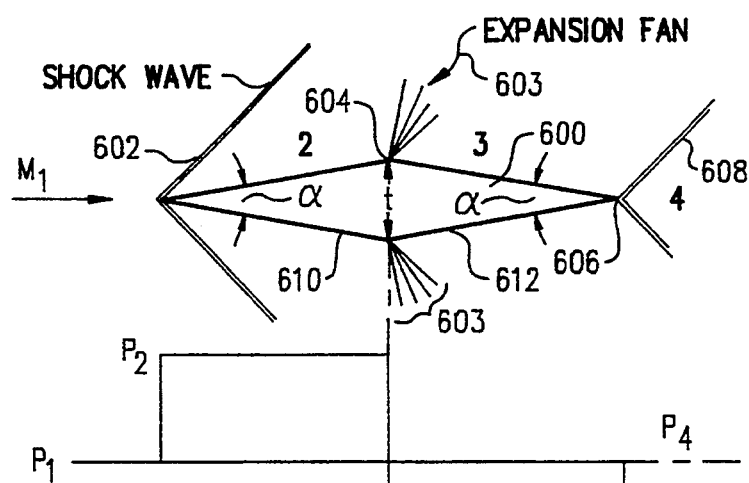
FIG. 28 is an illustration of the shock structure and surface pressure distribution resulting from the mechanical deflection of a supersonic flowfield by a diamond shaped cross section, such as a diamond shaped rotor section.

Reference is now made to FIG. 28, wherein a diamond shaped airfoil 600 is illustrated. In FIG. 28, the free stream at velocity $M_1$ in region 1 has a static pressure of $P_1$, as noted in the pressure distribution diagram at the bottom of FIG. 28. The nose shock 602 compresses the air flow to the positive pressure $P_2$ in region 2, and the centered expansion fan 603 at the shoulder 604 expands pressure to a negative pressure $P_3$ in the region 3. It is important to note that at trailing edge 606, the shock 608 recompresses the pressure in region 4 to $P_4$, which is essentially equal to the free stream value, $P_1$. The pressure $P_2$ and $P_3$ both retard the progress of the diamond shape 600 through the airstream. Thus, the diamond shape 600 is aerodynamically unacceptable for a rotor design because the drag component, computed by integrating the pressure over the projected area, is unacceptably large.

The drag "D" on the airfoil 600, due to the overpressure on the forward face 610 and underpressure on the rearward face 612, may be expressed, for a unit span, as:

$$D = (p_2 - p_3)t \qquad (19)$$

where t is the thickness of the section at the shoulder. The values of $p_2$ and $p_3$ are easily found from shock charts and tables of the Prandtl-Meyer function, as might be found in any convenient aerodynamic textbook.

Figure 29:
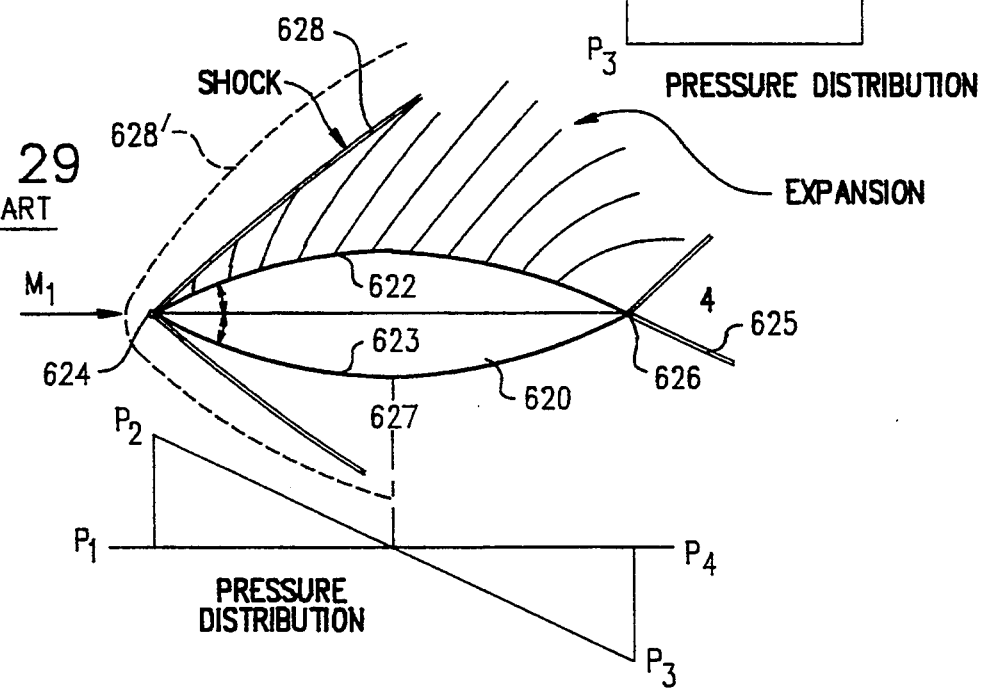
FIG. 29 is an illustration of the shock structure and surface pressure distribution resulting from the mechanical deflection of a supersonic flowfield by a bi-convex shaped cross section, such as a bi-convex shaped rotor section.

In FIG. 29, another alternative shape is illustrated. Here, a curved, bi-convex airfoil section 620 is provided. The airfoil section 620 has a continuous decrease in pressure as the air flow expands along the upper surface 622 (and lower surface 623) as seen in the pressure distribution diagram at the bottom of FIG. 29. For the leading edge shock 628 to be attached, it is necessary that the nose 624 be wedge shaped. In the case of a half angle greater than the critical angle, the shock would become detached, as indicated by the broken line shock location 628'.

As with the diamond shape 600 illustrated above, the convex shape 620 has an unacceptably high pressure drag. At the leading edge or nose 624, the pressure increases to $P_2$ from the free stream pressure $P_1$. The pressure drops across the body, changes from positive to negative at the tangential point 627, and reaches $P_3$ at the trailing edge 626. Again, the integral of pressure over the projected area results in excessive drag.

Figure 30:
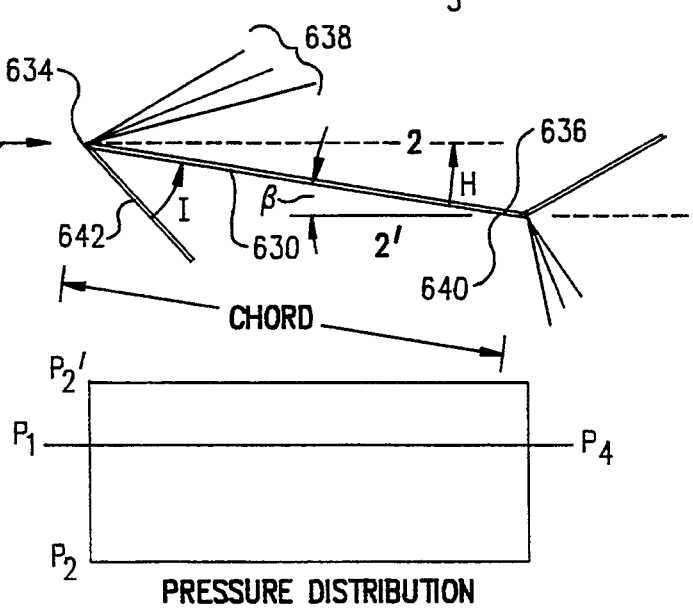
FIG. 30 is an illustration of the shock structure and surface pressure distribution resulting from the mechanical deflection of a supersonic flowfield by a lifting flat plate, such as a flat plate rotor section.

In FIG. 30, a flat plate 630 with an angle of attack beta ($\beta$) is shown. Like the diamond 600 and convex 620 shapes, there is no upstream influence on the airflow due to the presence of the plate 630, so the air stream line 632 ahead of the leading edge 634 is straight, and is at an airspeed of $M_1$. The portion of flow over the upper side 636 is turned downward through an expansion angle H by means of a centered expansion fan 638 at the leading edge 634, whereas on the lower side 640 the flow is turned downward through a compression angle H (equal to ($\beta$)) by means of an oblique shock 642. From the negative pressure $P_2$ on upper side of the plate 630 and the positive pressure $P_2'$ on the lower side of the plate 630, the lift "L" and drag "D" are computed very simply. They are, $$L = (pl_2 - p_2) \, c \, \cos\beta \tag{20}$$

$$D = (pl_2 - p_2) \, c \, \cos\beta \tag{2}$$

where c is the chord. Unfortunately, the drag experienced by flat plate 630 is unacceptably high for operation at the supersonic speeds where my ramjet power plant is most efficient.

As indicated in FIGS. 28, and 29 above, both the diamond shaped airfoil 600 and the bi-convex airfoil 620 experience large pressure or wave drag due to the surface pressure distributions induced by the presence of the shock waves. If this pressure drag existed on a rotor, its effect would be magnified by the local rotor speed. The power required to overcome such drag would be described as follows:

$$P_{ower} = \int_{hub}^{tip} r\omega D \, dr \tag{22}$$

Because the local rotor velocities are very large, small drag values can consume substantial power levels and thus result in economically prohibitive reductions in system efficiencies.

So far no mention has been made in these examples of the interaction between the shock waves and the expansion waves. This is because in the shapes illustrated in the FIGS. 28 through 30 above, interaction between shock waves and expansion waves is not of assistance in the reduction of drag, as it is in the biplane configuration as further illustrated and explained in conjunction with FIGS. 33 and 34 below.

To examine the interaction of the shock waves and the expansion waves, it is necessary to examine a larger portion of the flow field than was set forth in the FIGS. 28 and 30 above. Thus, FIGS. 31 and 32 show similar versions of two examples set forth in aforementioned previous FIGS.

The expansion fans 650 (in FIG. 31) and 652 (in FIG. 32) attenuate the oblique shocks 654 and 656, respectively, making them weak and curved. At large distances from the leading edges 658 and 660, the shocks 654 and 656, respectively, approach asymptotically the free stream Mach lines.

The reflected waves are not shown in FIGS. 31 because in shock expansion theory, the reflected waves are normally neglected. Their effect is small, but in an exact analysis they would have to be considered. In the various shapes, the wave system extends to very large distances from the shape; at such distances all such disturbances are reduced to infinitesimal strengths. For a diamond shaped cross section and for a lifting flat plate (unlike the case for the biplane shape discussed below) the reflected waves do not intercept the airfoil at all, and hence do not affect the shock-expansion result for the pressure distribution. That is important because it is the pressure distribution which is of primary concern in evaluating the supersonic wave drag.

The previous discussion focussed on the characteristics of supersonic flow. This focus is necessary because the portion of the rotor which contributes the vast majority of drag is the outboard portion. That portion of the rotor would be supersonic during normal thrust module operation. Thus, the dominating aerodynamic effects which contribute to overall rotor aerodynamic drag are embodied by the relatively simple shock expansion characteristics just discussed. While the inboard and transonic regions of the rotor may have appreciable drag levels, the fact that those regions of the rotor are moving at a lower velocity means that the power consumed in overcoming the drag from those regions is smaller than that required with respect to the outboard, supersonic portions of the rotor.

A wealth of empirical correlations and analytical methods exist to show the subsonic and transonic flow over various possible rotor cross-sectional shapes. Such methods may be fully developed for rigorous analysis by those skilled in the art. However, since the contribution of such subsonic and transonic drag is appreciably smaller than from the supersonic drag on the rotor, as just discussed above, analysis of such regions is not critical to a basic understanding of the principles of the present invention.

Biplane Rotor Aerodynamic Performance

In one embodiment, my power plant includes a biplane rotor design which minimizes aerodynamic drag losses through use of geometric shaping which provides shock cancellation to eliminate pressure drag. From the above discussion of supersonic flow over various shapes, it is clear that shock waves are formed wherever there is a deflection of the high speed airflow by a shaped surface. Recognizing this phenomenon, in order to use it to advantage rather than to merely avoid the disadvantages, I have designed the outboard regions of the rotor (e.g., rotor 220 above) utilizing a configuration comprised of two triangular cross sections or biplane portions. Each of these triangular portions is carefully contoured to result in shock cancellation within the space between the biplanes. The important result is that a biplane rotor can be supplied having essentially constant pressure within the region between the leading edge and trailing edge of the biplanes at the design Mach number. Such a configuration virtually eliminates supersonic pressure drag on the rotor.

To illustrate this supersonic pressure drag reduction technique by shock cancellation in the biplane structure of the present invention (in contrast to drag arising in the previously discussed FIGS. 28 through 32), a typical biplane rotor 660 cross section is shown in FIG. 33. The leading shock structure 662a resulting from passage of the biplane through the airflow at speed $M_{1a}$ is indicated. These shocks 662a are cancelled by the expansion created by interior upper shoulder 668u and lower shoulder 668(l) of the biplane. As a result, the pressure distribution is even (at pressure=$P_2$) throughout the interior of the biplane 660. Because the outside surfaces (upper surface 664 and lower surface 666) are flat, there is no airflow deflection from the outer surfaces, and therefore no exterior shock waves are formed.

The significance of the cancellation of shock 662a by use of the biplane rotor technique is clear when one evaluates the pressure distribution which results from the shock 662a at design condition, where $M_{1a}$=Design airspeed (see the pressure distribution diagram portion at the bottom of FIG. 33.). FIG. 33 shows the pressure distribution induced by the shocks on an ideally designed and operated biplane structure 660. At the leading edge 669, the pressure is raised from the free stream pressure $P_1$ to the interior pressure $P_2$. The interior pressure remains essentially constant at pressure $P_2$ until the trailing edge 670 is reached, i.e., $P_2=P_3$.

It can be seen from the pressure distributions indicated in FIG. 33 that the surface pressure $P_2$ acting on the upper internal leading wedge 671 and upper trailing wedge 672 portions of the biplane is constant. Likewise, the pressure $P_2$ acting on the lower internal leading wedge 674 and lower internal trailing wedge 676 is constant. In essence, the thrust vector component acting against the trailing wedge portions 672 and 676 is equal to and cancels the drag vector component acting against the leading wedge portions 671 and 674. The supersonic wave or pressure drag is created by and is equal to the pressure differential acting over an area, as a consequence of the even pressure distribution, there is no pressure or wave drag created by a properly designed biplane.

The biplane type structure 660 has been tested and proven for supersonic drag reduction in other applications, and is ideally suited for use in construction of a rotor in the present invention.

In addition to the pressure drag which is advantageously eliminated by the above described technique, there are unavoidable viscous drag effects created by the momentum lost in the boundary layers on the internal and external surfaces of the biplane 660. However, such drag levels are small compared to the wave or pressure drag, and an exact analysis including such effects may be conducted by those trained in the art.

Another advantage of the biplane type rotor is that the drag experienced at off-design mach numbers gradually increases from that experienced at the design point, i.e. there is no sudden jump in drag when the speed increases or decreases somewhat from the design point. This is illustrated in FIG. 34, where the pressure diagram shows spikes of overpressure and of underpressure which correspond to the pressure acting against the trailing wedge portions 672 and 676 and to the leading wedge portions 671 and 674 at the corresponding chordwise location along the airflow path. Since supersonic wave or pressure drag is created by and is equal to the pressure differential acting over an area, the consequence of an uneven pressure distribution is that the high pressure and low pressure spikes acting on small surface area portions create small increases in drag.

Although FIG. 33 illustrates the desired pressure profile through the interior of the biplane 660, the specifics which are necessary to effect such a uniform spanwise pressure profile during rotor operation are shown in Table I for one embodiment of the invention, generally depicted in FIG. 35. Table I should also be viewed in conjunction with FIG. 6 (which is illustrative of the basic layout and dimensions of a biplane rotor).

TABLE I

| Radial Location (in) | Biplane Height (in) | Chord (in) | Thickness (in) | Section Area (in) | Gap Height (in) |
|---|---|---|---|---|---|
| 36.000 | 5.66 | 12.000 | 1.911 | 22.930 | 1.838 |
| 34.200 | 5.984 | 11.933 | 1.990 | 23.744 | 2.004 |
| 32.400 | 6.308 | 11.833 | 2.054 | 24.410 | 2.200 |
| 30.898 | 6.578 | 11.856 | 2.095 | 24.834 | 2.389 |
| 28.296 | 7.046 | 11.843 | 2.130 | 25.224 | 2.786 |
| 25.704 | 7.514 | 11.884 | 2.108 | 25.043 | 3.299 |
| 23.400 | 7.928 | 11.977 | 2.023 | 24.224 | 3.883 |
| 22.104 | 8.162 | 12.059 | 1.940 | 23.394 | 4.282 |
| 20.602 | 8.432 | 12.186 | 1.806 | 22.008 | 4.820 |
| 18.000 | 8.800 | 12.080 | 1.738 | 21.000 | 5.323 |
| 15.429 | 9.200 | 12.210 | 1.750 | 21.368 | 5.700 |
| 12.857 | 9.500 | 12.400 | 1.800 | 22.320 | 5.900 |
| 10.286 | 9.750 | 12.600 | 1.850 | 23.310 | 6.050 |
| 7.714 | 9.990 | 12.800 | 1.900 | 24.320 | 6.190 |
| 5.143 | 10.100 | 13.100 | 1.980 | 25.938 | 6.140 |
| 2.571 | 10.210 | 13.400 | 2.050 | 27.470 | 6.110 |
| 0.000 | 10.210 | 13.500 | 2.200 | 29.700 | 5.810 |

It can be seen from an examination of Table I that the gap height "G", the distance between the upper 668u and lower 668(l) shoulders of the rotor 660, varies along the span of the rotor. This spanwise variation is required to maintain optimal biplane performance (shock cancellation) over as much of the rotor as possible. The thickness "T" is the distance between the outer surface (lower 666 or upper 664) and the lower 668(l) or upper 668(u) shoulder, respectively. As with gap height "G", biplane thickness "T" and chord vary spanwise so as to assist in establishing the desired pressure profile within the biplane. Biplane height, the distance between the upper surface 664 and the lower surface 666, varies along the span of the rotor as indicated in FIG. 33.

Biplane geometry supports optimal aerodynamic performance over the high speed region of the outer rotor, but is not as effective on the inboard rotor sections, due to the decreasing Mach number.

The spanwise variation in rotor geometry reflected in Table I results in optimal biplane performance (constant internal pressure) over the outboard 12–14 inches of that rotor, and a desireable total geometric envelope to house structural load bearing material on the inboard 22–24 inches.

The relationships between rotor section geometry as defined by chord, gap height and thickness which result in the shock structure required to achieve shock cancellation (as described in connection with FIG. 33 above)

are well developed in a number of texts treating supersonic fluid dynamics and are, in general, well known or easily determined by those skilled in the art.

In summary, Table I sets forth an exemplary spanwise variation in rotor geometry including chord, thickness and air gap which result in desirable rotor performance. Overall rotor size is not a critical parameter and can easily be varied within a range of reasonable values as long as specific section geometry is maintained so as to result in necessary interior shock geometry and cancellation.

Alternate Rotor Shapes

Although the just described biplane rotor means offers significant advantages for connecting a thrust module to a rotating shaft, other rotor shapes may also substantially accomplish the desired results, namely, provide adequate strength with a minimum of drag.

Figure 41:
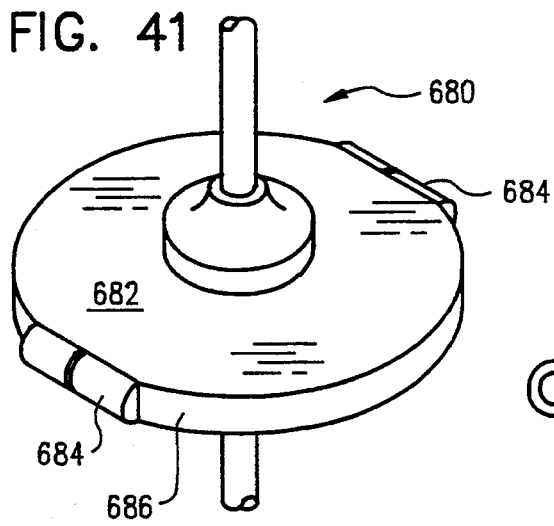
FIG. 41 is a perspective view of a first alternate embodiment of the rotor of the present invention, here shown as a flat disk.

Reference is now made to FIG. 41, where one viable alternative configuration for a rotor 680 is illustrated. A continuous disc 682, with the thrust modules 684 mounted on the rim 686, is provided. It is immediately clear that there can be no flow through a given section as in the case of the discrete biplane type rotor discussed above. However, a simple flat disc rotating in an otherwise quiescent fluid does have drag. More accurately, the viscous interaction between the rotating disc and the fluid surrounding the disc consumes power.

Returning now to FIG. 36, a schematic representation is provided of the flow field which results when a disc 700 is caused to rotate in an otherwise motionless fluid. As indicated in FIG. 36, the layer of air near the disc 700 is carried by the disc 700 in the direction of arrows referenced 702 through friction, and such air is thrown outward in the direction of arrows 704 owing to the action of centrifugal forces. This radial airflow results in replacement airflow downward in an axial direction (along the "z" axis) towards the disc 700. Once the replacement air enters the flowfield, it is then carried downward toward the disc 700 and is ejected centrifugally in the direction of arrows 704, like the air which it is replacing. Thus it is seen that in the case of a disc 700 rotating in air, there exists airflow in three dimensions: (a) in the radial direction, r, (b) in the circumferential direction, w (indicated by reference numeral 702), and (c) in the axial direction, z.

The moment ($\Gamma$) required to turn such a disc 700, wetted on both sides, (i.e., the force required to overcome drag on the disc turning at the desired speed about the fixed axis z) has been shown to be $$2\Gamma = 0.616 \pi \rho R^4 \sqrt{\nu \omega^3} \qquad (23)$$

Figure 37:
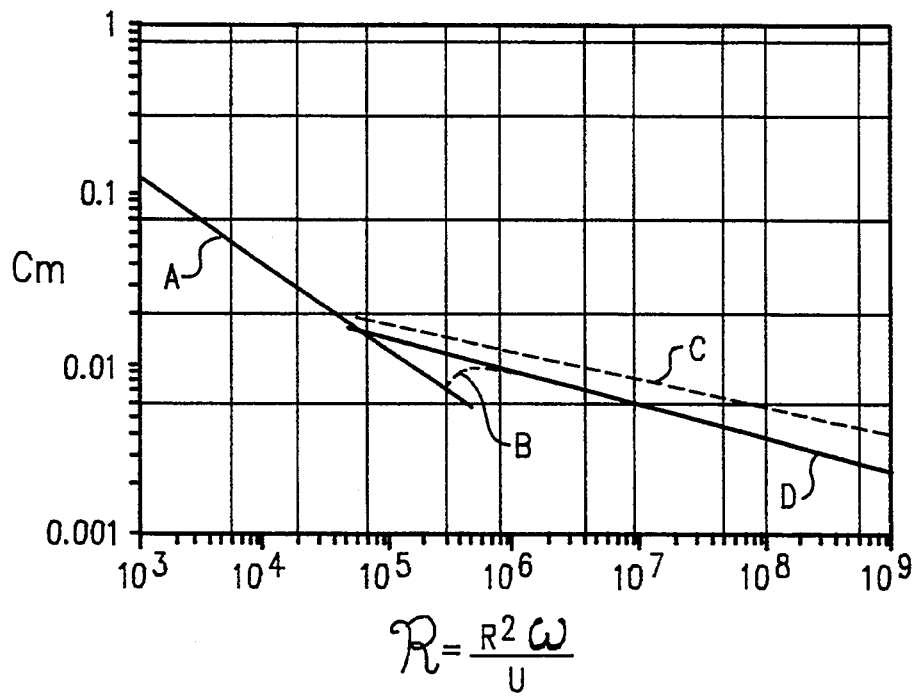
FIG. 37 shows the variation in the moment required to spin a flat disc in a quiescent fluid. The moment required is expressed in terms of a dimensionless moment coefficient. The figure shows the theoretically predicted behavior for laminar and turbulent flows at various rotational Reynolds numbers.

FIG. 37 shows a plot of the rotating disc moment coefficient versus Reynolds number, where the dimensionless moment coefficient is defined as $$C_m = \frac{2\Gamma}{\tfrac{1}{2}\rho \omega^2 R^5} \qquad (24)$$

and where the Reynolds number "$\Re$" is defined as follows:

$$\Re = \frac{R^2 \omega}{\nu} \qquad (25)$$

This plot assumes the disc to be rotating in free air. Curve A in FIG. 37 is the behavior predicted for laminar flow over the disc, as described by equation (25) below:

$$C_m = \frac{3.87}{\sqrt{\Re}} \qquad (26)$$

The moment coefficient predictions for the transition region during a change in flow from laminar to turbulent is set forth in curve B, and is based on empirical data. For turbulent flow at higher Reynolds numbers "$\Re$", the moment coefficient is better described by curves C and D. Curve C is described as follows:

$$-\frac{1}{\sqrt{C_m}} = 1.97 \log (\Re \sqrt{C_m}) + 0.03 \qquad (27)$$

Curve D is described as follows:

$$C_m = 0.146 \; \Re^{-1/5} \qquad (28)$$

The difference between curves C and D results from slightly different assumptions with regard to behavior of the boundary layer profile, with curve C assuming a logarithmic profile, and with curve D assuming a 1/7th power law profile.

One alternative which has also been considered is the inclusion of a housing around the disc so as to reduce the moment coefficients and as a result reduce undesirable parasitic power losses. The basic concept illustrative of such a configuration is shown in FIGS. 38 and 39, where a "tight" housing, i.e., one in which the gap "s" is small compared with the radius "R" of the disk 802.

In the case of all laminar flow over the plate, the moment contributed by both sides of the disk can be described as follows:

$$2\Gamma = \pi \omega R^4 \frac{\mu}{s} \qquad (29)$$

and the moment coefficient becomes $$C_m = 2\pi \frac{R}{s} \frac{1}{\Re} \qquad (30)$$

Figure 40:
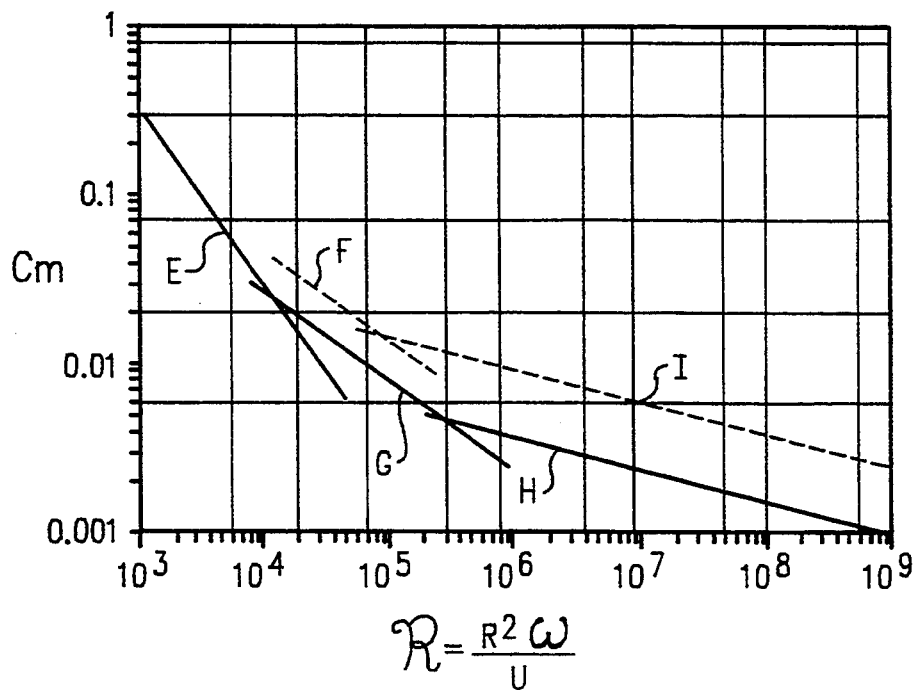
FIG. 40 shows the variation in the moment required to spin a flat disc inside a housing. The moment required is expressed in terms of a dimensionless moment coefficient. The figure shows the theoretically predicted behavior for laminar and turbulent flows at various rotational Reynolds numbers as well as a comparison to the moment coefficients required to turn a disc without a housing set forth in FIG. 37 above.

This equation is seen plotted as curve E in FIG. 40 for a ratio of gap "s" to radius "R" (s/R) of the disk 802 of 0.02. As the Reynolds number increases, the flow begins to transition from laminar to turbulent as indicated by the following approximate relation which appears as curve G on FIG. 40.

$$C_m = 2.67 \Re^{-\tfrac{1}{2}} \qquad (31)$$

With increasing Reynolds numbers, the flow becomes fully turbulent and the moment coefficient is more accurately represented by the following equation:

$$C_m = 0.0622 \Re^{-1/5} \qquad (32)$$

which appears as curve H in FIG. 40. It can be seen that the provision of a housing provides an order of magnitude or more reduction in coefficient of moment, by simple comparison of curve D of FIG. 37 with curve H of FIG. 40.

Figure 42:
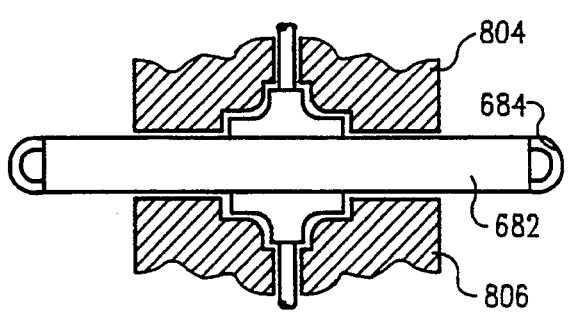
FIG. 42 is a vertical cross-sectional view of the flat disk rotor first illustrated in FIG. 41.

Since it is not practical to completely enclose the thrust modules, a partial housing can provide a significant measure of the benefits of a housing, and may be utilized as appropriate. In FIG. 42, use of such a partial upper housing 804 and lower housing 806 is shown used in conjunction with the flat, solid disc 682 illustrated in FIG. 41.

Figure 43:
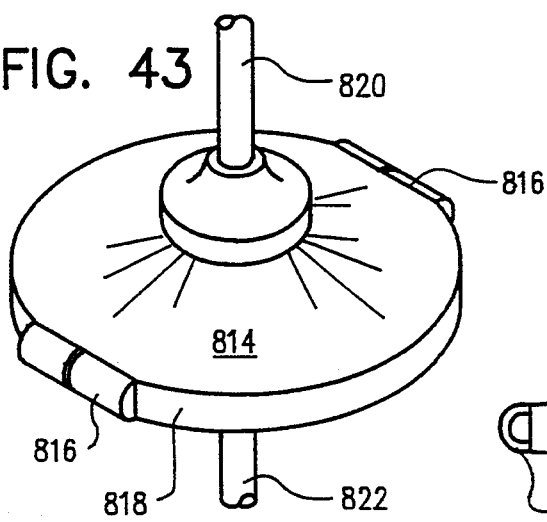
FIG. 43 is a perspective view of a second alternate embodiment of the rotor of the present invention, here shown as a tapered disk.
Figure 44:
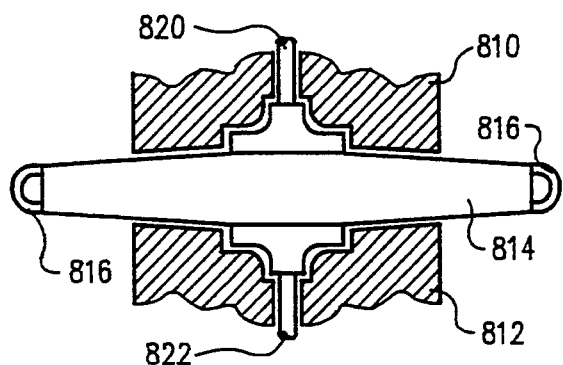
FIG. 44 is a vertical cross-sectional view of the tapered disk rotor first illustrated in FIG. 43.

Another alternate embodiment is shown in FIGS. 43 and 44, where partial upper 810 and lower 812 housings closely hug the sloping or tapered solid disc rotor 814. Thrust modules 816 are attached to the rim 818 of rotor 814, to turn rotor 814 and shaft portions 820 and 822.

Figure 45:
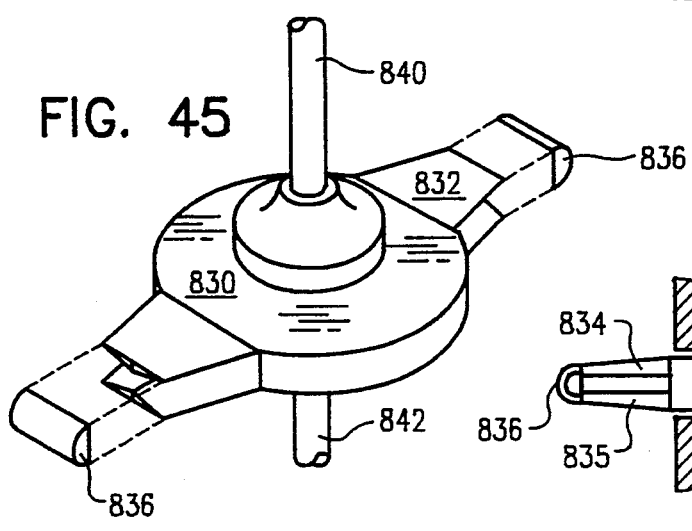
FIG. 45 is a perspective view of a third alternate embodiment of the rotor of the present invention, here shown as a small central disk with an outwardly extending biplane portion.
Figure 46:
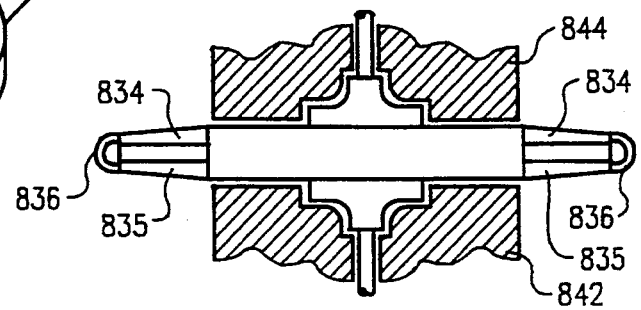
FIG. 46 is a vertical cross-sectional view of the combination disk/biplane rotor first illustrated in FIG. 45.

Yet another alternate embodiment is shown in FIGS. 45 and 46, where a combination of the prior concepts is utilized. Here, a small solid disc rotor portion 830 has affixed thereto two or more biplane type arms 832, each of which has an upper 834 and lower 835 portion similar to the biplane rotors described above. The disc 830 may be either flat or tapered as set forth in either FIG. 41 or FIG. 43. Thrust modules 836 are affixed to the distal ends 838 of biplane arms 832, to drive the entire assembly so as to rotate shaft portions 840 and 842. To reduce drag, partial upper 844 and lower 846 housings are provided.

Rotor Materials of Construction

The structural design and material systems used for the rotor means are critical to this power plant system. The rotor structure is as important as the aerodynamic performance of the rotor and the propulsive performance of the thrust module discussed above. All three design elements (rotor materials, rotor aerodynamic design, and thrust module performance) must be properly executed to place into operation a high performance, maximum efficiency power plant as set forth herein.

Because of the centrifugal loads induced by the extreme speed with which the rotor turns, the material and structural characteristics of the rotor are vitally important design elements. The following background discussion is offered to illustrate the magnitude of the forces involved.

Figure 47:
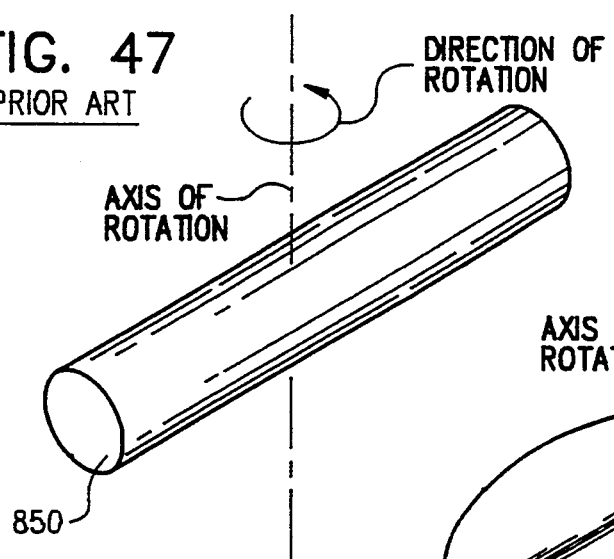
FIG. 47 illustrates, for purposes of stress analysis and comparison, a slender rod rotating about an axis perpendicular to its own longitudinal axis.
Figure 48:
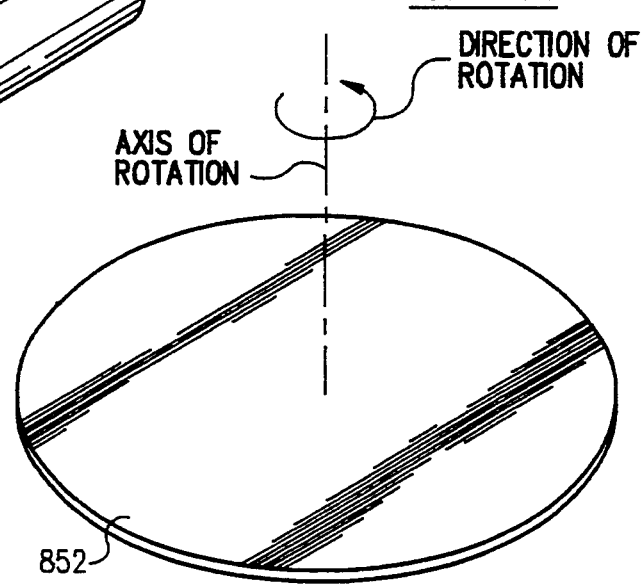
FIG. 48 illustrates, for purposes of stress analysis and comparison, a flat disc of uniform thickness rotating about an axis perpendicular to its own plane.

Consider two basic elements rotating about an axis. FIG. 47 shows an untapered rod 850 rotating about an axis perpendicular to its own longitudinal axis. FIG. 48 shows an untapered disc 852 rotating about an axis through its center. In the case of the rod 850, the maximum stress occurs at the center of the rod. Equation (33) below indicates the variation in this peak stress with rotation rate:

$$\sigma_{max} = \left(\frac{1}{2}\right)\frac{W}{386.4}\frac{L\omega^2}{S} \tag{33}$$

In the case of the rotating disc 852, the maximum tangential and radial inertial stresses both occur at the center of the disc. The variation in the magnitude of this stress with disc rotation rate "w" is indicated by equation (34):

$$\sigma_r = \sigma_t = \sigma_{max} = \left(\frac{1}{8}\right)\frac{\delta\omega^2}{386.4}(3 + \nu_p)R^2 \tag{34}$$

These basic shapes are highly representative of two configurations for the rotor means necessary for my power plant. The rod is analogous to an untapered rotor arm, while the disk is obviously equivalent to the untapered solid disc rotor configuration just discussed above. Both equations (33) and (34) indicate stress levels expressed as pounds per inch (lbs/in), as a function of rotation rate.

Figure 49:
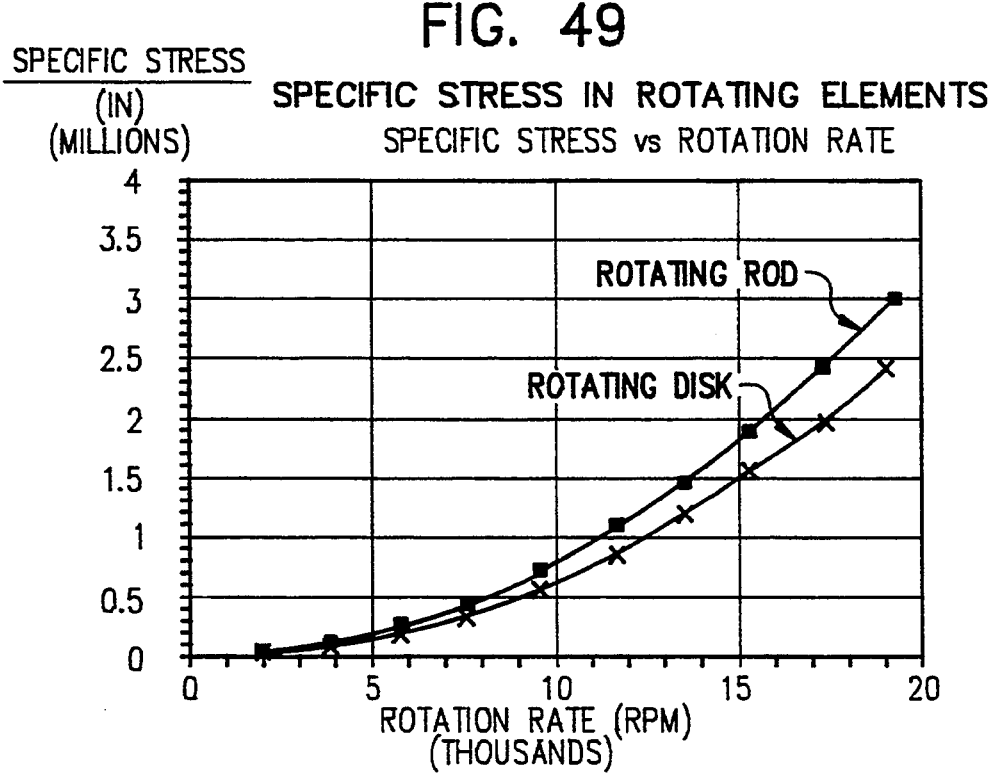
FIG. 49 is a graph showing the variation of specific stress with rotation rate, for both a non-tapered slender rod and for a rotating disc.

It is instructive to consider the specific stress, that is, the stress per unit mass of material. The specific stress has units of inches, because the density of a specific material is cancelled out of the mathematical relation. Thus, specific stress varies only with rotation rate. In FIG. 49, a plot of the variation of specific stress with rotation rate is shown for an untapered rod, and for a disc of uniform thickness (i.e., the shapes of FIGS. 47 and 48, respectively). It is important to note that at the rotation rates of importance in the practice of the present invention, extremely high specific stresses are encountered, e.g., at a rotation rate of 15,000 rpm, about 1.5 million inches of specific stress would be encountered by a rotating disc, and about 1.8 million inches of specific stress would be encountered by a rotating rod. It can be seen that in addition to the possible aerodynamic advantages discussed above, a rotating disc also may offer a slight advantage with respect to materials requirements.

Any given material has associated with it a specific strength which is commonly defined as the ultimate tensile strength of a material divided by its density. Like specific stress, specific strength has the units of inches. The two values are directly comparable; specific strength sets forth the load which a given material can withstand, and specific stress sets forth the load which a given material will encounter when in use in a given application.

Table II shows the specific strength for titanium, advanced metal matrix composites and carbon based conventional composites. Evaluation of the meaning of the specific strength data is straightforward. It is clear from FIG. 49 and Table II that as the rotational speed of either the solid disc or the rod is increased, the specific stresses required may ultimately reach the specific strength of a given material. If the speed is increased beyond that point, the load will exceed the specific strength, and as a result, the material will fail. In summary, the specific stress expected to be encountered by rotors for the instant invention exceeds the specific strength of commonly available materials such as steel, magnesium, and aluminum, and thus such materials are not suitable for use as the primary structural material in the rotor means of the present invention.

TABLE II

| SPECIFIC STRENGTHS FOR VARIOUS MATERIALS | |
|---|---|
| Material | Specific Strength (inches) |
| Steel | 176,000 |
| Magnesium | 584,610 |
| Aluminum | 594,060 |
| Titanium | 683,220 |
| Silicon Carbide Reinforced Titanium | 1,300,250[1] |
| Kevlar Reinforced Polyester | 3,752,600 |
| Monofilament Carbon fibers | 15,000,000 |

[1] Silicon carbide casing on carbon fiber

The rotor means for the proposed power plant must turn at speeds between 10,000 and 20,000 rpm. It is readily apparent from FIG. 49 and Table II that not even titanium, with its excellent specific strength characteristics would represent a practical material for rotor construction. It is possible to reduce the specific stress by tapering a given rotor element, and in fact, that was the approach used for an alternate biplane rotor structure introduced herein below.

It is clear from relations (33) and (34), and can be easily visualized from FIG. 49 and Table II, given the specific stress levels encountered by rotor shapes operating at the speeds required, that commonly utilized metals or metal alloys do not have sufficient specific strength to withstand the loads encountered at the most desirable rotation rates. Newly developed metal matrix composites do provide acceptable strength, however, and can survive the required loads.

Carbon fiber reinforced polyester and epoxy composites easily have the specific strength required for service in the instant invention. As indicated in Table II, pure carbon monofilament fiber bundles or "tows" are commercially available with specific strength levels up to 15 million inches. This is off the scale used for FIG. 49 and clearly has a wealth of extra strength capability.

Unfortunately, when unprotected, both carbon fiber and epoxy composites lack high temperature capability. However, if insulated from an oxidizing environment, the carbon tows can accommodate extremely high temperature with only minimal reduction in strength.

In one embodiment, the basic rotor structure can be designed and fabricated using both metal matrix composites and carbon or other high strength fiber windings. With proper thermal and oxidative protection, monofilament carbon fiber tows can be combined into a structure with excellent strength and high temperature capability. In the composite design, high strength is provided by continuous monofilament carbon fibers, so as to give the structure sufficient reinforcement to withstand the centrifugal loads encountered. In that design, the metal matrix composite shells or "gutters" provide the shape integrity and rigidity required for proper aerodynamic performance.

Because the carbon windings are far stiffer than the silicon-carbide reinforced titanium, the metal matrix composite elements as well as the thrust modules at the end of the rotors are restrained from excessive and damaging deflection by the ultra-high strength carbon fiber windings. The high specific strengths of the carbon fibers make them quite suitable for the fabrication of stiff, strong, and lightweight composite rotors which can minimize vibrational and static load bending. The carbon fiber windings thus become a central tensile reinforcement element which carries the bulk of all centrifugally induced mechanical loads.

Figure 50:
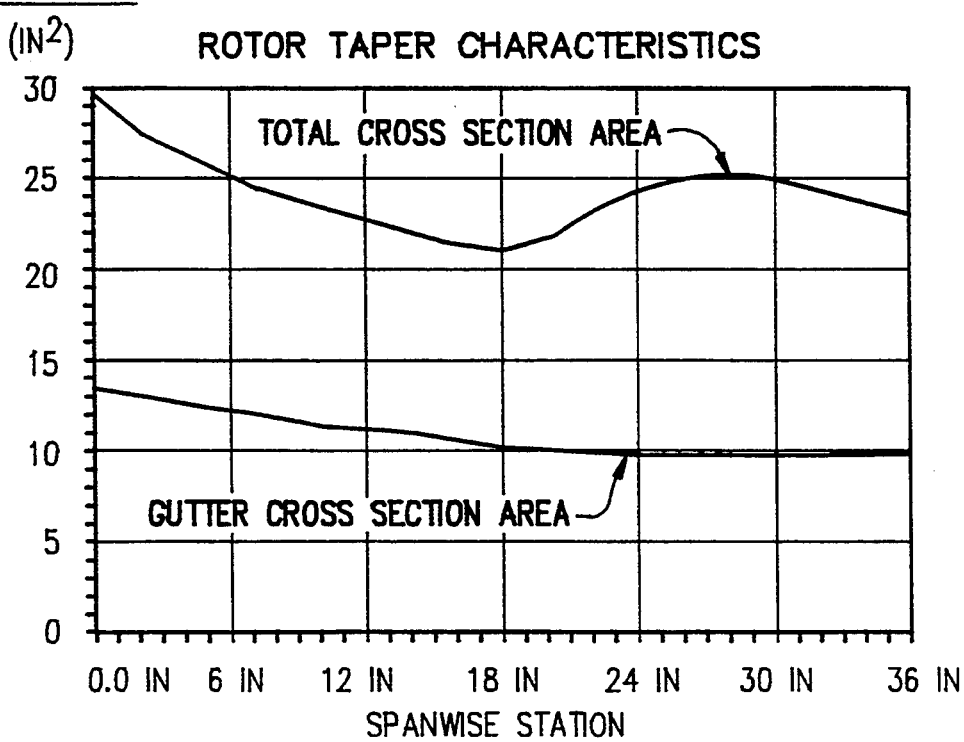
FIG. 50 is a graph which illustrates a desirable rotor taper schedule for stress reduction, i.e., the variation of the rotor cross-sectional area versus radial position.

FIG. 50 shows the spanwise variation in total rotor material cross-sectional area for one exemplary embodiment of the biplane rotor, such as is set forth in FIGS. 5 and 6 above. Implicit in the cross-sectional area numbers provided in FIG. 50 is that the rotor is tapered. The rotor taper ratio is defined as follows $$\lambda = \frac{A_{root}}{A_{tip}} \quad (35)$$

The ultimate specific strength for the silicon-carbide reinforced metal matrix composite and the ultimate specific strength of the carbon monofilament is indicated in TABLE II. The spanwise variation in stress encountered by the silicon carbide reinforced metal matrix composite gutter portion in one embodiment of the rotor means (as set forth in FIGS. 5 and 6 above) of the present invention is set forth in FIG. 51. Likewise, the stress encountered by the carbon reinforcing fibers in the same embodiment of the rotor means of the present invention is set forth in FIG. 52. While merely illustrative of the situation in one embodiment of the invention, the curves of FIGS. 51 and 52 assume a constant cumulative carbon fiber cross-sectional area of approximately 9 square inches. Note the substantial safety margin in both cases.

The safety margin just identified can be further increased by increasing the material taper ratio. Preferably, in order to minimize the actual loading to the extent practical, the rotor means should be built with high strength materials in shapes which have large material taper ratios. This basically means that at increasing radial station, (further from the axis of rotation), the rotor means should become increasingly slender or thin. Fundamentally, reduction of rotating mass results in reduction of the encountered stress operating at the center of rotation.

Attention is now directed to FIGS. 5 and 6, where reference numerals 224 and 226 are the lower and upper biplanes. The gutter, metal matrix composite portion is denoted 860, and contains on either side of a central rib 248a, a pair of troughs 864, generally triangular in shape, adapted to receive the high strength carbon fibers 242 therein. The rotor gutter 860 is preferably provided in an advanced metal matrix composite, silicon-carbide reinforced titanium. Protection for the carbon fibers 242 is provided by cover plate 260 and end caps 270(l) and 270(t). Not shown in FIG. 5 is the symmetric mirror reflection of the other half of the rotor structure.

The thrust module 230 flowpath shape previously introduced (see FIG. 8 and accompanying discussion above) was specifically developed to accommodate the carbon fiber 242 windings. FIG. 8 shows how the carbon fibers are integrated into the radially outermost region of the thrust module. Note that the groove 870 into which the fibers are wound is wider than it is deep. This spreads the loads over as large an area as possible and thus minimizes stress concentrations. Like the rotors, the thrust modules may be supplied with a central rib 872 for added stiffness.

To assemble the biplane rotor 220 structure, the thrust modules 230 are placed in position on the ends of the gutter 860 (i.e., the rotor superstructures) and then a continuous tow of carbon fiber filaments 242 are progressively wound around the entire biplane/thrust module assembly. The carbon fiber tow 242 is held in constant tension as it is successively wound into the accommodating trough 864 in the gutter 860 and similar groves 870 in the thrust modules 230. The tension in the carbon fiber 242 acts to hold the entire assembly together. Furthermore, it pre-loads the rotor structure with an initial compressive load which helps to reduce operational stresses in the rotor. The beginning and ending of the carbon fiber windings as well as any interim splices are secured with epoxy, thermosetting or other suitable resin within the rotor. After the winding is completed, the rotor top and bottom plates (top plate 260(l) and 260(t) has a counterpart on the bottom, 262(l) and 262(t)), as well as the thrust module 230 end caps (part numbers 270(l) and 270(t) are bonded in place.

Alternate Rotor Design

The key to the current rotor structure lies in the use of high strength materials. As an alternative to use of carbon fiber or other high strength windings, a solid rotor design may be completed utilizing silicon carbide coated carbon fiber metal matrix composite materials.

Such a design is set forth in FIG. 55 (and related cross sections FIGS. A through G), and FIGS. 56 and 57. In FIG. 55 a partial isometric view of a second embodiment of the biplane rotor of the present invention, similar to the view first set forth above in FIG. 5, is provided showing a solid metal matrix composite type construction configuration. Rotor 920 is provided having thrust module 930 at the distal end thereof. An upper solid rotor 932 and a lower solid rotor 934 are provided. Endcaps 935 are used to secure thrust modules 930. The exact shape and size of rotors 932 and 934 are determined by the same aerodynamic (uniform pressure profile) and strength (minimize stress to the extent possible) objectives as discussed in detail above. The upper 932 and lower 934 rotors are secured in a central hub 936 having appropriate fasteners 938. The interior of rotors 932 and 934 may be layers 940 of silicon carbide reinforced titanium.

Fuel may be supplied to the thrust module 930 through conduit means 942($u$) (upper) and 942($l$) (lower) which is defined by edge 944 in shaft means 946 and in rotors 932 and 934. The progress of fuel conduits 942($u$) and 944($l$) spanwise through rotors 932 and 934 is depicted in FIGS. A through G.

FIG. A is a vertical cross-sectional view taken through line A—A of FIG. 55, showing the construction of the solid type rotor.

FIG. B is a vertical cross-sectional view taken through line B—B of FIG. 55, showing the construction of the solid type rotor, and also showing the changing features of gap G and fuel conduit 942($u$) and 942($l$) diameter.

FIG. C is a vertical cross-sectional view taken through line C—C of FIG. 55, similar to the view set forth in FIGS. A & B above, showing further variations in rotor dimensions with change in radial position.

FIG. D is a vertical cross-sectional view taken through line D—D of FIG. 55, similar to the views in FIGS. A through C above, showing further variations in rotor dimensions with change in radial position.

FIG. E is a vertical cross-sectional view taken through line E—E of FIG. 55, similar to the view set forth in FIGS. A through D above, showing further variations in rotor dimensions with change in radial position.

FIG. F is a vertical cross-sectional view taken through line F—F of FIG. 55, similar to the views in FIGS. A through E above, showing further variations in rotor dimensions with change in radial position.

FIG. G is a vertical cross-sectional view taken through line G—G of FIG. 55, similar to the views in FIGS. A through F above, showing further variations in rotor dimensions with change in radial position.

FIG. 56 provides an isometric view of an end cap 935 for use with the solid type rotor 920 first illustrated in FIG. 55 above. In order to keep the thrust module 930 in place while at the high centrifugal speeds of operation, cap 935 will be fused, brazed, welded, or otherwise metallurgically bonded in a high strength joint via use of a series of interlocking tongues 950 and grooves 952. Groves 952 in cap 935 accommodate complementary tongues 954 which are fashioned to the distal ends of rotors 932 and 934, as more fully seen in FIG. 57. A series of steps K, L, and M may be provided in cap 935, complementary to receiving ledges K', L', and M' on the exterior of thrust module 930, so as to provide the maximum possible tongue and groove surface to surface contact consistent with the necessary thrust module 930 internal dimensions.

FIG. 57 illustrates a vertical cross-sectional view of the finished, operating position of the end cap 935 just illustrated in FIG. 56, when the cap 935 is affixed to the upper 932 and lower 934 rotors.

Cogeneration System Configuration

Cogeneration refers to the simultaneous generation of electrical and thermal energy in a single powerplant. My powerplant can easily incorporate both thermal and kinetic energy recovery without modification to the basic configuration. To accommodate cogeneration, the horizontal annular exhaust duct would be configured as illustrated in FIGS. 1, 2, and 3, wherein the exhaust duct contained an integral heat exchanger. Coolant passages inside the duct would cool the high temperature exhaust gases from the thrust module and heat the coolant flowing through the heat exchanger. If water was used as a coolant, coolant flowrate could be adjusted so as to generate high pressure steam from a continuous supply of water. This steam could be used as a source of heat or to drive a secondary steam turbine which in turn could directly drive an electric generator.

Turbopower could be incorporated through the addition of a secondary annular reaction gas turbine at the perimeter of the primary exhaust gas duct. The exhaust leaving the thrust module has both thermal and kinetic energy. The cogeneration system just described above would only capture the thermal energy in the exhaust flow. However, a reaction turbine could extract a large portion of the total available kinetic energy from the exhaust. The reaction turbine could then be used to provide mechanical energy for other uses, or could drive a secondary electric generator. A reaction turbine could be placed either before or after a heat exchange section, but it is preferred to locate the turbine after the heat exchanger to extend service life of the materials in the exhaust gas stream.

Addition of Turbine to Exhaust

Figure 53:
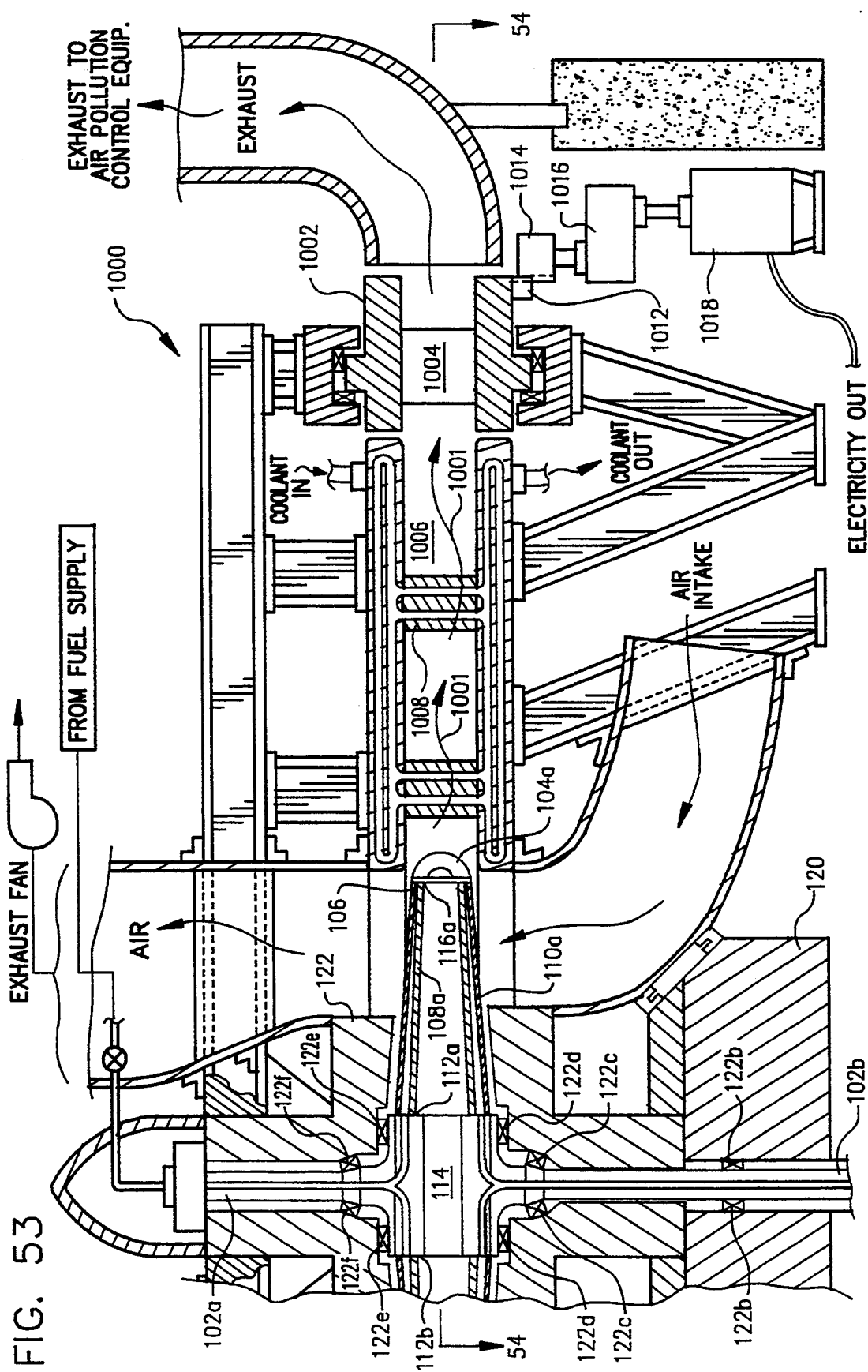
FIG. 53 is a vertical cross-sectional view of the power plant of the present invention, similar to the view first set forth in FIG. 1 above, but here showing the addition of an annular reaction turbine for capturing the kinetic energy of the exhaust gases and generating shaft for electrical power therefrom.

Attention is now directed to FIG. 53, where a vertical cross-sectional view of the power plant 1000 of the present invention is provided, similar to the view first set forth in FIG. 1 above, but here showing the addition of an annular reaction turbine 1002 for capturing the kinetic energy of the exhaust gases and generating shaft or electrical power therefrom.

Figure 54:
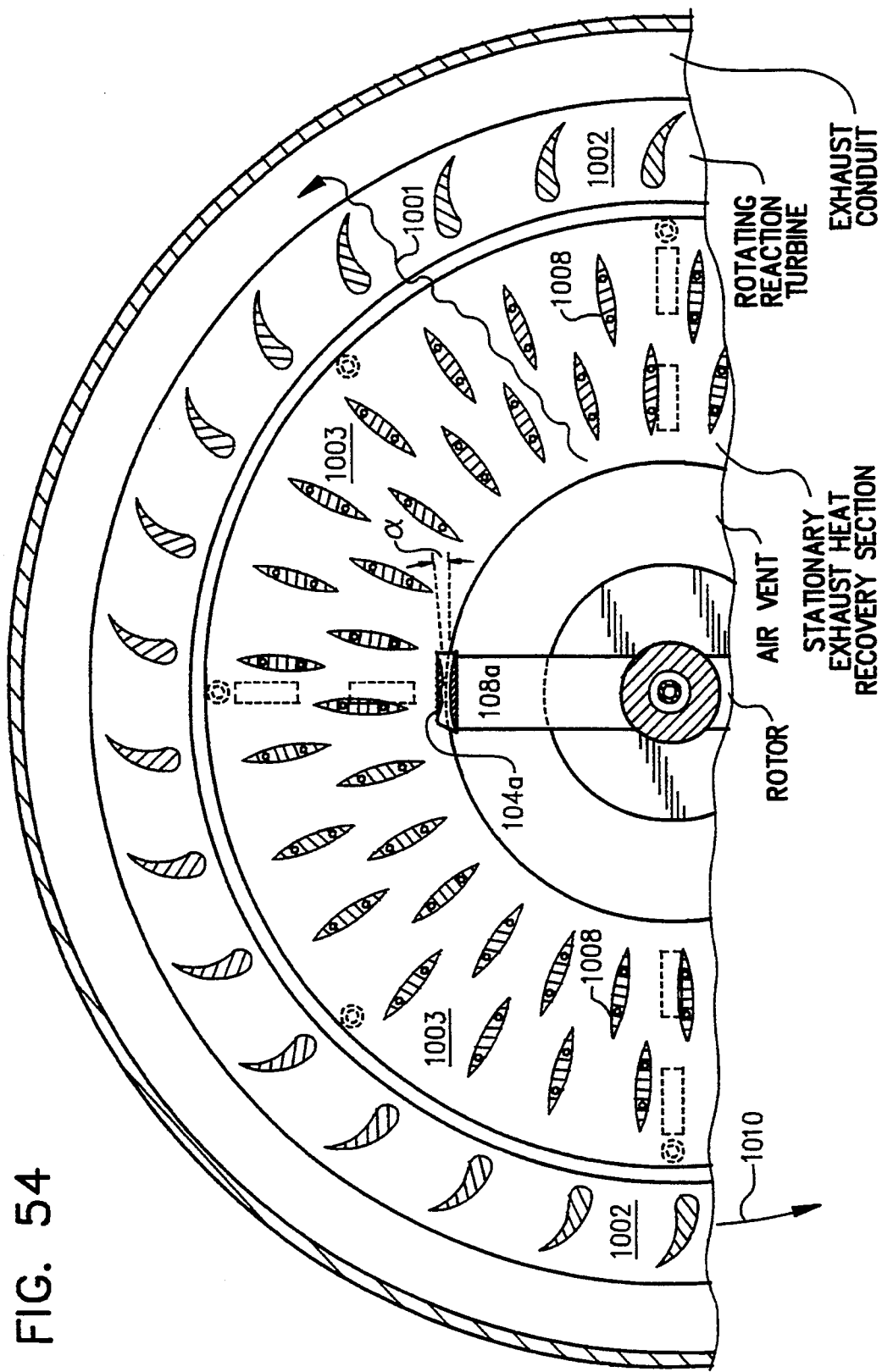
FIG. 54 is a cross-sectional view, taken across line 54—54 of FIG. 53, here showing stationary exhaust gas heat recovery section, the rotating annular reaction turbine, and the exhaust gas duct.

FIG. 54 is a cross-sectional view, taken across line 54—54 of FIG. 53, here showing the general position and airfoil shaped vanes 1004 of the annular reaction turbine 1002. The power plant 1000 as depicted in this FIG. 54 shows a stationary annular exhaust duct 1006. Heat exchange elements 1008 are located within this duct to remove heat energy from the exhaust gases and to transfer that heat to a secondary working fluid such as water. The water can be heated to high pressure steam, and can thereafter be used: (a) to drive a steam turbine, for (i) shaft work or (ii) to drive an electrical generator, or (b) as process heat. However, even under ideal conditions, the heat exchanger can only remove the thermal energy from the exhaust gas stream.

Due to its high velocity, there is a large amount of kinetic energy in the exhaust gas stream 1001. An annular reaction turbine rotor 1002 mounted around the outer circumference of the exhaust duct 1003 extracts a portion of the kinetic energy remaining in the flow when it exits the fixed exhaust from the heat exchange section. The airfoil shaped turbine vanes 1004 utilize the high velocity exhaust gas flow 1001 to generate a force which drives the reaction turbine 1002 in the direction indicated by reference arrow 1010. The motion of the turbine can then be converted to mechanical or electrical energy by way of ring gear 1012 mounted on the exterior of the reaction turbine 1002. The ring gear 1002 is connected to a driven gear 1014, gearbox 1016, and generator 1018 to accomplish the desired electrical generation.

Including a reaction turbine 1002 makes it possible to extract the kinetic energy remaining in the exhaust gas stream and convert it to usable energy. This further enhances the performance characteristics of my power generating plant design.

FIG. 58 shows schematically the use of the power and heat generated in the thrust module of the power plant for a variety of heat recovery, shaft work, or electrical generation activities. These options are as just described, with respect to use of the reaction turbine. Other options have been set forth above.

Both FIGS. 1 and 2 above show my powerplant design with a cogeneration steam extraction system. This system includes a stationary exhaust duct which surrounds the rotor, with the duct filled with hollow vanes through which a secondary working fluid is circulated. In the current design the working fluid to be circulated through the duct is water, although it is clear that a variety of heating fluids could be utilized by those skilled in the art. As shown, the hot exhaust gases from the thrust module heat the duct and the water, ultimately generating high pressure steam which could be used to drive a secondary steam turbine or turbines. However, the instant power plant is sufficiently efficient that it can be operated cost effectively without the exhaust enthalpy extraction system.

Power Plant Efficiency and Performance

In FIG. 59, the performance of my ACRE ™ power plant is compared to the performance of a gas turbine power plant, in terms of heat rate ("HR"). Variations in performance of the instant invention are shown as a function of the characteristic speed or ramjet Mach number. The heat rate is a performance term typically used by powerplant designers. The HR is the amount of heat added, usually in BTU units, required to produce a unit of work output, usually expressed in kilowatt hours (kwh) or horsepower-hours (Hp-hr). Heat rate is inversely proportional to the system efficiency, hence the lower the HR value, the better. Since fuel cost is typically known in terms of BTU heating value and the value of electrical power generated is capable of being forecast for various plant locations and situations, the heat rate allows the calculation of the economic viability of a given system.

Conventional gas turbine systems produce power in the range of roughly 8,000 to 11,000 BTU/Hp-hr. The instant invention, without co-generation or reaction turbine, is projected to produce power in the range of slightly less than 5,000 to about 7,000 BTU/Hp-hr, with an optimum current design of between 5,500 and 5,700 BTU/Hp-hr. Simply stated, conventional gas turbines require from about 40% to about 100% more fuel to produce the same amount of electricity than the instant invention.

The power plant performance characteristics: (a) with cogeneration, (b) without cogeneration, and (c) with use of a reaction turbine, are shown in FIG. 60. FIG. 60 assumes a tip Mach number of 3.5 and represents the variation in performance with changing throttle settings. From FIG. 60 it is clear that the plant achieves optimal performance at a low throttle setting. Moreover, cogeneration improves the basic plant performance by approximately 32%, resulting in heat rates of about 4,000 BTU/Hp-hr. Significantly, the addition of an annular reaction turbine adds another 28% to the efficiency rating, to allow heat rates in the 2,500 BTU/Hp-hr range.

From FIG. 59 it is clear that my power plant significantly out-performs conventional gas turbine systems. The gas turbine industries are quite mature, and manufacturers have been refining and improving turbine systems for about half a century. In general, contemporary increases in gas turbine performance are very small; most increases are measured in fractions of a percent efficiency. Thus, an overall output available at the high efficiency, low heat rate levels indicted on FIG. 59 show that my power generation apparatus and method provides a major, fundamental improvement in overall power generation economics.

Another way of expressing the efficiency of the instant invention is shown in FIG. 61. Thermal efficiencies (the ratio of fuel energy input to the mechanical energy output) for various types of power plants is illustrated. For illustrative purposes, in can be said that piston type engines fall in the 30% efficiency range, gas turbines in the 40% efficiency range, and the baseline ramjet power plant falls in the 50% efficiency range. Use of co-generation and an annular reaction turbine further improves the cycle efficiencies of the instant invention up to the 70% range. The advantages of the instant invention are thus self-evident.

The cost of new electrical generation capacity using my power plant, and comparisons with other types of power plants, is shown in FIG. 62. As currently understood, it is expected that the cost of electricity produced by a basic ramjet driven power plant, as described herein, including both capital and operating costs, will be in the range of $0.02 per Kwh, which is some 50% or more less than the cost of power from currently known power plants.

The method and apparatus for producing mechanical, electrical, and thermal power as described above provides a revolutionary, compact, easily constructed, cost effective power plant. The output from this power plant can be used in conjunction with existing power delivery systems, and represents a significant option for reducing air emissions by combustion of clean burning fuels. Further, given the efficiencies, dramatically less fuel will be consumed per unit of electrical, mechanical, or thermal energy generated.

It will thus be seen that the objects set forth above, including those made apparent from the proceeding description, are efficiently attained, and, since certain changes may be made in carrying out the above method and in construction of the apparatus and in practicing the methods set forth without departing from the scope of the invention, it is to be understood that the invention may be embodied in other specific forms without departing from the spirit or essential characteristics thereof. The present embodiments are therefore to be considered in all respects as illustrative and not as restrictive. Accordingly, the scope of the invention should be determined not by the foregoing description and the embodiments illustrated, but by the appended claims, and consequently all changes, variations, and alternative embodiments which come within the meaning and range of equivalents of the appended claims are therefore intended to be embraced therein.

Appendix 1
List of Equations $$M = \frac{v}{a} \quad (1.1)$$

$$F = (\dot{m}_0 - \dot{m}_1)v_7 + (\dot{m}_1 + \dot{m}_f)v_6 - \dot{m}_0 v_0 \quad (1.2)$$

$$F = \dot{m}_1(v_6 - v_0) + \dot{m}_f v_6 - (\dot{m}_0 - \dot{m}_1)(v_0 - v_7) \quad (1.3)$$

$$A_0 = A_1 \quad (1.4)$$

$$A_5 = A_6 \quad (1.5)$$

$$F = \dot{m}_1(v_6 - v_0) + \dot{m}_f v_6 \quad (1.6)$$

$$F = \dot{m}_1(v_6 - v_1) + \dot{m}_f v_6 + (p_6 A_6 - p_1 A_1) \quad (1.7)$$

$$T = pA + \dot{m}v = pA(1 + \gamma M^2) \quad (1.8)$$

$$(1.9)$$

$$T = \dot{m}\left(\sqrt{\frac{2(\gamma+1)}{\gamma} R_g T_t}\right)\phi(M)$$

$$\phi(M) = \frac{1 + \gamma M^2}{\sqrt{2(\gamma+1)M^2\left(1 + \frac{(\gamma-1)}{2}M^2\right)}} \quad (1.10)$$

$$\dot{w}_f S_f = \dot{w}_a S_a = \dot{m}\sqrt{\frac{2(\gamma+1)}{\gamma} R_g T_t} \quad (1.11)$$

$$p_{t5} = p_{t0} \times \frac{p_{t1}}{p_{t0}} \times \frac{p_{t2}}{p_{t1}} \times \frac{p_{t4}}{p_{t2}} \times \frac{p_{t5}}{p_{t4}} \quad (1.12)$$

$$T_5 = p_0 A_5(1 + \gamma_5 M_5^2) \quad (1.13)$$

$$T_5 = \dot{w}_a S_a \phi(M_5) \quad (1.14)$$

$$T_1 = p_0 A_1(1 + \gamma_0 M_0^2) \quad (1.15)$$

$$(1.16)$$

$$f(M_0) = \frac{\dot{w}_a \sqrt{T_{t0}}}{p_0 A_1}$$

$$(1.17)$$

$$T_1 = \frac{\dot{w}_a \sqrt{T_{t0}}}{f(M_0)} (1 + \gamma_0 M_0^2)$$

$$(1.18)$$

$$T_5 - T_1 = \dot{w}_a S_a \phi(M_5) - \frac{\dot{w}_a \sqrt{T_{t0}}}{f(M_0)}(1 + \gamma_0 M_0^2)$$

$$D = (p_2 - p_3)t \quad (1.19)$$

$$L = (p'_2 - p_2)c \cos\beta \quad (1.20)$$

$$D = (p'_2 - p_2)c \sin\beta \quad (1.21)$$

$$P_{ower} = \int_{hub}^{tip} r\omega D dr \quad (1.22)$$

$$2\Gamma = 0.616\pi \rho R^4 \sqrt{v\omega^3} \quad (1.23)$$

$$C_m = \frac{2\Gamma}{\frac{1}{2}\rho\omega^2 R^5} \quad (1.24)$$

$$\Re = \frac{R^2 \omega}{v} \quad (1.25)$$

$$C_m = \frac{3.87}{\sqrt{\Re}} \quad (1.26)$$

$$-\frac{1}{\sqrt{C_m}} = 1.97 \log(\Re \sqrt{C_m}) + 0.03 \quad (1.27)$$

$$C_m = 0.146 \Re^{-\frac{1}{5}} \quad (1.28)$$

$$2\Gamma = \pi \omega R^4 \frac{\mu}{s} \quad (1.29)$$

$$C_m = 2\pi \frac{R}{s} \frac{1}{\Re} \quad (1.30)$$

$$C_m = 2.67 \Re^{-\frac{1}{2}} \quad (1.31)$$

$$C_m = 0.0622 \Re^{-\frac{1}{5}} \quad (1.32)$$

$$\sigma_{max} = \left(\frac{1}{2}\right)\frac{W}{386.4}\frac{L\omega^2}{S} \quad (1.33)$$

$$\sigma_r = \sigma_t = \sigma_{max} = \left(\frac{1}{8}\right)\frac{\delta\omega^2}{386.4}(3 + v_p)R^2 \quad (1.34)$$

$$\lambda = \frac{A_{root}}{A_{tip}} \quad (1.35)$$

Appendix 2
Nomenclature

F=net thrust module thrust

T=stream thrust

T$_5$=stream thrust at thrust module station (e.g., see FIG. 25)

T$_1$=stream thrust at thrust module station (e.g., see FIG. 25)

$\dot{m}_0$=mass flow through captured stream tube $\dot{m}_1$=mass flow through thrust module station 1 (e.g., see FIG. 25)

$\dot{m}_f$=mass flow of fuel into thrust module (e.g., see FIG. 25)

$\dot{w}_a$=weight flow of air into thrust module ($\dot{m}_0$g)

$\dot{w}_f$=weight flow of fuel into thrust module ($\dot{m}_f$g)

v=velocity v$_0$=velocity of fluid at thrust module station 0. (e.g., see FIG. 25)

v$_6$=velocity of fluid at thrust module station 6 (e.g., see FIG. 25)

v$_7$=velocity of fluid at thrust module station 7 (e.g., see FIG. 25)

A$_0$=cross sectional flow area at thrust module station 0 (e.g., see FIG. 25)

A$_1$=cross sectional flow area at thrust module station 1 (e.g., see FIG. 25)

A$_5$=cross sectional flow area at thrust module station 5 (e.g., see FIG. 25)

A$_6$=cross sectional flow area at thrust module station 6 (e.g., see FIG. 25)

p=static pressure p$_0$=static pressure at thrust module station 0 (e.g., see FIG. 25)

p$_1$=free stream static pressure (e.g., see FIGS. 28, 29 and 30)

$p_2$ = post shock leading edge static pressure (e.g., see FIGS. 28, 29 and 30)

$\gamma$ = ratio of specific heats
$\gamma_0$ = ratio of specific heats at station 0 (e.g., see FIG. 25)
$\gamma_5$ = ratio of specific heats at station 5 (e.g., see FIG. 25)

M = Mach number
$M_5$ = Mach number at thrust module station 5 (e.g., see FIG. 25)

$T_t$ = stagnation temperature
$T_{t0}$ = stagnation temperature at flow station 0 (e.g., see FIG. 25)
$R_g$ = ideal gas constant
$\phi(M)$ = Mach number function
$S_f$ = fuel specific impulse
$S_a$ = air specific impulse $p_t$ = total pressure
$p_{t5}$ = total pressure at station 5 (e.g., see FIG. 25)
$p_{t0}$ = total pressure at station 0 (e.g., see FIG. 25)
$p_{t1}$ = total pressure at station 1 (e.g., see FIG. 25)
$p_{t2}$ = total pressure at station 2 (e.g., see FIG. 25)
$p_{t4}$ = total pressure at station 4 (e.g., see FIG. 25)
$p_{t5}$ = total pressure at station 5 (e.g., see FIG. 25)

a = speed of sound

L = lift
D = drag
c = chord of airfoil section
$\alpha_0$ = angle of attack of airfoil section
$\beta$ = angle of attack of flat plate (e.g., see FIG. 30)
t = thickness of airfoil section (e.g., see FIG. 28)

$\Gamma$ = moment required to turn disc (e.g., see FIGS. 36, 38 and 39)
R = radius of disc (e.g., see FIGS. 36, 38 and 39)
r = local radial station
$\nu$ = specific viscosity of fluid surrounding the disc
$\mu$ = kinematic viscosity of fluid surrounding the disc
$\rho$ = density of fluid surrounding the disc
$C_m$ = dimensionless moment coefficient
s = gap between housing and disc
$\omega$ = rotation rate
$\Re$ = Reynolds Number $\sigma_{max}$ = maximum stress
$\sigma_r$ = radial stress
$\sigma_t$ = tangential stress
S = cross-sectional area of rod
W = weight of rod
L = length of rod
$\nu_p$32 Poisons ratio
$\delta$ = material density $\lambda$ = material taper ratio
$A_{root}$ = material cross-sectional area at rotor root
$A_{tip}$ = material cross-sectional area at rotor tip

I claim:

1. A method for generating power, comprising:
   (a) providing a housing means,
   (b) providing an output means, said output means further comprising shaft portions, said shaft portions rotatably secured about an axis of rotation by said housing means;
   (c) providing a rotor means, said rotor means secured to said output means;
   (d) providing a ramjet means, said ramjet means secured to said rotor means, said ramjet means operating at a velocity of at least Mach 1;
   (e) providing a fuel supply means;
   (f) providing a fuel supply conduit to contain fuel while said fuel travels from said fuel supply means to said ramjet means;
   (e) wherein said ramjet means oxidizes the fuel supplied thereto to generate combustion gases which produce thrust from said ramjet means so as to rotate said ramjet means, rotor means, and output means, to thereby enable said output means to provide power output from said apparatus.

2. The method of claim one wherein said ramjet means operates at a speed of at least Mach 3.0.

3. The method of claim one wherein said ramjet means operates at a speed between Mach 3.0 and mach 4.5.

4. The method of claim one wherein said ramjet means operates at approximately mach 3.5.

5. The method of claim one, further comprising providing an electrical generator, said generator operatively connected to said output means, so that rotation of said output means will energize said generator, to thereby generate electrical power.

6. A method of generating power, comprising:
   (a) supplying an oxidizable fuel to one or more ramjets
   (b) oxidizing said fuel in said one or more ramjets to
       (i) generate combustion gases which escape therefrom, and to
       (ii) generate a motive force by thrust reaction of said one or more ramjets to said escaping combustion gases,
   (c) propelling said one or more ramjets at a velocity in excess of Mach 1.0 through a fluid stream by way of said motive force, and
   (d) turning an output shaft operatively connected to said one or more ramjets;
   (e) whereby power is provided at said output shaft.

7. The method as recited in claim 6 wherein the velocity of said one or more ramjets is at least Mach 3.0.

8. The method as recited in claim 6 wherein the velocity of said one or more ramjets is between Mach 3.0 and Mach 4.5.

9. The method as recited in claim 8, further comprising the step of substantially cancelling supersonic shock waves in said fluid stream to thereby minimize aerodynamic drag.

10. The method as recited in claim 9, wherein said step of substantially cancelling supersonic shock waves in said fluid stream includes directing said fluid stream through a matched pair of substantially triangular biplane rotor arms, and wherein said arms are configured in opposing fashion to provide a minimum fluid passage gap therebetween, so that the shock waves produced by each of the arms substantially cancels the shock wave produced by said opposing arm.

11. The method as recited in claim 8, further comprising the step of providing flow of said fluid stream at a rate sufficient to avoid wake turbulence during the passage of the next one or more ramjets.

12. The method as recited in claim of claim 11, wherein the step of providing fluid flow further comprises supplying external air to a vent structure, to enable said one or more ramjets to engage fresh vent air substantially free of such turbulence during passage of the next one or more ramjets through a given vent passage location.

13. The method as recited in claim 12, wherein the step of supplying external air to a vent structure further comprises directing the external air generally upward through a vent structure.

14. The method as recited in claim 6 wherein the operational velocity of said one or more ramjets is approximately Mach 3.5.

15. The method as recited in claim 6, wherein said fuel is selected from the group comprising gaseous hydrocarbon fuels.

16. The method as recited in claim 15, wherein said fuel is essentially natural gas.

17. The method as recited in claim 6, wherein the step of supplying fuel includes the step of supplying said fuel axially through a bore in said output shaft.

18. The method as recited in claim 6, wherein said method further includes the step of generating electricity.

19. The method as recited in claim 18, wherein the step of generating electricity comprises operatively connecting an electrical generator to said output shaft.

20. The method as recited in claim 6, further comprising the step of passing said combustion gases through a reaction turbine, wherein said reaction turbine is situated in an operative position wherein said combustion gases from said ramjet one or more ramjets are directed at said reaction turbine, so that said reaction turbine is rotated by the passage of said combustion gases through said reaction turbine, to provide power output from said reaction turbine.

21. The method as recited in claim 6, wherein said method further includes the step of recovering thermal energy from said combustion gases.

22. The method as recited in claim 21, wherein said thermal energy recovery step comprises transfer of said thermal energy from said combustion gases to a secondary working fluid.

23. The method as recited in claim 22, further comprising the step of passing said combustion gases through a reaction turbine, wherein said reaction turbine is situated in an operative position wherein said combustion gases are directed to said reaction turbine, so that said reaction turbine is rotated by the passage of said combustion gases through said reaction turbine, to provide power output from said reaction turbine.

24. The method as recited in claim 23, wherein the step of passing combustion gases through a reaction turbine is preceded by the step of passing said combustion gases radially outward from said heat recovery section and thence into said reaction turbine.

25. The method as recited in claim 22, wherein said secondary working fluid is water, and wherein steam is produced by heating said water.

26. The method as recited in claim 25, wherein said thermal energy recovery step comprises indirect heating of said water by said combustion gases in a heat recovery section.

27. The method as recited in claim 26, further comprising the step of minimizing pressure drop of said combustion gases during said thermal energy recovery step, wherein said thermal energy recovery step is accomplished (i) by directing said combustion gases in a heat transfer relationship past generally airfoil shaped aerodynamically low pressure drop heat transfer structures in said heat recovery section, and (ii) by passing said secondary working fluid through an interior portion of said heat transfer structures.

28. The method as recited claim 25, further comprising the step of directing said steam to a steam turbine, to generate power by rotation of said steam turbine by said steam, to produce shaft work from said steam turbine.

29. The method as recited in claim 28, further comprising the step of generating electricity from said shaft work of said steam turbine.

* * * * *

UNITED STATES PATENT AND TRADEMARK OFFICE
CERTIFICATE OF CORRECTION

PATENT NO.   : 5,372,005
DATED        : December 13, 1994
INVENTOR(S)  : Lawlor, Shawn P.

It is certified that error appears in the above-identified patent and that said Letters Patent is hereby corrected as shown below:

Title page,
Item [76], Inventor, delete "Lawler" and substitute therefore -- Lawlor --

Column 6,
Line 59, delete "nozzle" and substitute therefore -- inlet --

Column 14,
Lines 22, 24 and 30 delete "260$t$" and substitute therefore -- 260($t$) --
Lines 23 and 31, delete "262$t$" and substitute therefore -- 262($t$) --
Lines 28 and 32, delete "270$t$" and substitute therefore -- 270($t$) --
Line 38, delete "226)" and substitute therefore -- 226 --

Column 15,
Line 66, delete "270$t$" and substitute therefore -- 270($t$) --

Column 18,
Line 25, delete "212B" and substitute therefore -- 21B --

Column 25,
Line 15, after the word "a" insert -- leading edge --
Line 42, delete "$L = (p^1_2 - p_2) c \cos\beta$" and substitute therefore -- $L = (P'_2 - P_2) c \cos\beta$ --
Line 43, delete "$D = (p^1_2 - p_2) c \cos\beta$" and substitute therefore -- $D = (P'_2 - P_2) c \sin\beta$ --
Line 43, delete "(2)" and substitute therefore -- (21) --

Column 26,
Line 33, delete "focussed" and substitute therefore -- focused --

Column 30,
Line 21, delete "$C_m = 0.146^{-1/5}$" and substitute therefore -- $C_m = 0.146 \mathcal{R}^{-1/5}$ --

Line 56, delete "$C_m = 2.67 \mathcal{R}^{-\frac{1}{2}}$" and substitute therefore -- $C_m = 2.67 \mathcal{R}^{-1/2}$ --

Column 31,
Line 58, after the word "rate" delete "w" and substitute therefore -- "$\omega$" --

Column 39,
Line 42, line 2 of the formula, delete "$f(M_0$" and substitute therefore -- $f(M_0)$ --

UNITED STATES PATENT AND TRADEMARK OFFICE
CERTIFICATE OF CORRECTION

PATENT NO. : 5,372,005
DATED : December 13, 1994
INVENTOR(S) : Lawlor, Shawn P.

It is certified that error appears in the above-identified patent and that said Letters Patent is hereby corrected as shown below:

<u>Column 41,</u>
Line 56, delete "$v_p$32 Poisons ratio" and substitute therefore -- $v_p$ =Poissons ratio --

<u>Column 42,</u>
Lines 19 and 22, delete "mach" and substitute therefore -- Mach --
Line 31, after the words "gases from said" delete "ramjet"

Signed and Sealed this

Third Day of February, 2004

JON W. DUDAS
*Acting Director of the United States Patent and Trademark Office*